US011894967B2

(12) United States Patent
Hadani et al.

(10) Patent No.: US 11,894,967 B2
(45) Date of Patent: Feb. 6, 2024

(54) ORTHOGONAL TIME FREQUENCY SPACE MODULATION TECHNIQUES

(71) Applicant: Cohere Technologies, Inc., Santa Clara, CA (US)

(72) Inventors: Ronny Hadani, Santa Clara, CA (US); Shlomo Selim Rakib, Santa Clara, CA (US); Anton Monk, Santa Clara, CA (US); Michail Tsatsanis, Santa Clara, CA (US); Yoav Hebron, Santa Clara, CA (US)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 18/164,872

(22) Filed: Feb. 6, 2023

(65) Prior Publication Data
US 2023/0336399 A1  Oct. 19, 2023

Related U.S. Application Data

(63) Continuation of application No. 17/304,059, filed on Jun. 14, 2021, now Pat. No. 11,575,557, which is a
(Continued)

(51) Int. Cl.
H04L 27/32 (2006.01)
(52) U.S. Cl.
CPC ................................. H04L 27/32 (2013.01)
(58) Field of Classification Search
CPC ....................................................... H04L 27/32
See application file for complete search history.

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CN | 104468451 A | 2/2008 |
| CN | 104662855 A | 5/2015 |

(Continued)

OTHER PUBLICATIONS

Banelli, P. et al., "Modulation Formats and Waveforms for 5G Networks: Who Will Be the Heir of OFDM?," IEEE Signal Processing Magazine, vol. 81, pp. 80-93, Nov. 2014.
(Continued)

*Primary Examiner* — James P Duffy
(74) *Attorney, Agent, or Firm* — Perkins Coie LLP

(57) ABSTRACT

Orthogonal Time Frequency Space (OTFS) is a novel modulation scheme with significant benefits for 5G systems. The fundamental theory behind OTFS is presented in this paper as well as its benefits. We start with a mathematical description of the doubly fading delay-Doppler channel and develop a modulation that is tailored to this channel. We model the time varying delay-Doppler channel in the time-frequency domain and derive a new domain (the OTFS domain) where we show that the channel is transformed to a time invariant one and all symbols see the same SNR. We explore aspects of the modulation like delay and Doppler resolution, and address design and implementation issues like multiplexing multiple users and evaluating complexity. Finally we present some performance results where we demonstrate the superiority of OTFS.

16 Claims, 43 Drawing Sheets

Related U.S. Application Data continuation of application No. 15/776,374, filed as application No. PCT/US2016/062590 on Nov. 17, 2016, now Pat. No. 11,038,733.

(60) Provisional application No. 62/263,552, filed on Dec. 4, 2015, provisional application No. 62/257,171, filed on Nov. 18, 2015.

(56) References Cited

U.S. PATENT DOCUMENTS

| | | | |
|---|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,667,307 B1 | 5/2017 | Hadani et al. |
| 9,668,148 B2 | 5/2017 | Hadani et al. |
| 9,712,354 B2 | 7/2017 | Hadani et al. |
| 9,722,741 B1 | 8/2017 | Rakib et al. |
| 9,729,281 B2 | 8/2017 | Hadani et al. |
| 10,667,148 B1 | 5/2020 | Hadani et al. |
| 10,681,568 B1 | 6/2020 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0150036 A1 | 6/2012 | Buckton et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |

(56) References Cited

U.S. PATENT DOCUMENTS

| | | |
|---|---|---|
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0288913 A1 | 10/2017 | Rakib et al. |
| 2017/0289961 A1 | 10/2017 | Rakib et al. |
| 2018/0109284 A1 | 4/2018 | Hadani et al. |
| 2018/0167165 A1 | 6/2018 | Kons et al. |
| 2018/0205481 A1 | 7/2018 | Rakib et al. |
| 2018/0227159 A1 | 8/2018 | Rakib et al. |
| 2018/0242170 A1 | 8/2018 | Hadani et al. |
| 2018/0262306 A1 | 9/2018 | Hadani et al. |
| 2018/0288809 A1 | 10/2018 | Delfeld et al. |
| 2018/0302802 A1 | 10/2018 | Fanfelle |
| 2019/0036577 A1 | 1/2019 | Delfeld et al. |
| 2019/0036741 A1 | 1/2019 | Hadani et al. |
| 2019/0044682 A1 | 2/2019 | Hebron et al. |
| 2019/0075551 A1 | 3/2019 | Hadani et al. |
| 2019/0081836 A1 | 3/2019 | Hadani et al. |
| 2019/0159177 A1 | 5/2019 | Rakib et al. |
| 2019/0173617 A1 | 6/2019 | Kons et al. |
| 2019/0173630 A1 | 6/2019 | Kons et al. |
| 2019/0215109 A1 | 7/2019 | Hadani et al. |
| 2019/0238189 A1 | 8/2019 | Delfeld et al. |
| 2019/0327054 A1 | 10/2019 | Kons et al. |
| 2019/0342126 A1 | 11/2019 | Hadani et al. |
| 2019/0342136 A1 | 11/2019 | Hadani et al. |
| 2019/0379422 A1 | 12/2019 | Hadani et al. |
| 2020/0045562 A1 | 2/2020 | Hadani et al. |
| 2020/0119868 A1 | 4/2020 | Rakib et al. |
| 2020/0137774 A1 | 4/2020 | Molisch et al. |
| 2020/0145273 A1 | 5/2020 | Rakib et al. |
| 2020/0153107 A1 | 5/2020 | Rakib |
| 2020/0186397 A1 | 6/2020 | Tsatsanis et al. |
| 2020/0204309 A1 | 6/2020 | Namboodiri |
| 2020/0204410 A1 | 6/2020 | Hadani |
| 2020/0228170 A1 | 7/2020 | Delfeld et al. |
| 2020/0259604 A1 | 8/2020 | Hadani et al. |
| 2020/0259692 A1 | 8/2020 | Hadani et al. |
| 2020/0259697 A1 | 8/2020 | Delfeld |
| 2020/0280138 A1 | 9/2020 | Fanfelle et al. |
| 2020/0287672 A1 | 9/2020 | Namboodiri et al. |
| 2020/0288333 A1 | 9/2020 | Rakib et al. |
| 2020/0305010 A1 | 9/2020 | Hadani et al. |
| 2020/0313695 A1 | 10/2020 | Namboodiri et al. |
| 2020/0313949 A1 | 10/2020 | Hadani |
| 2020/0322185 A1 | 10/2020 | Kons et al. |
| 2020/0322202 A1 | 10/2020 | Hadani et al. |
| 2020/0351836 A1 | 11/2020 | Rakib et al. |
| 2020/0367252 A1 | 11/2020 | Hebron et al. |
| 2020/0389268 A1 | 12/2020 | Sathyanarayan et al. |
| 2020/0403829 A1 | 12/2020 | Namboodiri et al. |
| 2021/0028877 A1 | 1/2021 | Rakib et al. |
| 2021/0036823 A1 | 2/2021 | Hebron et al. |
| 2021/0058114 A1 | 2/2021 | Molisch et al. |
| 2021/0077625 A1 | 3/2021 | Kons et al. |
| 2021/0105155 A1 | 4/2021 | Kons et al. |
| 2021/0126750 A1 | 4/2021 | Kons et al. |
| 2021/0135905 A1 | 5/2021 | Kons et al. |

FOREIGN PATENT DOCUMENTS

| | | |
|---|---|---|
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011455 | 1/2017 |
| WO | 2017011478 | 1/2017 |
| WO | 2017044501 | 3/2017 |
| WO | 2017087706 | 5/2017 |
| WO | 2017100666 | 5/2017 |
| WO | 2017147439 | 6/2017 |
| WO | 2017165697 | 8/2017 |
| WO | 2017173160 | 9/2017 |
| WO | 2017173389 | 10/2017 |
| WO | 2017201467 | 10/2017 |
| WO | 2018032016 | 11/2017 |
| WO | 2018031938 | 2/2018 |
| WO | 2018031952 | 2/2018 |
| WO | 2018064587 | 2/2018 |
| WO | 2018064605 | 4/2018 |
| WO | 2018106731 | 4/2018 |
| WO | 2018129554 | 6/2018 |
| WO | 2018140837 | 7/2018 |
| WO | 2018191309 | 8/2018 |
| WO | 2018195548 | 10/2018 |
| WO | 2018200577 | 10/2018 |
| WO | 2018200567 | 11/2018 |
| WO | 2019014332 | 11/2018 |
| WO | 2019032142 | 1/2019 |
| WO | 2019032605 | 2/2019 |
| WO | 2019036492 | 2/2019 |
| WO | 2019051093 | 2/2019 |
| WO | 2019051427 | 3/2019 |
| WO | 2019055861 | 3/2019 |
| WO | 2019068053 | 3/2019 |
| WO | 2019089986 | 4/2019 |
| WO | 2019060596 | 5/2019 |
| WO | 2019113046 | 5/2019 |
| WO | 2019157230 | 6/2019 |
| WO | 2019173775 | 8/2019 |
| WO | 2019241436 | 9/2019 |
| WO | 2019241589 | 12/2019 |
| WO | 2020142520 | 12/2019 |
| WO | 2020206304 | 7/2020 |
| WO | 2020227619 | 10/2020 |
| WO | 2020247768 | 11/2020 |
| WO | 2021026212 | 12/2020 |
| WO | 2021062354 | 2/2021 |
| WO | 101119349 | 4/2021 |

OTHER PUBLICATIONS

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

(56) References Cited

OTHER PUBLICATIONS

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.

CATT, "UL ACK/NACK transmission methods for LTE-A," 3GPP TSG RAN WG1 Meeting #60bis, R1-102453, Beijing, China, Apr. 12-16, 2010, 8 pages.

Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.

Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).

Nehorai, A. et al., "MURI: Adaptive waveform design for full spectral dominance (2005-2010)," Afosr FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.

European Examination Report for EP Application No. 16867162.6, dated Jul. 16, 2020, 7 pages.

Chinese Office Action for CN 201680077444.2, dated Sep. 3, 2020, 8 pages.

Cohere Technologies, "5G Air Interface Waveforms" 3GPP RAN Workshop on 5G, RWS-150034, Sep. 17-18, 2015, 10 pages.

Chinese Office Action for CN 201680077444.2, dated Sep. 9, 2021, 5 pages.

ORTHOGONAL TIME FREQUENCY SPACE MODULATION TECHNIQUES

CROSS-REFERENCE TO RELATED APPLICATIONS

This patent is a continuation of U.S. application Ser. No. 17/304,059, filed Jun. 14, 2021, which is a continuation of U.S. application Ser. No. 15/776,374, filed May 15, 2018, now U.S. Pat. No. 11,038,733, issued Jun. 15, 2021, which is a 371 of International Patent Application No. PCT/US2016/62590, filed Nov. 17, 2016, which claims priority to U.S. Provisional Application Ser. No. 62/257,171, entitled "ORTHOGONAL TIME FREQUENCY SPACE MODULATION TECHNIQUES" filed on Nov. 18, 2015 and U.S. Provisional Application Ser. No. 62/263,552, entitled "DATA TRANSMISSION USING ORTHOGONAL TIME FREQUENCY SPACE MODULATION" filed on Dec. 4, 2015. The entire content of the aforementioned patent applications is incorporated by reference herein.

TECHNICAL FIELD

The present document relates to wireless communication, and more particularly, to modulation and demodulation of wireless signals.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques for transmitting and receiving a wireless signal using a new modulation technique, called orthogonal time frequency space modulation technique that provides performance superior to the present industry standards.

In one example aspect, a technique, including methods and apparatus for wireless data transmission is disclosed. The technique includes, receiving information bits, generating information symbols from the information bits, modulating each the information symbols onto one of a set of two dimensional (2D) orthogonal basis functions that span a portion of bandwidth and time duration of a transmission burst, and further processing and transmitting the transmission burst.

In another example aspect, a wireless signal reception technique, including method and apparatus is disclosed. The technique includes receiving and processing a transmission packet, recovering, from the transmission packet information symbols based on one of a set of two dimensional (2D) orthogonal basis functions that span the bandwidth and time duration of a transmission burst, and recovering information bits by demodulating the information symbol.

In another example aspect, a method of wireless communication is disclosed. The method includes receiving multiple data streams, each data stream representing data for a separate user equipment; generating information symbols by multiplexing the multiple data streams; modulating the information symbols onto one of a set of two dimensional (2D) orthogonal basis functions that span bandwidth and time duration of a transmission burst; and further processing and transmitting the transmission burst.

In another example aspect, a wireless communication apparatus is disclosed. The apparatus includes a module for receiving multiple data streams, each data stream representing data for a separate user equipment, a module generating information symbols by multiplexing the multiple data streams, a module modulating the information symbols onto one of a set of two dimensional (2D) orthogonal basis functions that span bandwidth and time duration of a transmission burst, and a module further processing and transmitting the transmission burst In another example aspect, a wireless communication method, implemented at a receiver, is disclosed. The method includes receiving and processing a transmission packet that includes information symbols for multiple user equipment that are multiplexed using a multiplexing scheme, recovering, from the transmission packet information symbols based on one of a set of two dimensional (2D) orthogonal basis functions that span the bandwidth and time duration of a transmission burst, and recovering information bits by demodulating the information symbols.

In yet another aspect, a wireless communication receiver apparatus is disclosed. The apparatus includes a module for receiving and processing a transmission packet that includes information symbols for multiple user equipment that are multiplexed using a multiplexing scheme, a module for recovering, from the transmission packet information symbols based on one of a set of two dimensional (2D) orthogonal basis functions that span the bandwidth and time duration of a transmission burst, and a module recovering information bits by demodulating the information symbols.

These, and other, features are disclosed throughout this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

Figure 1:
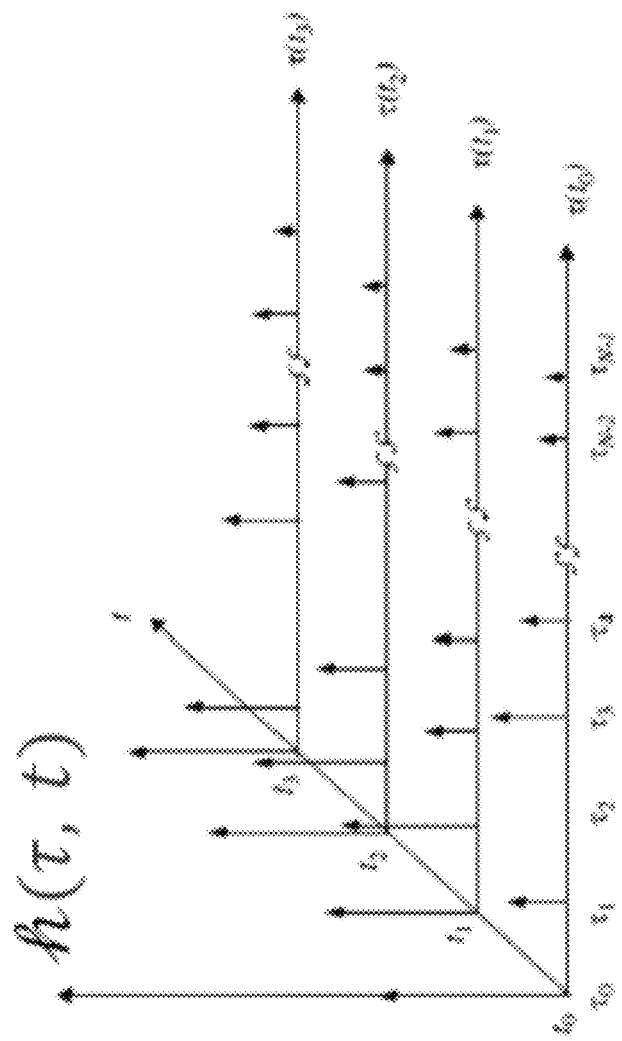
FIG. 1 shows an example time varying impulse response.

To make the purposes, technical solutions and advantages of this disclosure more apparent, various embodiments are described in detail below with reference to the drawings. Unless otherwise noted, embodiments and features in embodiments of the present document may be combined with each other. Section headers are used in the present document only to facilitate understanding and do not limit the scope of the technology discussed under each heading only to that section.

The present-day wireless technologies are expected to fall short in meeting the rising demand in wireless communications. Many industry organizations have started the efforts to standardize next generation of wireless signal interoperability standards. The 5th Generation (5G) effort by the 3rd Generation Partnership Project (3GPP) is one such example and is used throughout the document for the sake of explanation. The disclosed technique could be, however, used in other wireless networks and systems.

4G wireless networks have served the public well, providing ubiquitous access to the internet and enabling the explosion of mobile apps, smartphones and sophisticated data intensive applications like mobile video. This continues an honorable tradition in the evolution of cellular technologies, where each new generation brings enormous benefits to the public, enabling astonishing gains in productivity, convenience, and quality of life.

Looking ahead to the demands that the ever increasing and diverse data usage is putting on the network, it is becoming clear to the industry that current 4G networks will not be able to support the foreseen needs in the near term future. The data traffic volume has been and continues to increase exponentially. AT&T reports that its network has seen an increase in data traffic of 100,000% in the period 2007-2015. Looking into the future, new applications like immersive reality, and remote robotic operation (tactile internet) as well as the expansion of mobile video are expected to overwhelm the carrying capacity of current systems. One of the goals of 5G system design is to be able to economically scale the network to 750 Gbps per sq. Km in dense urban settings, something that is not possible with today's technology.

Beyond the sheer volume of data, the quality of data delivery will need to improve in next generation systems. The public has become accustomed to the ubiquity of wireless networks and is demanding a wireline experience when untethered. This translates to a requirement of 50+ Mbps everywhere (at the cell edge), which will require advanced interference mitigation technologies to be achieved.

Another aspect of the quality of user experience is mobility. Current systems' throughput is dramatically reduced with increased mobile speeds due to Doppler effects which evaporate MIMO capacity gains. Future 5G systems aim to not only increase supported speeds up to 500 Km/h for high speed trains and aviation, but also support a host of new automotive applications for vehicle-to-vehicle and vehicle-to-infrastructure communications.

While the support of increased and higher quality data traffic is necessary for the network to continue supporting the user needs, carriers are also exploring new applications that will enable new revenues and innovative use cases. The example of automotive and smart infrastructure applications discussed above is one of several. Others include the deployment of public safety ultra-reliable networks, the use of cellular networks to support the sunset of the PSTN, etc. The biggest revenue opportunity however, is arguably the deployment of large number of internet connected devices, also known as the internet of things (IoT). Current networks however are not designed to support a very large number of connected devices with very low traffic per device.

In summary, current LTE networks cannot achieve the cost/performance targets required to support the above objectives, necessitating a new generation of networks involving advanced PHY technologies. There are numerous technical challenges that will have to be overcome in 5G networks as discussed next.

1. 4G Technical Challenges

In order to enable machine-to-machine communications and the realization of the internet of things, the spectral efficiency for short bursts will have to be improved, as well as the energy consumption of these devices (allowing for 10 years operation on the equivalent of 2 AA batteries). In current LTE systems, the network synchronization requirements place a burden on the devices to be almost continuously on. In addition, the efficiency goes down as the utilization per UE (user equipment, or mobile device) goes down. The PHY requirements for strict synchronization between UE and eNB (Evolved Node B, or LTE base station) will have to be relaxed, enabling a re-designing of the MAC for IoT connections that will simplify transitions from idle state to connected state.

Another important use case for cellular IoT (CIoT) is deep building penetration to sensors and other devices, requiring an additional 20 dB or more of dynamic range. 5G CIoT solutions should be able to coexist with the traditional high-throughput applications by dynamically adjusting parameters based on application context.

The path to higher spectral efficiency points towards a larger number of antennas. A lot of research work has gone into full dimension and massive MIMO architectures with promising results. However, the benefits of larger MIMO systems may be hindered by the increased overhead for training, channel estimation and channel tracking for each antenna. A PHY that is robust to channel variations will be needed as well as innovative ways to reduce the channel estimation overhead.

Robustness to time variations is usually connected to the challenges present in high Doppler use cases such as in vehicle-to-infrastructure and vehicle-to-vehicle automotive applications. With the expected use of spectrum up to 60 GHz for 5G applications, this Doppler impact will be an order of magnitude greater than with current solutions. The ability to handle mobility at these higher frequencies would be extremely valuable.

2. OTFS Based Solutions

OTFS is a modulation technique that modulates each information (e.g., QAM) symbol onto one of a set of two dimensional (2D) orthogonal basis functions that span the bandwidth and time duration of the transmission burst or packet. The modulation basis function set is specifically derived to best represent the dynamics of the time varying multipath channel.

OTFS transforms the time-varying multipath channel into a time invariant delay-Doppler two dimensional convolution channel. In this way, it eliminates the difficulties in tracking time-varying fading, for example in high speed vehicle communications.

OTFS increases the coherence time of the channel by orders of magnitude. It simplifies signaling over the channel using well studied AWGN codes over the average channel SNR. More importantly, it enables linear scaling of throughput with the number of antennas in moving vehicle applications due to the inherently accurate and efficient estimation of channel state information (CSI). In addition, since the delay-Doppler channel representation is very compact, OTFS enables massive MIMO and beamforming with CSI at the transmitter for four, eight, and more antennas in moving vehicle applications.

In deep building penetration use cases, one QAM symbol may be spread over multiple time and/or frequency points. This is a key technique to increase processing gain and in building penetration capabilities for CIoT deployment and PSTN replacement applications. Spreading in the OTFS domain allows spreading over wider bandwidth and time durations while maintaining a stationary channel that does not need to be tracked over time.

Loose synchronization: CoMP and network MIMO techniques have stringent clock synchronization requirements for the cooperating eNBs. If clock frequencies are not well synchronized, the UE will receive each signal from each eNB with an apparent "Doppler" shift. OTFS's reliable signaling over severe Doppler channels can enable CoMP deployments while minimizing the associated synchronization difficulties.

These benefits of OTFS will become apparent once the basic concepts behind OTFS are understood. There is a rich mathematical foundation of OTFS that leads to several variations; for example it can be combined with OFDM or with multicarrier filter banks. In this paper we navigate the challenges of balancing generality with ease of understanding as follows:

This document describes the wireless Doppler multipath channel and its effects on multicarrier modulation.

This document describes an OTFS as a modulation that matches the characteristics of the time varying channel. We show OTFS as consisting of two processing steps:

A step that allows transmission over the time frequency plane, via orthogonal waveforms generated by translations in time and/or frequency. In this way, the (time-varying) channel response is sampled over points of the time-frequency plane.

A pre-processing step using carefully crafted orthogonal functions employed over the time-frequency plane, which translate the time-varying channel in the time-frequency plane, to a time-invariant one in the new information domain defined by these orthogonal functions.

This document discloses some intuition on the new modulation scheme by exploring the behavior of the channel in the new modulation domain in terms of coherence, time and frequency resolution etc.

This document discloses some aspects of channel estimation in the new information domain and multiplexing multiple users respectively, and complexity and implementation issues.

Finally, in Sections 8 and 9, we provide some performance results and we put the OTFS modulation in the context of cellular systems, discuss its attributes and its benefits for 5G systems 3. The Wireless Channel The multipath fading channel is commonly modeled in the baseband as a convolution channel with a time varying impulse response $$r(t) = \int h(\tau,t) s(t-\tau) d\tau \qquad (1)$$

where s(t) and r(t) represent the complex baseband channel input and output respectively and where $h(\tau,t)$ is the complex baseband time varying channel response.

FIG. 1 depicts an example graph of a time varying channel in which impulse response is plotted along two dimensions of $h(\tau,t)$, with horizontal axis representing variable (τ) and the vertical axis represents variable t.

Figure 2:
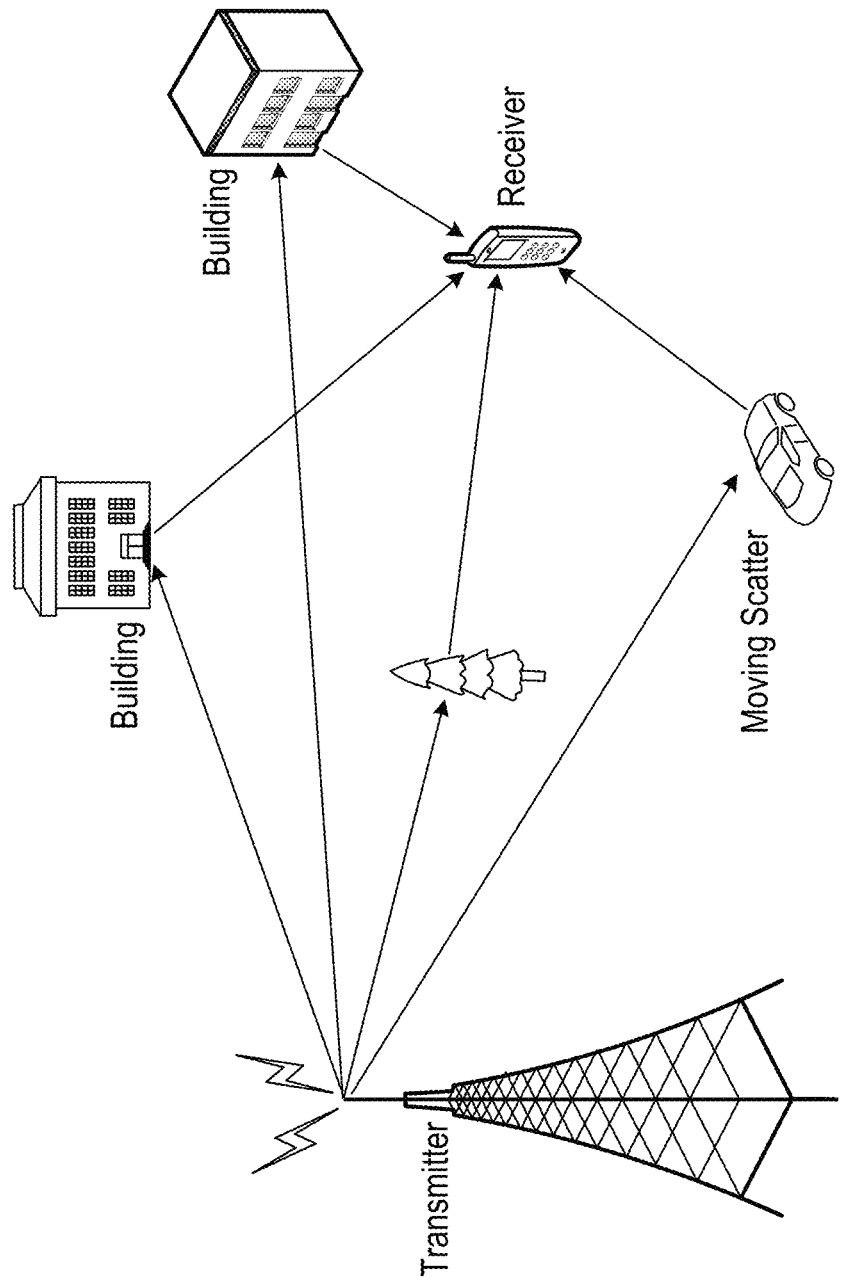
FIG. 2 shows an example communication network showing wireless channel geometry.

FIG. 2 shows an example of a mobile channel between a transmitter s(t) and a receiver r(t).

This representation, while general, may not give insight into the behavior and variations of the time varying impulse response. A more useful and insightful model, which is also commonly used for Doppler multipath doubly fading channels is $$r(t) = \iint h(\tau,\nu)e^{j2\pi\nu(t-\tau)}s(t-\tau)d\nu d\tau \quad (2)$$

In this representation, the received signal is a superposition of reflected copies of the transmitted signal, where each copy is delayed by the path delay $\tau$, frequency shifted by the Doppler shift $\nu$ and weighted by the time-invariant delay-Doppler impulse response $h(\tau,\nu)$ for that $\tau$ and $\nu$. In addition to the intuitive nature of this representation, Eq. (2) maintains the generality of Eq. (1). In other words it can represent complex Doppler trajectories, like accelerating vehicles, reflectors etc. This can be seen if we express the time varying impulse response as a Fourier expansion with respect to the time variable t $$\tilde{h}(\tau,t) = \int h(\tau,\nu)e^{j2\pi\nu t}dt \quad (3)$$

Figure 3:
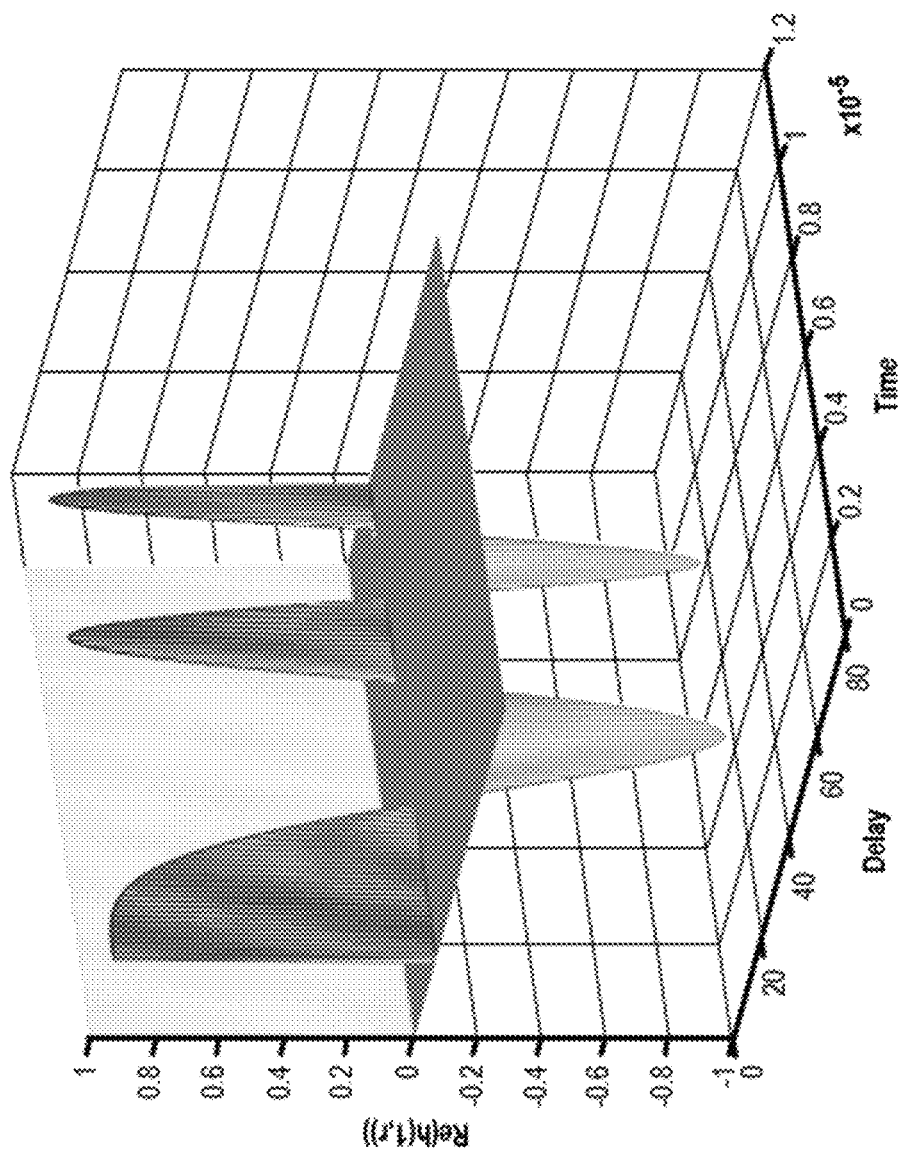
FIG. 3 shows an example of trajectory of a time varying frequency response for an accelerating reflector.
Figure 4:
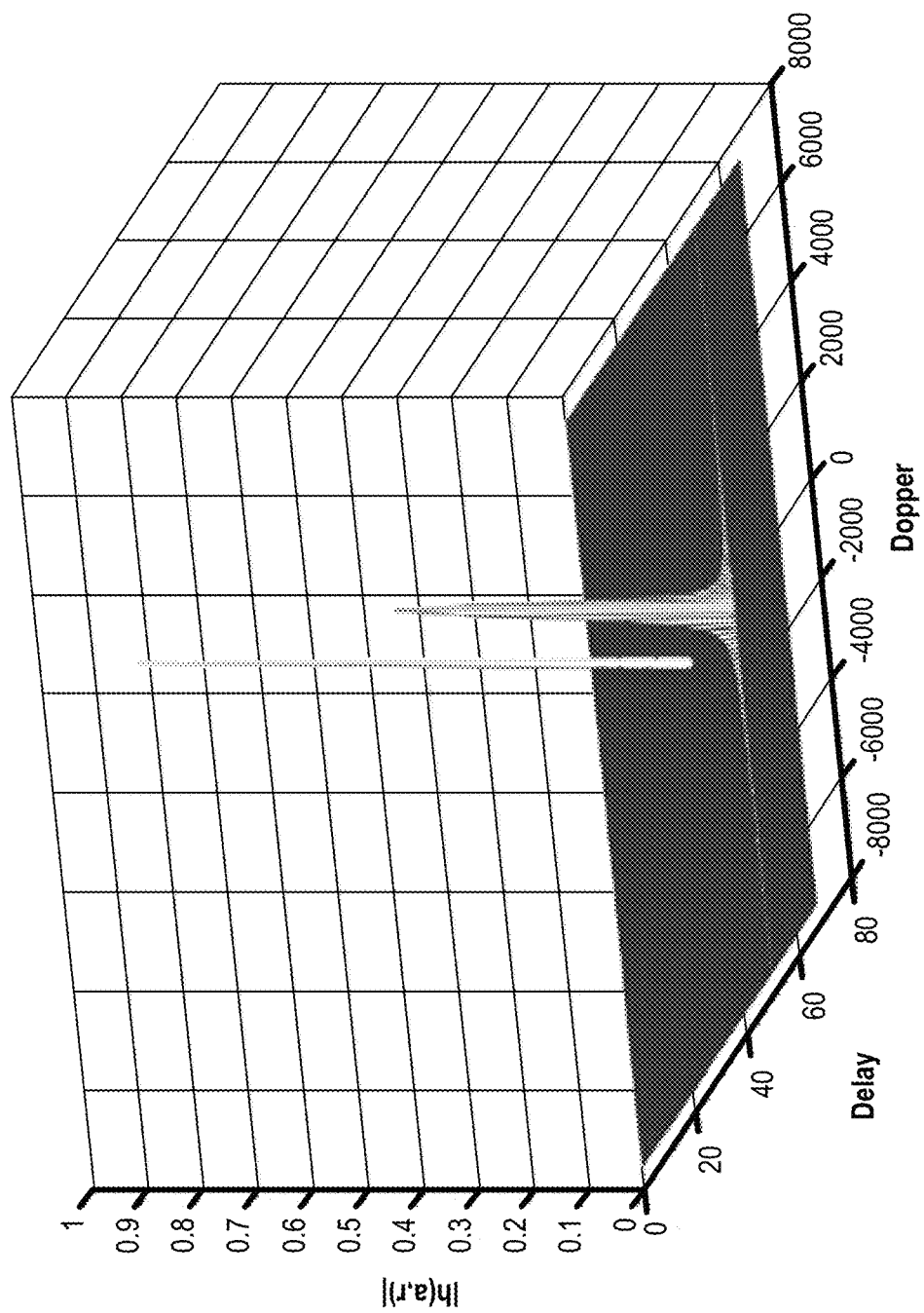
FIG. 4 shows an example delay-Doppler representation for an accelerating reflector channel.

Substituting (3) in (1) we obtain Eq. (2) after some manipulation. More specifically we obtain $y(t)=\iint e^{j2\pi\nu\tau}h(\tau,\nu)e^{j2\pi\nu(t-\tau)}x(t-\tau)d\nu d\tau$ which differs from Eq. (2) by an exponential factor; however, we can absorb the exponential factor in the definition of the impulse response $h(\tau,\nu)$ making the two representations equivalent. As an example, FIG. 3 shows the time-varying impulse response for an accelerating reflector in the $(\tau,t)$ coordinate system, while FIG. 4 shows the same channel represented as a time invariant impulse response in the $(\tau,\nu)$ coordinate system.

Figure 5:
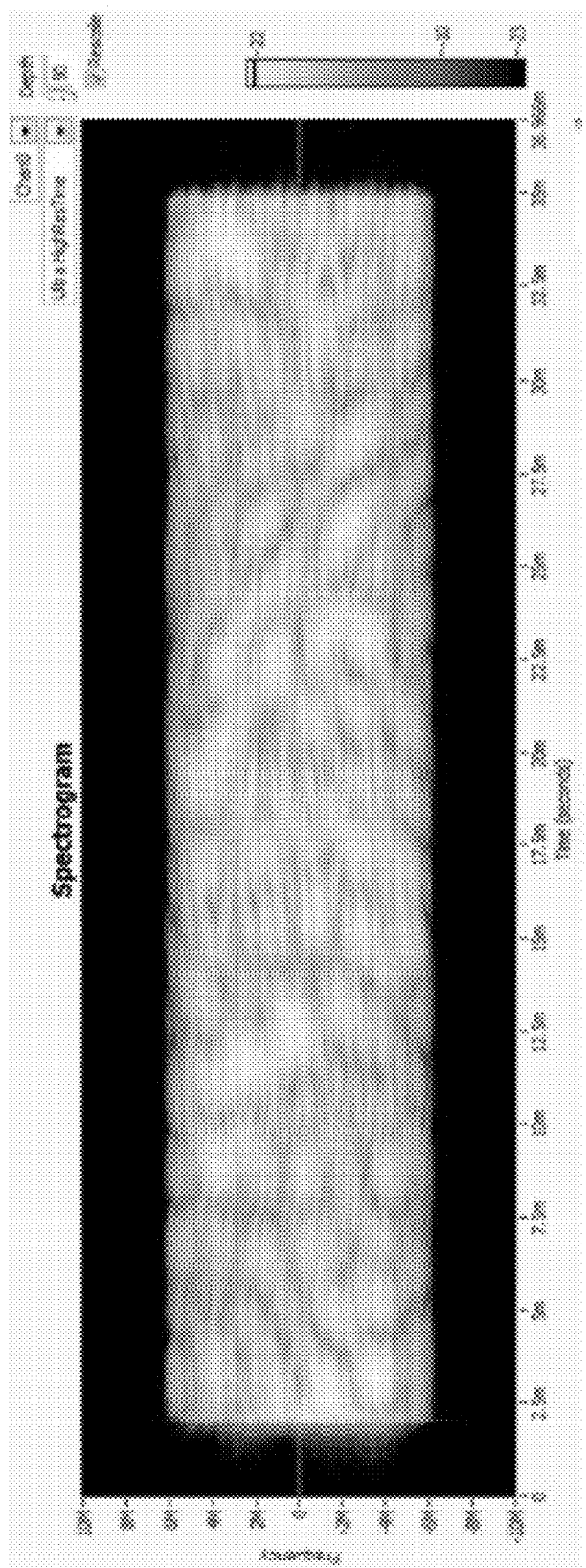
FIG. 5 shows the spectrogram of ETU-300 channel.

FIG. 5 shows spectrogram of the well-known 3GPP channel known as ETU-300, representing a complex multipath channel with 5 microsecond delay spread and 300 Hz Doppler. A spectrogram is the time-varying frequency response of the channel (similar to the time-varying impulse response but viewed in the frequency domain, with brighter areas representing lower attenuation (i.e., higher SNR) and darker areas representing greater attenuation (lower SNR).

Figure 6:
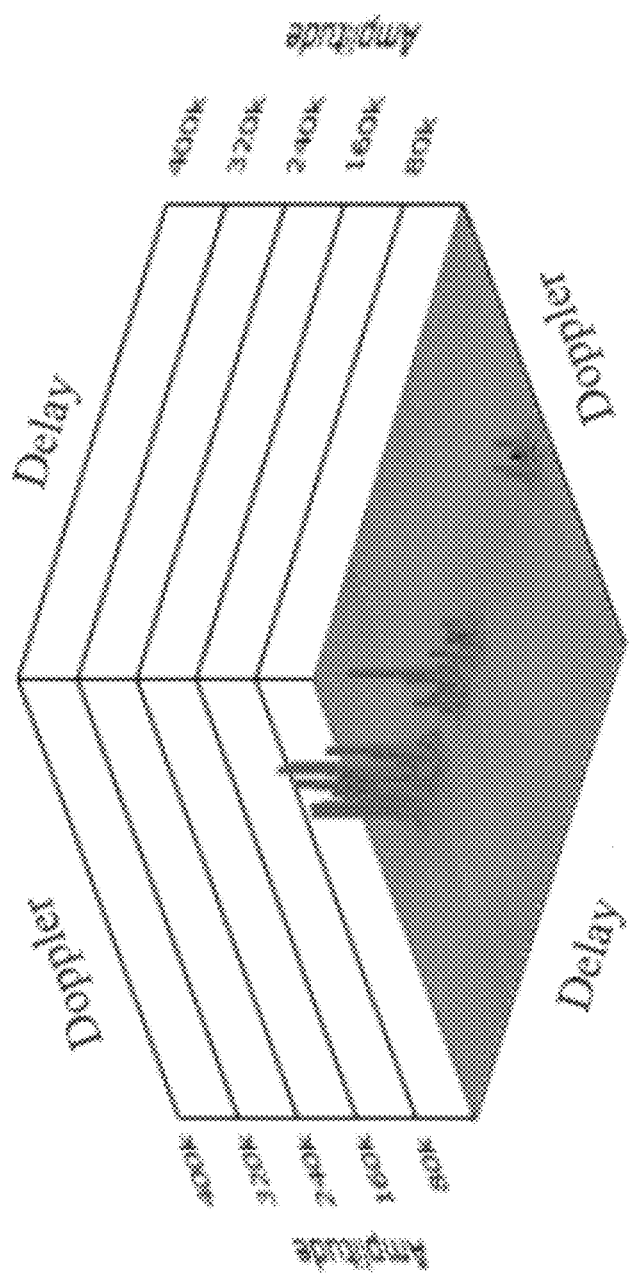
FIG. 6 shows a representation of the ETU-300 channel in the delay-Doppler domain.

FIG. 6 shows the corresponding delay-Doppler representation of the ETU-300 channel. As can be seen, the delay-Doppler representation is time independent over the period of observation and is compact.

An important feature revealed by these two figures is how compact the $(\tau,\nu)$ representation is compared to the $(\tau,t)$ representation. This has important implications for channel estimation, equalization and tracking as will be discussed later.

4. OTFS Basis Function Properties

Notice that while $h(\tau,\nu)$ is, in fact, time-invariant, the operation on s(t) is still time varying, as can be seen by the effect of the explicit complex exponential function of time in Eq. (2). The technical efforts in this paper are focused on developing a modulation scheme based on appropriate choice of orthogonal basis functions that render the effects of this channel truly time-invariant in the domain defined by those basis functions. Let us motivate those efforts with a high level outline of the structure of the proposed scheme here.

Let us consider a set of orthonormal basis functions $\phi_{\tau,\nu}(t)$ indexed by $\tau, \nu$ which are orthogonal to translation and modulation, i.e., $$\phi_{\tau,\nu}(t-t_0) = \phi_{\tau+t_0,\nu}(t)$$

$$e^{j2\pi\nu_0 t}\phi_{\tau,\nu}(t) = \phi_{\tau,\nu-\nu_0}(t) \quad (4)$$

and let us consider the transmitted signal as a superposition of these basis functions $$s(t) = \iint x(\tau,\nu)\phi_{\tau,\nu}(t)d\tau d\nu \quad (5)$$

where the weights $x(\tau,\nu)$ represent the information bearing signal to be transmitted. After the transmitted signal of (5) goes through the time varying channel of Eq. (2) we obtain a superposition of delayed and modulated versions of the basis functions, which due to (4) results in $$r(t) = \iint h(\tau,\nu)e^{j2\pi\nu(t-\tau)}s(t-\tau)d\nu d\tau \quad (6)$$
$$= \iint \phi_{\tau,\nu}(t)\{h(\tau,\nu)*x(\tau,\nu)\}d\tau d\nu$$

where * denotes two dimensional convolution. Eq. (6) can be thought of as a generalization of the derivation of the convolution relationship for linear time invariant systems, using one dimensional exponentials as basis functions. Notice that the term in brackets can be recovered at the receiver by matched filtering against each basis function $\phi_{\tau,\nu}(t)$. In this way a two dimensional channel relationship is established in the $(\tau,\nu)$ domain $y(\tau,\nu)=h(\tau,\nu)*x(\tau,\nu)$, where $y(\tau,\nu)$ is the receiver two dimensional matched filter output. Notice also, that in this domain the channel is described by a time invariant two-dimensional convolution.

Figure 7:
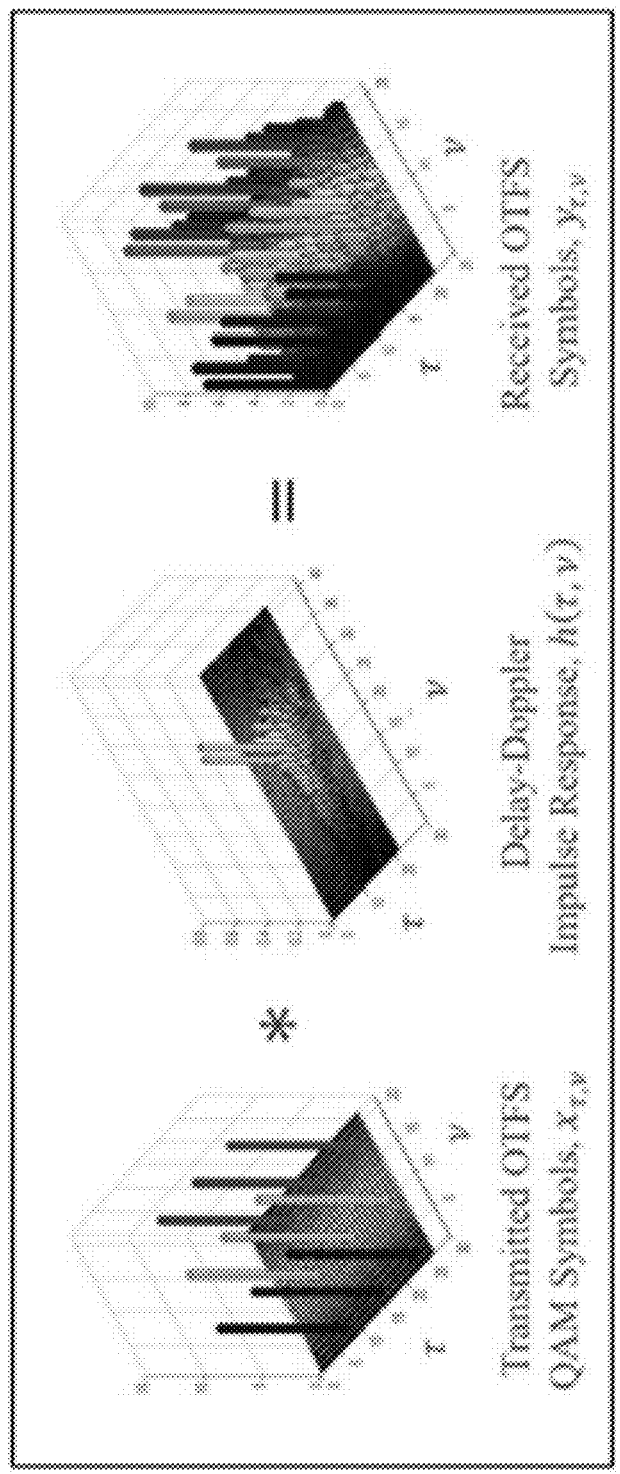
FIG. 7 shows an example that illustrates the process of 2D channel convolution.

FIG. 7 illustrates the 2D convolution relationship between the QAM symbols represented as impulses parameterized by the $(\tau,\nu)$ variables.

A final different interpretation of the wireless channel will also be useful in what follows. Let us consider s(t) and r(t) as elements of the Hilbert space of square integrable functions $\mathcal{H}$. Then Eq. (2) can be interpreted as a linear operator on $\mathcal{H}$ acting on the input s(t), parametrized by the impulse response $h(\tau,\nu)$, and producing the output r(t)

$$r = \Pi_h(s): s(t) \in \mathcal{H} \xrightarrow{\Pi_h(\cdot)} r(t) \in \mathcal{H} \quad (7)$$

Notice that although the operator is linear, it is not time-invariant. In the no Doppler case, i.e., if $h(\nu,\tau)=h(0,\tau)\delta(\nu)$, then Eq. (2) reduces to a time invariant convolution. Also notice that while for time invariant systems the impulse response is parameterized by one dimension, in the time varying case we have a two dimensional impulse response. While in the time invariant case the convolution operator produces a superposition of delays of the input s(t), (hence the parameterization is along the one dimensional delay axis) in the time varying case we have a superposition of delay-and-modulate operations as seen in Eq. (2) (hence the parameterization is along the two dimensional delay and Doppler axes). This is a major difference which makes the time varying representation non-commutative (in contrast to the convolution operation which is commutative), and complicates the treatment of time varying systems.

The important point of Eq. (7) is that the operator $\Pi_h(\cdot)$ can be compactly parametrized in a two dimensional space $h(\tau,\nu)$, providing an efficient, time invariant description of the channel. Typical channel delay spreads and Doppler spreads are a very small fraction of the symbol duration and subcarrier spacing of multicarrier systems.

In the mathematics literature, the representation of time varying systems of (2) and (7) is called the Heisenberg representation. It can actually be shown that every linear operator (7) can be parameterized by some impulse response as in (2).

5. OTFS Modulation

The time variation of the channel introduces significant difficulties in wireless communications related to channel acquisition, tracking, equalization and transmission of channel state information (CSI) to the transmit side for beamforming and MIMO processing. In this paper, we develop a modulation domain based on a set of orthonormal basis functions over which we can transmit the information symbols, and over which the information symbols experience a static, time invariant, two dimensional channel for the duration of the packet or burst transmission. In that modulation domain, the channel coherence time is increased by orders of magnitude and the issues associated with channel fading in the time or frequency domain in SISO or MIMO systems are significantly reduced Orthogonal Time Frequency Space (OTFS) modulation is comprised of a cascade of two transformations. The first transformation maps the two dimensional plane where the information symbols reside (and which we call the delay-Doppler plane) to the time frequency plane. The second one transforms the time frequency domain to the waveform time domain where actual transmitted signal is constructed. This transform can be thought of as a generalization of multicarrier modulation schemes.

6. OTFS Modulation Principle

Figure 8A:
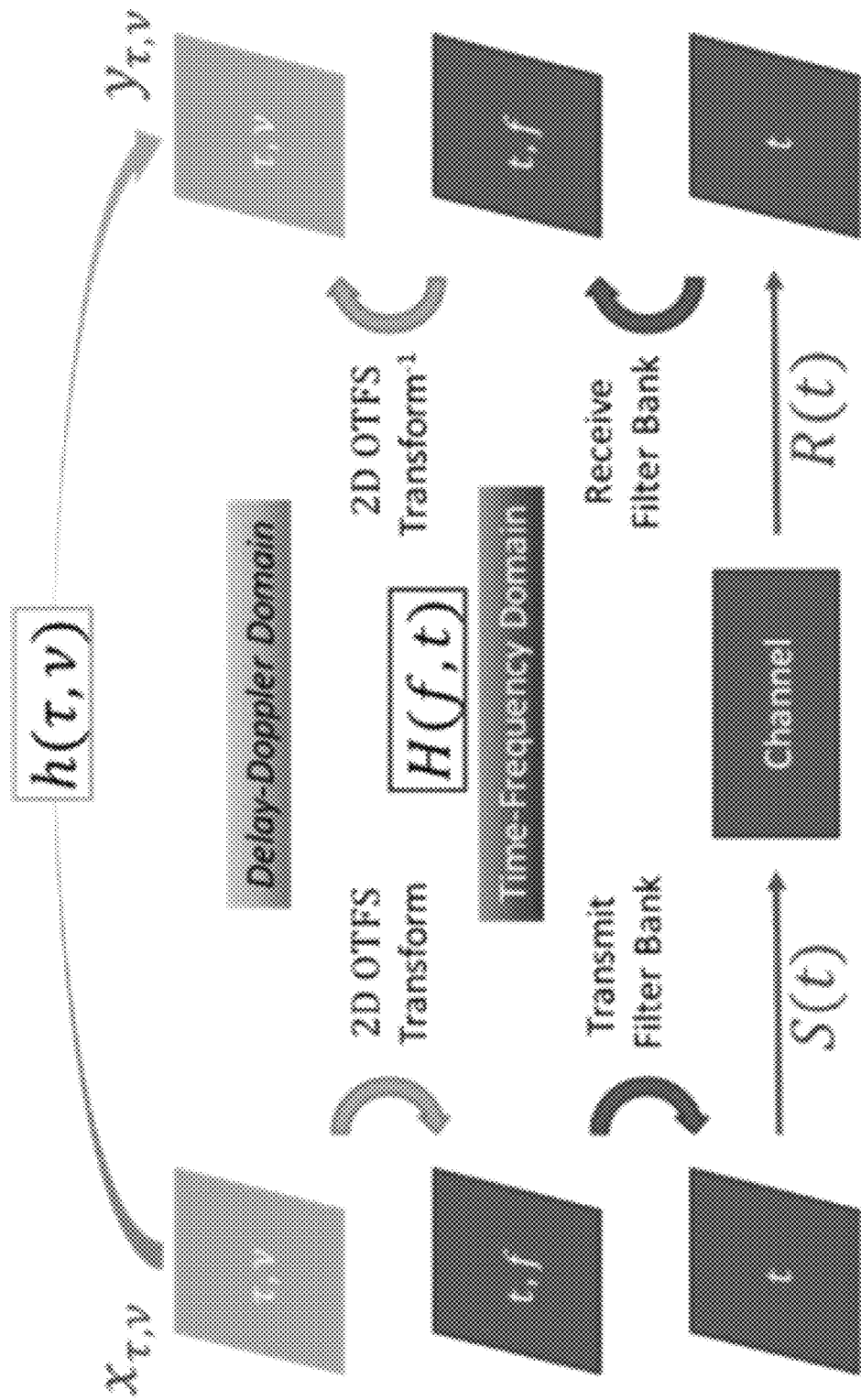
FIG. 8A shows a relationship between the time-frequency domain and the delay-Doppler domain.
Figure 8B:
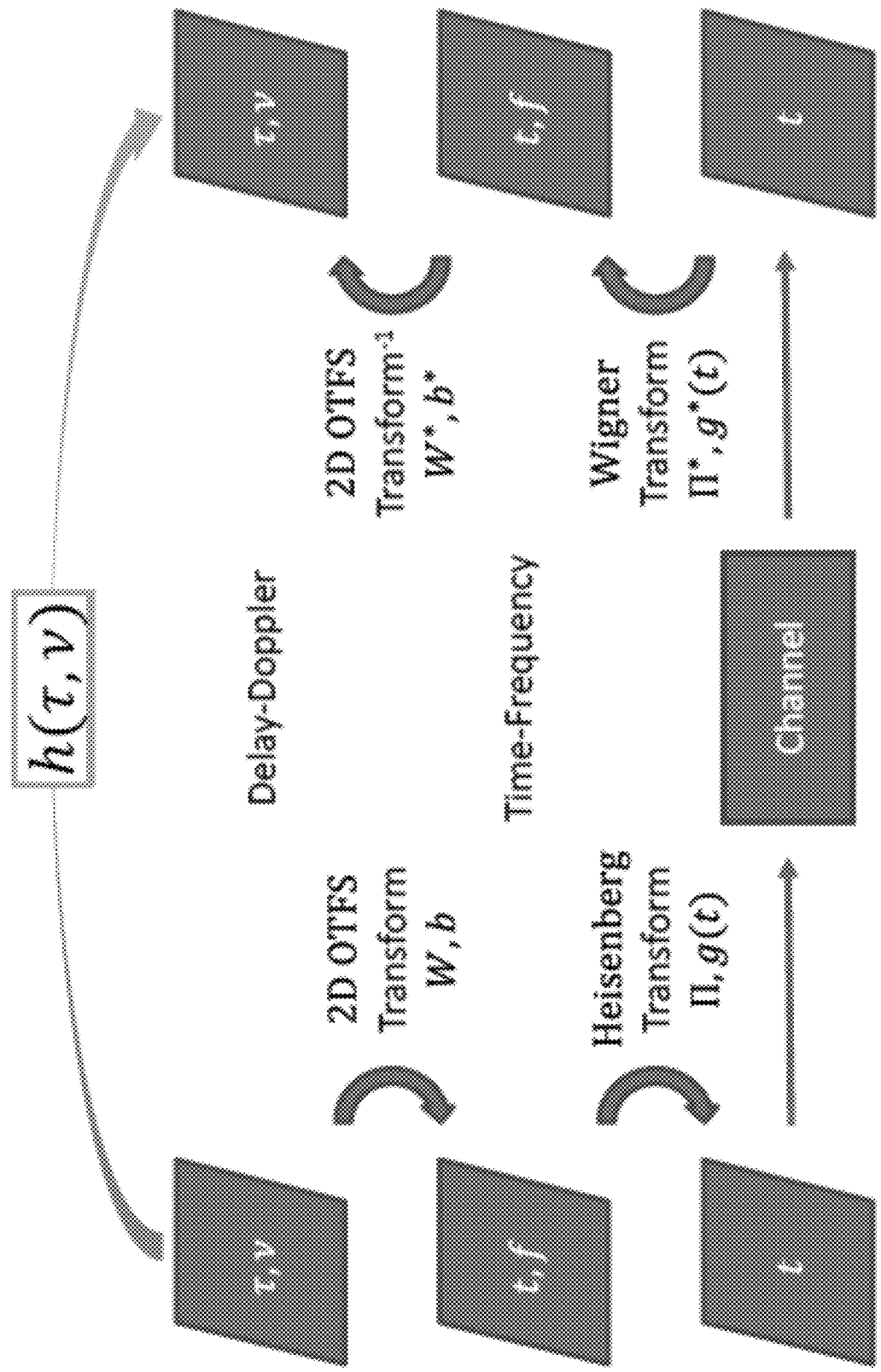
FIG. 8B shows levels of abstractions in performing operations in delay-Doppler domain.

FIG. 8A and FIG. 8B provide a pictorial view of the two transformations that constitute the OTFS modulation. It shows at a high level the signal processing steps that are required at the transmitter and receiver. It also includes the parameters that define each step, which will become apparent as we further expose each step. The processing steps depicted in FIG. 8A use filter banks on the transmit and receive side, while the processing steps depicted in FIG. 8B perform Heisenberg transform on the transmit side and a corresponding Wigner transform on the receive side. FIG. 8A can be thought of as a practical implementation of the mathematical transforms of FIG. 8B as will be apparent in what follows.

Figure 22:
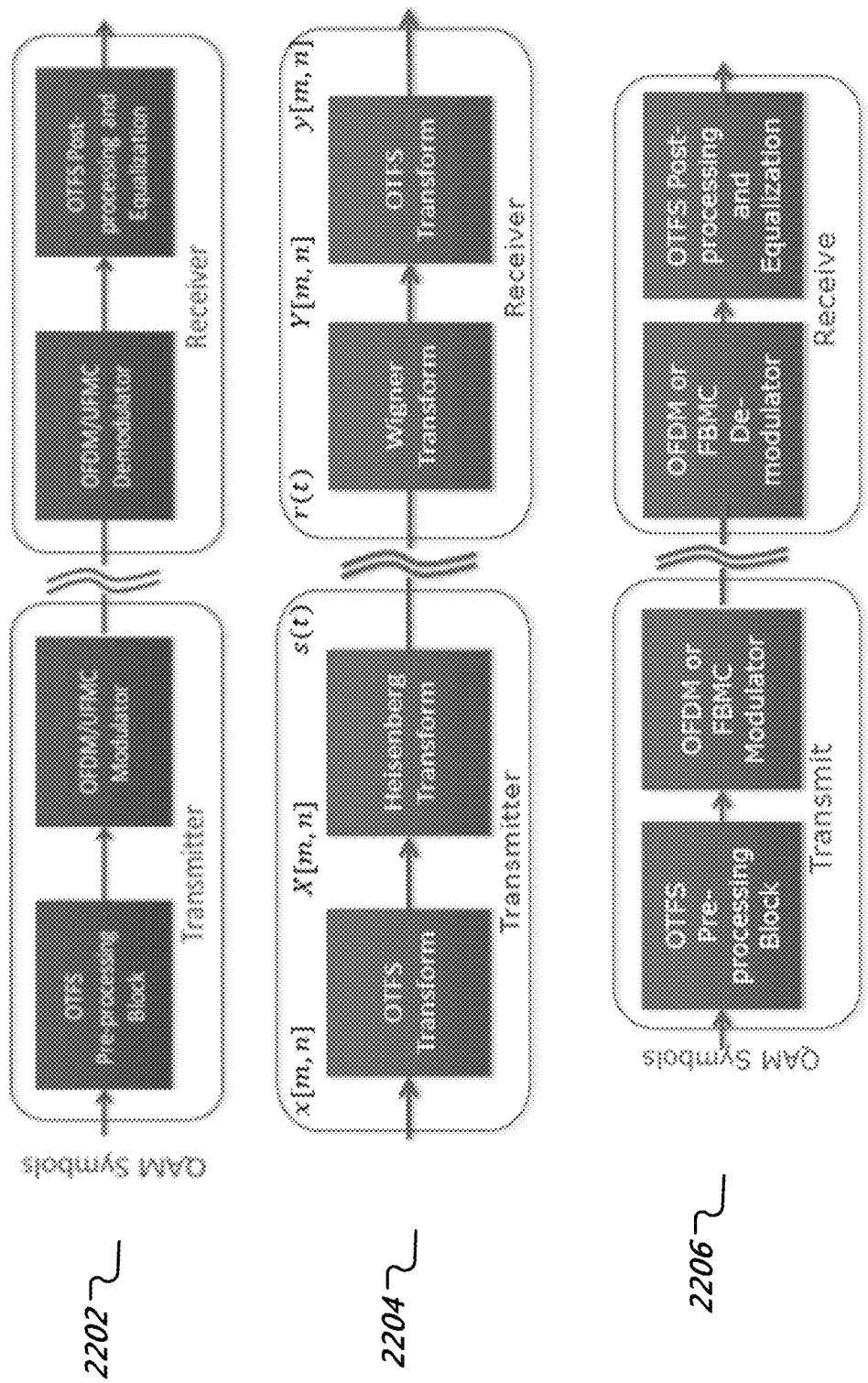
FIG. 22 is a block diagram representation of example architecture of an OTFS transceiver.

FIG. 22 shows block diagrams of the different processing stages at the transmitter and receiver and establishes the notation that will be used for the various signals. Scheme 2202 shows the use of an OFDM or UFMC (universal filtered multicarrier) technique on the transmit and receive sides. Scheme 2204 depicts the use of Heisenberg transform on the transmit side and Wigner transform on the receive side. Scheme 2206 depicts the use of an OFDM or FBMC (filter bank multi-carrier) modulator on the transmit side and an OFDM/FBMC demodulator on the receive side.

7. The OTFS Lattice

Figure 9:
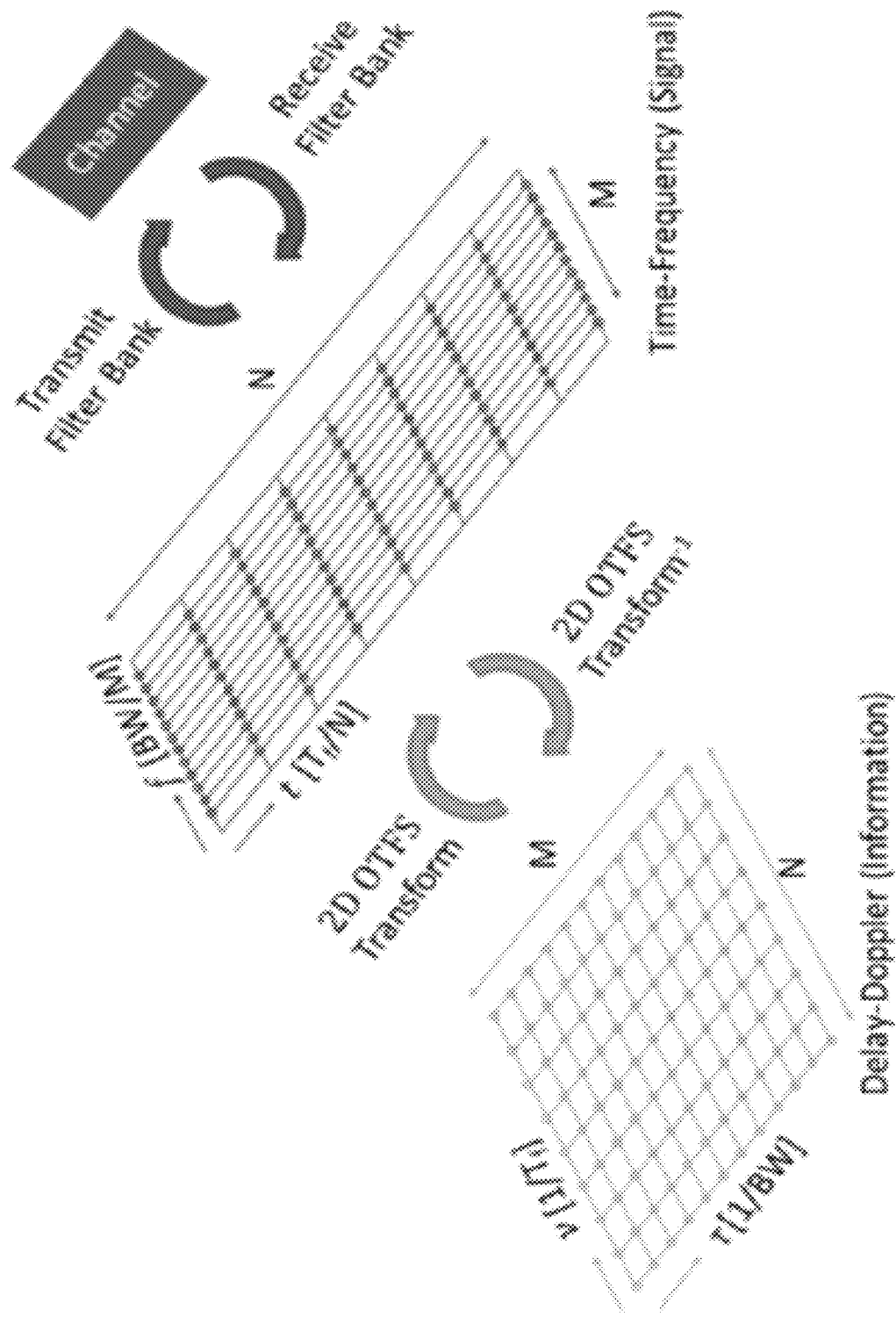
FIG. 9 shows an example of an OTFS lattice.

An alternate illustration of this construction is shown in FIG. 9. In this figure the OTFS QAM symbols reside on a grid or lattice of size N×M. The OTFS transform translates these QAM symbols to a lattice in the Time-Frequency plane of size M×N (note the swapping of axes—a result of the OTFS transform, as will be explained below). The OTFS Delay-Doppler lattice and the Time-Frequency multi-carrier lattice are related through a mathematical reciprocity relation intimately linked with the symplectic Fourier transform. In this Time-Frequency domain, one can think of the points along the frequency axis as the equivalent of an OFDM symbol, made up of M subcarriers. In the time dimension, we have the equivalent of N OFDM symbols, where N is a design parameter related to the Doppler spread of the channel.

Another observation worth noting in FIG. 9 is the fine resolution of the Delay-Doppler lattice. In the Delay-Doppler coordinate system, the delay or multipath resolution is given by the inverse of the bandwidth and the Doppler resolution is given by the inverse of the OTFS symbol time or observation time.

To summarize, in OTFS information symbols are indexed by points on a lattice or grid in the Delay-Doppler domain. Through the OTFS Transform each QAM symbol weights a 2D basis function defined in the Time-Frequency domain. The frequency domain samples at each time are transformed into time domain waveforms using filter banks.

8. The OTFS Information Domain

Figure 10:
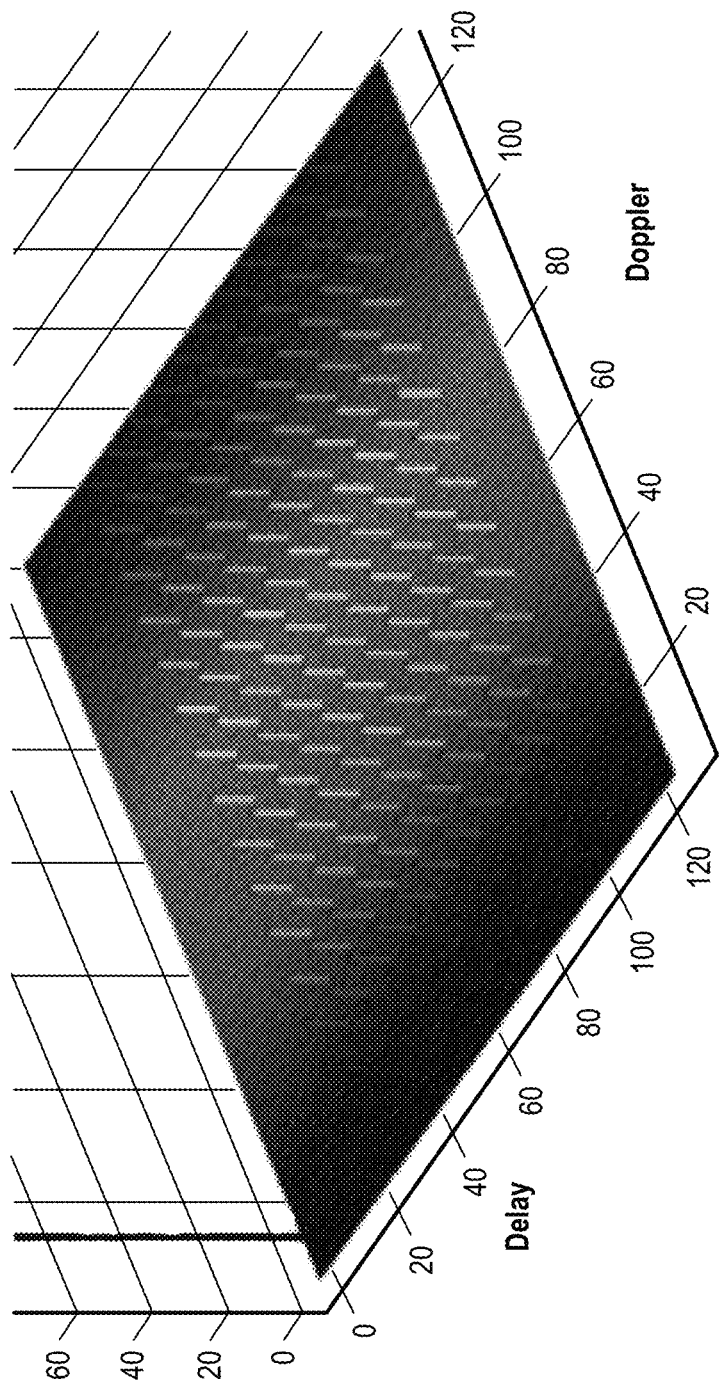
FIG. 10 shows an example 2D graph of OTFS information domain.

In OTFS, the information QAM symbols are arranged over an N×M grid on the Delay-Doppler plane, as shown in FIG. 10. The QAM symbols are represented by sparse impulses for illustrative purposes. One pilot substitutes one of the information QAM symbols for channel sounding and acquisition. The pilot power can be boosted since the energy of all symbols is spread evenly throughout the Time-Frequency domain. An unused rectangle surrounds the pilot to allow for interference-free channel estimation at the receiver. For multiple streams/antennas, additional pilots would be inserted along the empty strip shown on the top part of the figure.

9. Heisenberg Transform

Our purpose in this section is to construct an appropriate transmit waveform which carries information provided by symbols on a grid in the time-frequency plane. Our intent in developing this modulation scheme is to transform the channel operation to an equivalent operation on the time-frequency domain with two important properties The channel is orthogonalized on the time-frequency grid.

The channel time variation is simplified on the time-frequency grid and can be addressed with an additional transform.

Fortunately, these goals can be accomplished with a scheme that is very close to well-known multicarrier modulation techniques, as explained next. We will start with a general framework for multicarrier modulation and then give examples of OFDM and multicarrier filter bank implementations.

Let us consider the following components of a time frequency modulation:

A lattice or grid on the time frequency plane, that is a sampling of the time axis with sampling period T and the frequency axis with sampling period $\Delta f$.

$$\Lambda = \{(nT, m\Delta f), n, m \in \mathbb{Z}\} \quad (8)$$

A packet burst with total duration NT secs and total bandwidth M$\Delta$f Hz

A set of modulation symbols X[n, m], n=0, ..., N−1, m=0, ..., M−1 we wish to transmit over this burst A transmit pulse $g_{tr}(t)$ with the property of being orthogonal to translations by T and modulations by $\Delta f$ $$\langle g_{tr}(t), g_{tr}(t-nT)e^{j2\pi m\Delta f(t-nT)} \rangle = \quad (9)$$
$$\int g_{tr}^*(t) g_r(t-nT)e^{j2\pi m\Delta f(t-nT)} dt = \delta(m)\delta(n)$$

This orthogonality property may be required if the receiver uses the same pulse as the transmitter. We will generalize it to a bi-orthogonality property in later sections.

Given the above components, the time-frequency modulator is a Heisenberg operator on the lattice $\Lambda$, that is, it maps the two dimensional symbols X[n. m] to a transmitted waveform, via a superposition of delay-and-modulate operations on the pulse waveform $g_{tr}(t)$ $$s(t) = \sum_{m=-M/2}^{M/2-1} \sum_{n=0}^{N-1} X[n, m]g_{tr}(t - nT)e^{j2\pi m\Delta f(t-nT)} \quad (10)$$

More formally $$x = \Pi_X(g_{tr}): \ g_{tr}(t) \in \mathcal{H} \xrightarrow{\Pi_X(\cdot)} y(t) \in \mathcal{H} \quad (11)$$

where we denote by $\Pi_X(\cdot)$ the "discrete" Heisenberg operator, parameterized by discrete values X[n, m].

Notice the similarity of (11) with the channel equation (7). This is not by coincidence, but rather because we apply a modulation effect that mimics the channel effect, so that the end effect of the cascade of modulation and channel is more tractable at the receiver. It is not uncommon practice; for example, linear single carrier modulation (aimed at time invariant channels) is in its simplest form a convolution of the transmit pulse g(t) with a delta train of QAM information symbols sampled at the Baud rate T.

$$s(t) = \sum_{n=0}^{N-1} X[n]g(t - nT) \quad (12)$$

In our case, aimed at the time varying channel, we convolve-and-modulate the transmit pulse (c.f. the channel Eq. (2)) with a two dimensional delta train which samples the time frequency domain at a certain Baud rate and subcarrier spacing.

The sampling rate in the time-frequency domain is related to the bandwidth and time duration of the pulse $g_{tr}(t)$ namely its time-frequency localization. In order for the orthogonality condition of (9) to hold for a frequency spacing $\Delta f$, the time spacing must be $T \geq 1/\Delta f$. The critical sampling case of $T=1/\Delta f$ is generally not practical and refers to limiting cases, for example to OFDM systems with cyclic prefix length equal to zero or to filter banks with $g_{tr}(t)$ equal to the ideal Nyquist pulse.

Some examples are now in order:

Example 1: OFDM Modulation: Let us consider an OFDM system with M subcarriers, symbol length $T_{OFDM}$, cyclic prefix length $T_{CP}$ and subcarrier spacing $1/T_{OFDM}$. If we substitute in Equation (10) symbol duration $T=T_{OFDM}+$CP, number of symbols N=1, subcarrier spacing $\Delta f=1/T_{OFDM}$ and $g_{tr}(t)$ a square window that limits the duration of the subcarriers to the symbol length T $$g_{tr}(t) = \begin{cases} 1/\sqrt{T - T_{CP}}, & -T_{CP} < t < T - T_{CP} \\ 0, & \text{else} \end{cases} \quad (13)$$

then we obtain the OFDM formula $$x(t) = \sum_{m=-M/2}^{M/2-1} X[n, m]g_{tr}(t)e^{j2\pi m\Delta ft} \quad (14)$$

Strictly speaking, the pulse of Eq. (13) is not orthonormal but is orthogonal to the receive filter where the CP samples are discarded.

Example 2: Single Carrier Modulation: Equation (10) reduces to single carrier modulation if we substitute M=1 subcarrier, T equal to the Baud period and $g_{tr}(t)$ equal to a square root raised cosine Nyquist pulse.

Example 3: Multicarrier Filter Banks (MCFB): Equation (10) describes a MCFB if $g_{tr}(t)$ is a square root raised cosine Nyquist pulse with excess bandwidth $\alpha$, T is equal to the Baud period and $\Delta f=(1+\alpha)/T$.

Expressing the modulation operation as a Heisenberg transform as in Eq. (11) may be counterintuitive. We usually think of modulation as a transformation of the modulation symbols X[m, n] to a transmit waveform s(t). The Heisenberg transform instead, uses X[m, n] as weights/parameters of an operator that produces s(t) when applied to the prototype transmit filter response $g_{tr}(t)$—c.f. Eq. (11). While counterintuitive, this formulation is useful in pursuing an abstraction of the modulation-channel-demodulation cascade effects in a two dimensional domain where the channel can be described as time invariant.

We next turn our attention to the processing on the receiver side needed to go back from the waveform domain to the time-frequency domain. Since the received signal has undergone the cascade of two Heisenberg transforms (one by the modulation effect and one by the channel effect), it is natural to inquire what the end-to-end effect of this cascade is. The answer to this question is given by the following result:

Proposition 1: Let two Heisenberg transforms as defined by Eqs. (7), (2) be parametrized by impulse responses $h_1(\tau,\nu)$, $h_2(\tau,\nu)$ and be applied in cascade to a waveform $g(t) \in \mathcal{H}$. Then $$\Pi_{h_2}(\Pi_{h_1}(g(t))) = \Pi_h(g(t)) \quad (15)$$

where $h(\tau,\nu) = h_2(\tau,\nu) \odot h_1(\tau,\nu)$ is the "twisted" convolution of $h_1(\tau,\nu)$, $h_2(\tau,\nu)$ defined by the following convolve-and-modulate operation $$h(\tau,\nu) = \iint h_2(\tau',\nu')h_1(\tau-\tau',\nu-\nu')e^{j2\pi\nu'(\tau-\tau')}d\tau'd\nu' \quad (16)$$

Applying the above result to the cascade of the modulation and channel Heisenberg transforms of (11) and (7), we can show that the received signal is given by the Heisenberg transform $$r(t) = \Pi_f(g_{tr}(t)) + v(t) = \iint f(\tau,\nu)e^{j2\pi\nu(t-\tau)}g_{tr}(t-\tau)d\nu d\tau + v(t) \quad (17)$$

where v(t) is additive noise and $f(\tau,\nu)$, the impulse response of the combined transform, is given by the twisted convolution of X[n, m] and $h(\tau,\nu)$ $$f(\tau, \nu) = \\ h(\tau, \nu) \odot X[n, m] = \sum_{m=-M/2}^{M/2-1} \sum_{n=0}^{N-1} X[n, m]h(\tau - nT, \nu - m\Delta f)e^{j2\pi(\nu-m\Delta f)nT} \quad (18)$$

This result can be considered an extension of the single carrier modulation case, where the received signal through a time invariant channel is given by the convolution of the QAM symbols with a composite pulse, that pulse being the convolution of the transmitter pulse and the channel impulse response.

With this result established we are ready to examine the receiver processing steps.

10. Receiver Processing and Wigner Transform

Figure 11:
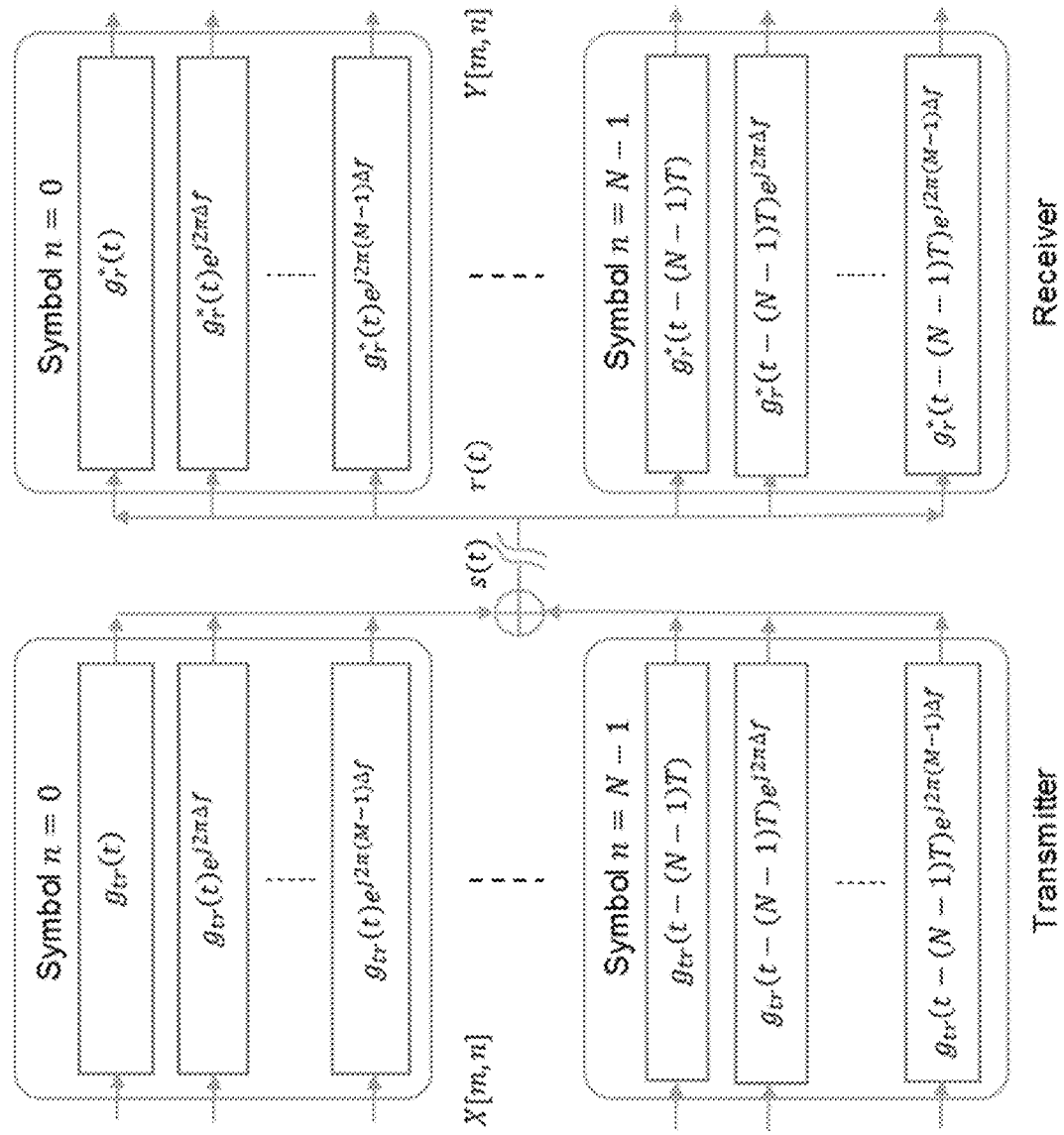
FIG. 11 shows an example of a conceptual Implementation of the Heisenberg Transform in the transmitter and the Wigner Transform in the receiver.

Typical communication system design dictates that the receiver performs a matched filtering operation, taking the inner product of the received waveform with the transmitter pulse, appropriately delayed or otherwise distorted by the channel. In our case, we have used a collection of delayed and modulated transmit pulses, and we need to perform a matched filter on each one of them. FIG. 11 provides a conceptual view of this processing. On the transmitter, we modulate a set of M subcarriers for each symbol we transmit, while on the receiver we perform matched filtering on each of those subcarrier pulses. We define a receiver pulse $g_r(t)$ and take the inner product with a collection of delayed and modulated versions of it. The receiver pulse $g_r(t)$ is in many cases identical to the transmitter pulse, but we keep the separate notation to cover some cases where it is not (most notably in OFDM where the CP samples have to be discarded).

While this approach will yield the sufficient statistics for data detection in the case of an ideal channel, a concern can be raised here for the case of non-ideal channel effects. In this case, the sufficient statistics for symbol detection are obtained by matched filtering with the channel-distorted, information-carrying pulses (assuming that the additive noise is white and Gaussian). In many well designed multicarrier systems however (e.g., OFDM and MCFB), the channel distorted version of each subcarrier signal is only a scalar version of the transmitted signal, allowing for a matched filter design that is independent of the channel and uses the original transmitted subcarrier pulse. We will make these statements more precise shortly and examine the required conditions for this to be true.

FIG. 11 is a block diagram of a conceptual example of an implementation of the Heisenberg Transform in the Transmitter and the Wigner Transform in the Receiver FIG. 11 is only a conceptual illustration and does not point to the actual implementation of the receiver. Typically this matched filtering is implemented in the digital domain using an FFT or a polyphase transform for OFDM and MCFB respectively. In this document, we are rather more interested in the theoretical understanding of this modulation. To this end, we will consider a generalization of this matched filtering by taking the inner product $\langle g_r(t-\tau)e^{j2\pi\nu(t-\tau)}, r(t)\rangle$ of the received waveform with the delayed and modulated versions of the receiver pulse for arbitrary time and frequency offset $(\tau,\nu)$. While this is not a practical implementation, it allows us to view the operations of FIG. 11 as a two dimensional sampling of this more general inner product.

Let us define the inner product $$A_{g_r,r}(\tau,\nu)=\langle g_r(t-\tau)e^{j2\pi\nu(t-\tau)},r(t)\rangle=\int g_r^*(t-\tau)e^{j2\pi\nu(t-\tau)}r(t)\,dt \quad (19)$$

The function $A_{g_r,r}(\tau,\nu)$ is known as the cross-ambiguity function in the radar and math communities and yields the matched filter output if sampled at $\tau=nT$, $\nu=m\Delta f$ (on the lattice $\Lambda$), i.e., $$Y[n,m]=A_{g_r,r}(\tau,\nu)|_{\tau=nT,\nu=m\Delta f} \quad (20)$$

In the math community, the ambiguity function is related to the inverse of the Heisenberg transform, namely the Wigner transform. FIG. 11 provides an intuitive feel for that, as the receiver appears to invert the operations of the transmitter. More formally, if we take the cross-ambiguity or the transmit and receive pulses $A_{g_r,g_{tr}}(\tau,\nu)$, and use it as the impulse response of the Heisenberg operator, then we obtain the orthogonal cross-projection operator $$\prod\nolimits_{A_{g_r,g_{tr}}}(y(t)) = g_{tr}(t)\langle g_r(t), y(t)\rangle.$$

In words, the coefficients that come out of the matched filter, if used in a Heisenberg representation, will provide the best approximation to the original y(t) in the sense of minimum square error.

The key question here is what the relationship is between the matched filter output Y[n, m] (or more generally $Y(\tau,\nu)$) and the transmitter input X[n, m]. We have already established in (17) that the input to the matched filter r(t) can be expressed as a Heisenberg representation with impulse response $f(\tau,\nu)$ (plus noise). The output of the matched filter then has two contributions $$Y(\tau,\nu)=A_{g_r,r}(\tau,\nu)=A_{g_r,\Pi_f(g_{tr})+\nu]}(\tau,\nu)=A_{g_r,\Pi_f(g_{tr})}(\tau,\nu)+A_{g_r,\nu}(\tau,\nu) \quad (21)$$

The last term is the contribution of noise, which we will denote $V(\tau,\nu)=A_{g_r,\nu}(\tau,\nu)$. The first term on the right hand side is the matched filter output to the (noiseless) input comprising of a superposition of delayed and modulated versions of the transmit pulse. We next establish that this term can be expressed as the twisted convolution of the two dimensional impulse response $f(\tau,\nu)$ with the cross-ambiguity function (or two dimensional cross correlation) of the transmit and receive pulses.

The following theorem summarizes the key result.

Theorem 1: (Fundamental time-frequency domain channel equation). If the received signal can be expressed as $$\Pi_f(g_{tr}(t))=\iint f(\tau,\nu)e^{j2\pi\nu(t-\tau)}g_{tr}(t-\tau)\,d\nu\,d\tau \quad (22)$$

Then the cross-ambiguity of that signal with the receive pulse $g_{tr}(t)$ can be expressed as $$A_{g_r,\Pi_f(g_{tr})}(\tau,\nu)=f(\tau,\nu)\odot A_{g_r,g_{tr}}(\tau,\nu) \quad (23)$$

Proof: See below.

Recall from (18) that $f(\tau,\nu)=h(\tau,\nu)\odot X[n, m]$, that is, the composite impulse response is itself a twisted convolution of the channel response and the modulation symbols.

Substituting $f(\tau,\nu)$ from (18) into (21) we obtain the end-to-end channel description in the time frequency domain $$Y(\tau, \nu) = A_{g_r,\Pi_f(g_{tr})}(\tau, \nu) + V(\tau, \nu) \quad (24)$$
$$= h(\tau, \nu) \odot X[n, m] \odot A_{g_r,g_{tr}}(\tau, \nu) + V(\tau, \nu)$$

where $V(\tau,\nu)$ is the additive noise term. Eq. (24) provides an abstraction of the time varying channel on the time-frequency plane. It states that the matched filter output at any time and frequency point $(\tau,\nu)$ is given by the delay-Doppler impulse response of the channel twist-convolved with the impulse response of the modulation operator twist-convolved with the cross-ambiguity (or two dimensional cross correlation) function of the transmit and receive pulses.

Evaluating Eq. (24) on the lattice $\Lambda$ we obtain the matched filter output modulation symbol estimates $$\hat{X}[m,n]=Y[n,m]=Y(\tau,\nu)|_{\tau=nT,\nu=m\Delta f} \quad (25)$$

In order to get more intuition on Equations (24), (25) let us first consider the case of an ideal channel, i.e., $h(\tau,\nu)=\delta(\tau)\delta(\nu)$. In this case by direct substitution we get the convolution relationship $$Y[n, m] = \sum_{m'=-M/2}^{M/2-1} \sum_{n'=0}^{N-1} X[n', m'] A_{g_r, g_{tr}}((n-n')T, (m-m')\Delta f) + V[m, n] \quad (26)$$

In order to simplify Eq. (26) we will use the orthogonality properties of the ambiguity function. Since we use a different transmit and receive pulses we will modify the orthogonality condition on the design of the transmit pulse we stated in (9) to a bi-orthogonality condition $$\langle g_{tr}(t), g_r(t - nT)e^{j2\pi m\Delta f(t-nT)} \rangle = \int g_{tr}^*(t) g_r(t - nT) e^{j2\pi m\Delta f(t-nT)} dt = \delta(m)\delta(n) \quad (27)$$

Under this condition, only one term survives in (26) and we obtain $$Y[n,m] = X[n,m] + V[n,m] \quad (28)$$

where V[n, m] is the additive white noise. Eq. (28) shows that the matched filter output does recover the transmitted symbols (plus noise) under ideal channel conditions. Of more interest of course is the case of non-ideal time varying channel effects. We next show that even in this case, the channel orthogonalization is maintained (no intersymbol or intercarrier interference), while the channel complex gain distortion has a closed form expression.

The following theorem summarizes the result as a generalization of (28).

Theorem 2: (End-to-end time-frequency domain channel equation):

If $h(\tau,\nu)$ has finite support bounded by $(\tau_{max}, \nu_{max})$ and if $A_{g_r,g_{tr}}(\tau,\nu)=0$ for $\tau \in (nT-\tau_{max}, nT+\tau_{max})$, $\nu \in (m\Delta f-\nu_{max}, m\Delta f+\nu_{max})$, that is, the ambiguity function bi-orthogonality property of (27) is true in a neighborhood of each grid point $(m\Delta f, nT)$ of the lattice $\Lambda$ at least as large as the support of the channel response $h(\tau,\nu)$, then the following equation holds $$Y[n, m] = H[n, m] X[n, m] \quad (29)$$

$$H[n, m] = \int \int h(\tau, \nu) e^{j2\pi\nu nT} e^{-j2\pi(\nu+m\Delta f)\tau} d\nu d\tau$$

If the ambiguity function is only approximately bi-orthogonal in the neighborhood of $\Lambda$ (by continuity), then (29) is only approximately true Q Proof: See below.

Eq. (29) is a fundamental equation that describes the channel behavior in the time-frequency domain. It is the basis for understanding the nature of the channel and its variations along the time and frequency dimensions.

Some observations are now in order on Eq. (29). As mentioned before, there is no interference across X[n, m] in either time n or frequency m.

The end-to-end channel distortion in the modulation domain is a (complex) scalar that needs to be equalized If there is no Doppler, i.e. $h(\tau,\nu)=h(\tau,0)\delta(\nu)$, then Eq. (29) becomes $$Y[n, m] = X[n, m] \int h(\tau, 0) e^{-j2\pi m\Delta f\tau} d\tau \quad (30)$$
$$= X[n, m] H(0, m\Delta f)$$

which is the well-known multicarrier result, that each subcarrier symbol is multiplied by the frequency response of the time invariant channel evaluated at the frequency of that subcarrier.

If there is no multipath, i.e. $h(\tau,\nu)=h(0,\nu)\delta(\tau)$, then Eq. (29) becomes $$Y[n,m] = X[n,m] \int h(\nu,0) e^{j2\pi\nu nT} d\tau \quad (31)$$

Notice that the fading each subcarrier experiences as a function of time nT has a complicated expression as a weighted superposition of exponentials. This is a major complication in the design of wireless systems with mobility like LTE; it necessitates the transmission of pilots and the continuous tracking of the channel, which becomes more difficult the higher the vehicle speed or Doppler bandwidth is.

Example 3: (OFDM modulation). In this case the fundamental transmit pulse is given by (13) and the fundamental receive pulse is $$g_r(t) = \begin{cases} 0 & -T_{CP} < t < 0 \\ \frac{1}{\sqrt{T-T_{CP}}} & 0 < t < T - T_{CP} \\ 0 & \text{else} \end{cases} \quad (32)$$

i.e., the receiver zeroes out the CP samples and applies a square window to the symbols comprising the OFDM symbol. It is worth noting that in this case, the bi-orthogonality property holds exactly along the time dimension.

Figure 12:
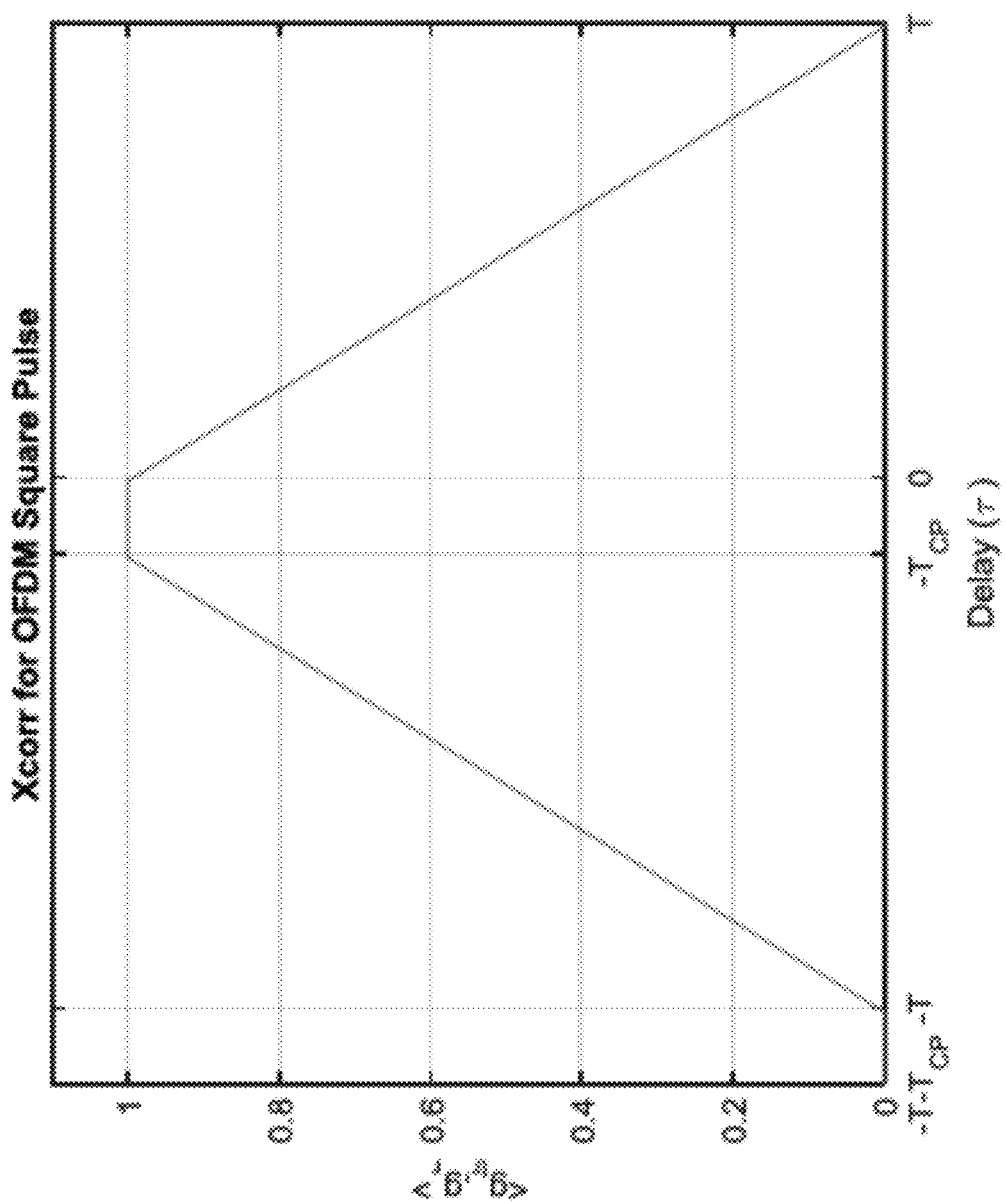
FIG. 12 shows the cross correlation between the transmit and receive pulses.

FIG. 12 shows the cross correlation between the transmit and receive pulses of (13) and (32). Notice that the cross correlation is exactly equal to one and zero in the vicinity of zero and $\pm T$ respectively, while holding those values for the duration of $T_{CP}$. Hence, as long as the support of the channel on the time dimension is less than $T_{CP}$ the bi-orthogonality condition is satisfied along the time dimension. Across the frequency dimension the condition is only approximate, as the ambiguity takes the form of a sinc function as a function of frequency and the nulls are not identically zero for the whole support of the Doppler spread.

Example 4: (MCFB modulation). In the case of multicarrier filter banks $g_{tr}(t)=g_r(t)=g(t)$. There are several designs for the fundamental pulse g(t). A square root raised cosine pulse provides good localization along the frequency dimension at the expense of less localization along the time dimension. If T is much larger than the support of the channel in the time dimension, then each subchannel sees a flat channel and the bi-orthogonality property holds approximately.

In summary, in this section we described the one of the two transforms that define OTFS. We explained how the transmitter and receiver apply appropriate operators on the fundamental transmit and receive pulses and orthogonalize the channel according to Eq. (29). We further saw via examples how the choice of the fundamental pulse affect the time and frequency localization of the transmitted modulation symbols and the quality of the channel orthogonalization that is achieved. However, Eq. (29) shows that the channel in this domain, while free of intersymbol interference, suffers from fading across both the time and the frequency dimensions via a complicated superposition of linear phase factors.

In the next section we will start from Eq. (29) and describe the second transform that defines OTFS; we will show how that transform defines an information domain where the channel does not fade in either dimension.

11. The 2D OTFS Transform

Figure 13:
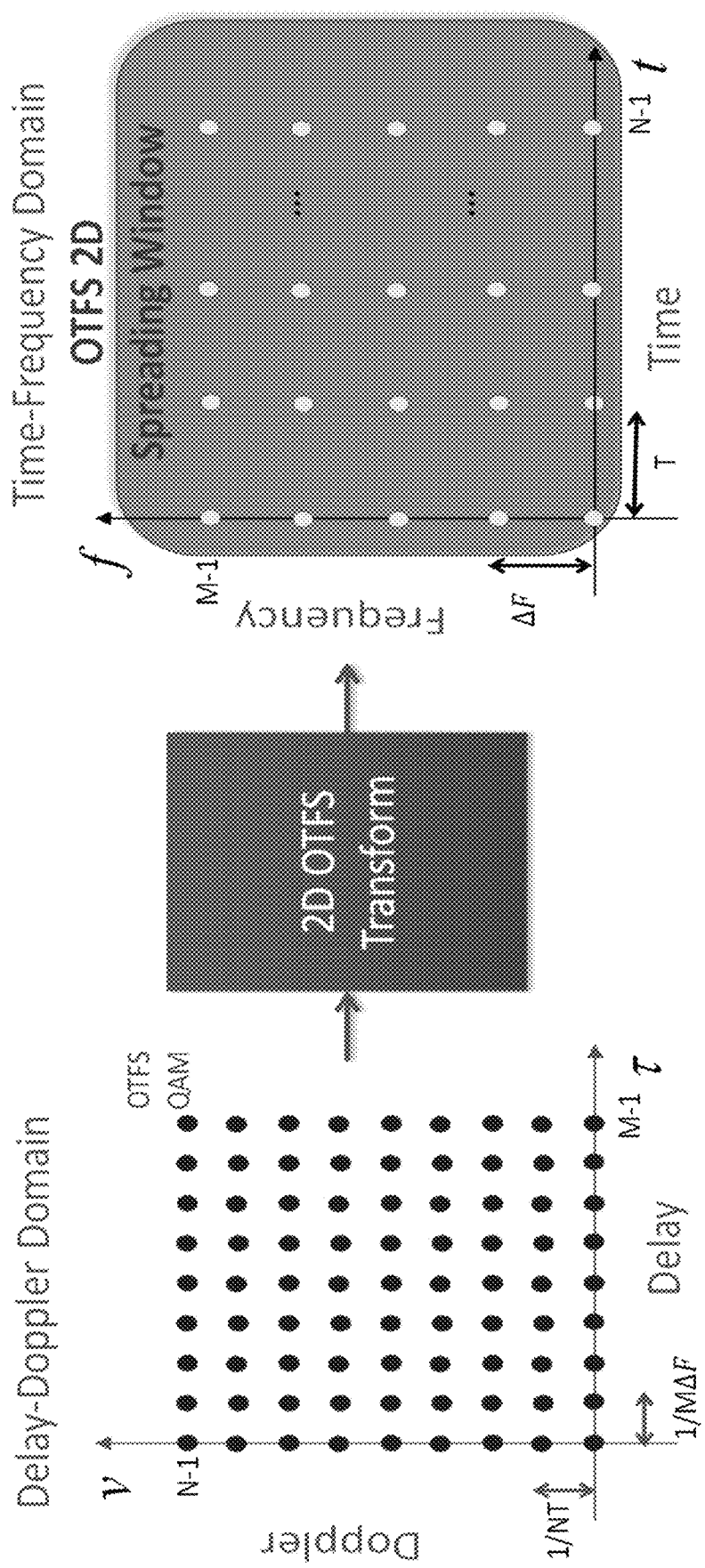
FIG. 13 pictorially depicts the process of 2D OTFS transform.

In this section, we describe the various components of OTFS modulation, beginning with the 2D OTFS transform. OTFS QAM symbols are defined over a grid in the Delay-Doppler domain. As described previously, the 2D OTFS transform translates every point on this Delay-Doppler plane into a corresponding basis function that covers the entire Time-Frequency plane. Thus OTFS QAM symbols are transformed onto a grid representing sample points in the Time-Frequency domain and the energy of each QAM symbol is spread over the Time-Frequency domain. Recall that this is the same grid over which OFDM QAM symbols (or any of its filtered multi-carrier variants) are defined. FIG. 13 pictorially depicts the process of 2D OTFS transform.

Notice that the time-frequency response H[n, m] in (29) is related to the channel delay-Doppler response h(τ,ν) by an expression that resembles a Fourier transform. However, there are two important differences: (i) the transform is two dimensional (along delay and Doppler) and (ii) the exponentials defining the transforms for the two dimensions have opposing signs. Despite these difficulties, Eq. (29) points in the direction of using complex exponentials as basis functions on which to modulate the information symbols; and only transmit on the time-frequency domain the superposition of those modulated complex exponential bases. This is the approach we will pursue in this section.

This is akin to the SC-FDMA modulation scheme, where in the frequency domain we transmit a superposition of modulated exponentials (the output of the DFT preprocessing block). The reason we pursue this direction is to exploit Fourier transform properties and translate a multiplicative channel in one Fourier domain to a convolution channel in the other Fourier domain.

Given the difficulties of Eq. (29) mentioned above we need to develop a suitable version of Fourier transform and associated sampling theory results. Let us start with the following definitions:

Definition 1: Symplectic Discrete Fourier Transform: Given a square summable two dimensional sequence X[m, n]∈ℂ (Λ) we define $$x(\tau, \nu) = \sum_{m,n} X[n, m] e^{-j2\pi(\nu nT - \tau m \Delta f)} \quad (33)$$

$$\triangleq SDFT(X[n, m])$$

Notice that the above 2D Fourier transform (known as the Symplectic Discrete Fourier Transform in the math community) differs from the more well known Cartesian Fourier transform in that the exponential functions across each of the two dimensions have opposing signs. This is necessary in this case, as it matches the behavior of the channel equation.

Further notice that the resulting x(τ,ν) is periodic with periods (1/Δf, 1/T). This transform defines a new two dimensional plane, which we will call the delay-Doppler plane, and which can represent a max delay of 1/Δf and a max Doppler of 1/T. A one dimensional periodic function is also called a function on a circle, while a 2D periodic function is called a function on a torus (or donut). In this case x(τ,ν) is defined on a torus Z with circumferences (dimensions) (1/Δf, 1/T).

The periodicity of x(τ,ν) (or sampling rate of the time-frequency plane) also defines a lattice on the delay-Doppler plane, which we will call the reciprocal lattice $$\Lambda^{\perp} = \left\{ \left( m \frac{1}{\Delta f}, n \frac{1}{T} \right), n, m \in \mathbb{Z} \right\} \quad (34)$$

The points on the reciprocal lattice have the property of making the exponent in (33), an integer multiple of 2π.

The inverse transform is given by:

$$X[n, m] = \frac{1}{c} \int_0^{\frac{1}{\Delta f}} \int_0^{\frac{1}{T}} x(\tau, \nu) e^{j2\pi(\nu nT - \tau m \Delta f)} d\nu \, d\tau \triangleq SDFT^{-1}(x(\tau, \nu)) \quad (35)$$

where c=TΔf.

We next define a sampled version of x(τ,ν). In particular, we wish to take M samples on the delay dimension (spaced at 1/MΔf) and N samples on the Doppler dimension (spaced at 1/NT). More formally we define a denser version of the reciprocal lattice $$\Lambda_0^{\perp} = \left\{ \left( m \frac{1}{M \Delta f}, n \frac{1}{NT} \right), n, m \in \mathbb{Z} \right\} \quad (36)$$

So that $$\Lambda^{\perp} \subseteq \Lambda_0^{\perp}.$$

We define discrete periodic functions on this dense lattice with period (1/Δf, 1/T), or equivalently we define functions on a discrete torus with these dimensions $$Z_0^{\perp} = \left\{ \left( m \frac{1}{M \Delta f}, n \frac{1}{NT} \right), m = 0, \ldots, M-1, n = 0, \ldots N-1, \right\} \quad (37)$$

These functions are related via Fourier transform relationships to discrete periodic functions on the lattice Λ, or equivalently, functions on the discrete torus $$Z_0 = \{(nT, m\Delta f), m=0, \ldots, M-1, n=0, \ldots N-1,\} \quad (38)$$

We wish to develop an expression for sampling Eq. (33) on the lattice of (37). First, we start with the following definition.

Definition 2: Symplectic Finite Fourier Transform: If $X_p[k, l]$ is periodic with period (N, M), then we define $$x_p[m, n] = \sum_{k=0}^{N-1} \sum_{l=-\frac{M}{2}}^{\frac{M}{2}-1} X_p[k, l] e^{-j2\pi\left(\frac{nk}{N} - \frac{ml}{M}\right)} \quad (39)$$

$$\triangleq SFFT(X[k, l])$$

Notice that $x_p[m, n]$ is also periodic with period $[M, N]$ or equivalently, it is defined on the discrete torus $$Z_0^\perp.$$

Formally, the SFFT(X[n, m]) is a linear transformation from $$\mathbb{C}(Z_0) \to \mathbb{C}(Z_0^\perp).$$

Let us now consider generating $x_p[m, n]$ as a sampled version of (33), i.e., $$x_p[m, n] = x[m, n] = x(\tau, v)|_{\tau = \frac{m}{M\Delta f}, v = \frac{n}{NT}}.$$

Then we can show that (39) still holds where $X_p[m, n]$ is a periodization of $X[n, m]$ with period $(N, M)$ $$X_p[n, m] = \sum_{l,k=-\infty}^{\infty} X[n - kN, m - lM] \quad (40)$$

This is similar to the well-known result that sampling in one Fourier domain creates aliasing in the other domain.

The inverse discrete (symplectic) Fourier transform is given by $$X_p[n, m] = \frac{1}{MN} \sum_{l,k} x[l, k] e^{j2\pi\left(\frac{nk}{N} - \frac{ml}{M}\right)} \triangleq SFFT^{-1}(x[l, k]) \quad (41)$$

where $l=0, \ldots, M-1$, $k=0, \ldots, N-1$. If the support of $X[n, m]$ is time-frequency limited to $Z_0$ (no aliasing in (40)), then $X_p[n, m] = X[n, m]$ for $n, m \in Z_0$, and the inverse transform (41) recovers the original signal.

In the math community, the SDFT is called "discrete" because it represents a signal using a discrete set of exponentials, while the SFFT is called "finite" because it represents a signal using a finite set of exponentials.

Arguably the most important property of the symplectic Fourier transform is that it transforms a multiplicative channel effect in one domain to a circular convolution effect in the transformed domain. This is summarized in the following proposition:

Proposition 2: Let $X_1[n, m] \in \mathbb{C}(Z_0)$, $X_2[n, m] \in \mathbb{C}(Z_0)$ be periodic 2D sequences. Then $$SFFT(X_1[n,m] * X_2[n,m]) = SFFT(X_1[n,m]) \cdot SFFT(X_2[n, m]) \quad (42)$$

where * denotes two dimensional circular convolution.
Proof: See below.

With this framework established we are ready to define the OTFS modulation.

Discrete OTFS modulation: Consider a set of NM QAM information symbols arranged on a 2D grid $x[l, k]$, $k=0, \ldots, N-1$, $l=0, \ldots, M-1$ we wish to transmit. We will consider $x[l, k]$ to be two dimensional periodic with period $[N, M]$. Further, assume a multicarrier modulation system defined by A lattice on the time frequency plane, that is a sampling of the time axis with sampling period $T$ and the frequency axis with sampling period $\Delta f$ (c.f. Eq. (8)).

A packet burst with total duration $NT$ secs and total bandwidth $M\Delta f$ Hz.

Transmit and receive pulses $g_{tr}(t)$, $g_{tr}(t) \in L_2(\mathbb{R})$ satisfying the bi-orthogonality property of (27)

A transmit windowing square summable function $W_{tr}[n, m] \in \mathbb{C}(\Lambda)$ multiplying the modulation symbols in the time-frequency domain A set of modulation symbols $X[n, m]$, $n=0, \ldots, N-1$, $m=0, \ldots, M-1$ related to the information symbols $x[k, l]$ by a set of basis functions $b_{k,l}[n, m]$ $$X[n, m] = \frac{1}{MN} W_{tr}[n, m] \sum_{k=0}^{N-1} \sum_{l=0}^{M-1} x[l, k] b_{k,l}[n, m] b_{k,l}[n, m] = e^{j2\pi\left(\frac{ml}{M} - \frac{nk}{N}\right)} \quad (43)$$

where the basis functions $b_{k,l}[n, m]$ are related to the inverse symplectic Fourier transform (c.f. Eq. (41))

Given the above components, we define the discrete OTFS modulation via the following two steps $$X[n, m] = W_{tr}[n, m] SFFT^{-1}(x[k, l]) s(t) = \prod_X(g_{tr}(t)) \quad (44)$$

The first equation in (44) describes the OTFS transform, which combines an inverse symplectic transform with a widowing operation. The second equation describes the transmission of the modulation symbols $X[n, m]$ via a Heisenberg transform of $g_{tr}(t)$ parameterized by $X[n, m]$. More explicit formulas for the modulation steps are given by Equations (41) and (10).

While the expression of the OTFS modulation via the symplectic Fourier transform reveals important properties, it is easier to understand the modulation via Eq. (43), that is, transmitting each information symbol $x[k, l]$ by modulating a 2D basis function $b_{k,l}[n, m]$ on the time-frequency plane.

FIG. 13B visualizes this interpretation by isolating each symbol in the information domain and showing its contribution to the time-frequency modulation domain. Of course the transmitted signal is the superposition of all the symbols on the right (in the information domain) or all the basis functions on the left (in the modulation domain).

FIG. 13B uses the trivial window $W_{tr}[n, m]=1$ for all $n=0$, $$N-1, m = -\frac{M}{2}, \ldots \frac{M}{2} - 1$$

and zero else. This may seem superfluous but there is a technical reason for this window: recall that $SFFT^{-1}(x[k, l])$ is a periodic sequence that extends to infinite time and bandwidth. By applying the window we limit the modulation symbols to the available finite time and bandwidth. The window in general could extend beyond the period of the information symbols $[M, N]$ and could have a shape different from a rectangular pulse. This would be akin to adding cyclic prefix/suffix in the dimensions of both time and frequency with or without shaping. The choice of window has implications on the shape and resolution of the channel response in the information domain as we will discuss later. It also has implications on the receiver processing as the potential cyclic prefix/suffix has to either be removed or otherwise handled as we see next.

Discrete OTFS demodulation: Let us assume that the transmitted signal s(t) undergoes channel distortion according to (7), (2) yielding r(t) at the receiver. Further, let the receiver employ a receive windowing square summable function $W_r[n, m]$. Then, the demodulation operation consists of the following steps:

(i) Matched filtering with the receive pulse, or more formally, evaluating the ambiguity function on A (Wigner transform) to obtain estimates of the time-frequency modulation symbols $$Y[n,m] = A_{g_r,y}(\tau,\nu)|_{\tau=nT,\nu=m\Delta f} \quad (45)$$

(ii) windowing and periodization of Y[n, m]

$$Y_w[n, m] = W_r[n, m]Y[n, m] \quad (46)$$

$$Y_p[n, m] = \sum_{k,l=-\infty}^{\infty} Y_w[n - kN, m - lM]$$

(iii) and applying the symplectic Fourier transform on the periodic sequence $Y_p[n, m]$ $$\hat{x}[l,k] = y[l,k] = SFFT(Y_p[n,m]) \quad (47)$$

The first step of the demodulation operation can be interpreted as a matched filtering operation on the time-frequency domain as we discussed earlier. The second step is there to ensure that the input to the SFFT is a periodic sequence. If the trivial window is used, this step can be skipped. The third step can also be interpreted as a projection of the time-frequency modulation symbols on the orthogonal basis functions $$\hat{x}[l, k] = \sum_{m=0}^{M-1} \sum_{n=0}^{N-1} \hat{X}(n, m) b_{k,l}^*(n, m) \quad (48)$$

$$b_{k,l}^*(n, m) = e^{-j2\pi\left(\frac{lm}{L} - \frac{kn}{K}\right)}$$

The discrete OTFS modulation defined above points to efficient implementation via discrete-and-periodic FFT type processing. However, it does not provide insight into the time and bandwidth resolution of these operations in the context of two dimensional Fourier sampling theory. We next introduce the continuous OTFS modulation and relate the more practical discrete OTFS as a sampled version of the continuous modulation.

Continuous OTFS modulation: Consider a two dimensional periodic function $x(\tau,\nu)$ with period [1/Δf, 1/T] we wish to transmit; the choice of the period may seem arbitrary at this point, but it will become clear after the discussion in the next section. Further, assume a multicarrier modulation system defined by A lattice on the time frequency plane, that is a sampling of the time axis with sampling period T and the frequency axis with sampling period Δf (c.f. Eq. (8)).
Transmit and receive pulses $g_{tr}(t)$, $g_{tr}(t) \in L_2(\mathbb{R})$ satisfying the bi-orthogonality property of (27)
A transmit windowing function $W_{tr}[n, m] \in \mathbb{C}(\Lambda)$ multiplying the modulation symbols in the time-frequency domain Given the above components, we define the continuous OTFS modulation via the following two steps $$X[n, m] = W_{tr}[n, m]SDFT^{-1}(x(\tau, \nu)) \quad (49)$$

$$s(t) = \prod_X (g_{tr}(t))$$

The first equation describes the inverse discrete time-frequency symplectic Fourier transform [c.f. Eq. (35)] and the windowing function, while the second equation describes the transmission of the modulation symbols via a Heisenberg transform [c.f. Eq. (10)].

Continuous OTFS demodulation: Let us assume that the transmitted signal s(t) undergoes channel distortion according to (7), (2) yielding r(t) at the receiver. Further, let the receiver employ a receive windowing function $W_r[n, m] \in \mathbb{C}(\Lambda)$. Then, the demodulation operation consists of two steps:

(i) Evaluating the ambiguity function on Λ (Wigner transform) to obtain estimates of the time-frequency modulation symbols $$Y[n,m] = A_{g_r,y}(\tau,\nu)|_{\tau=nT,\nu=m\Delta f} \quad (50)$$

(ii) Windowing and applying the symplectic Fourier transform on the modulation symbols $$\hat{x}(\tau,\nu) = SDFT(W_r[n,m]Y[n,m]) \quad (51)$$

Notice that in (50), (51) there is no periodization of Y[n, m], since the SDFT is defined on aperiodic square summable sequences. The periodization step needed in discrete OTFS can be understood as follows. Suppose we wish to recover the transmitted information symbols by performing a continuous OTFS demodulation and then sampling on the delay-Doppler grid $$\hat{x}(l, k) = \hat{x}(\tau, \nu)|_{\tau=\frac{m}{M\Delta f}, \nu=\frac{n}{NT}}$$

Since performing a continuous symplectic Fourier transform is not practical we consider whether the same result can be obtained using SFFT. The answer is that SFFT processing will produce exactly the samples we are looking for if the input sequence is first periodized (aliased)—see also (39) (40).

We have now described all the steps of the OTFS modulation. We have also discussed how the Wigner transform at the receiver inverts the Heisenberg transform at the transmitter [c.f. Eqs. (26), (28)], and similarly for the forward and inverse symplectic Fourier transforms. The key question is what form the end-to-end signal relationship takes when a non-ideal channel is between the transmitter and receiver. The answer to this question is addressed next.

12. Channel Equation in the OTFS Domain

The main result in this section shows how the time varying channel in (2), (7), is transformed to a time invariant convolution channel in the delay Doppler domain.

Proposition 3: Consider a set of NM QAM information symbols arranged in a 2D periodic sequence x[l, k] with period [M, N]. The sequence x[k, l] undergoes the following transformations:

It is modulated using the discrete OTFS modulation of Eq. (44).
It is distorted by the delay-Doppler channel of Eqs.(2), (7).

It is demodulated by the discrete OTFS demodulation of Eqs. (45), (47).

The estimated sequence $\hat{x}[l, k]$ obtained after demodulation is given by the two dimensional periodic convolution $$\hat{x}[l, k] = \frac{1}{MN} \sum_{m=0}^{M-1} \sum_{n=0}^{N-1} x[m, n] h_w\left(\frac{l-m}{M\Delta f}, \frac{k-n}{NT}\right) \quad (52)$$

of the input QAM sequence $x[m, n]$ and a sampled version of the windowed impulse response $h_w(\cdot)$, $$h_w\left(\frac{l-m}{M\Delta f}, \frac{k-n}{NT}\right) = h_w(\tau', v')|_{\tau'=\frac{l-m}{M\Delta f}, v'=\frac{k-n}{NT}} \quad (53)$$

where $h_w(\tau, v)$ denotes the circular convolution of the channel response with a windowing function $$h_w(\tau', v') = \iint e^{j2\pi v \tau} h(\tau, v) w(\tau' - \tau, v' - v) d\tau dv \quad (54)$$

where the windowing function $w(\tau, v)$ is the symplectic Fourier transform of the time-frequency window $W[n, m]$ $$W(\tau, v) = \sum_{m=0}^{M-1} \sum_{n=0}^{N-1} W[n, m] e^{-j2\pi(vnT - \tau m \Delta f)} \quad (55)$$

and where $W[n, m]$ is the product of the transmit and receive window.

$$W[n,m] = W_{tr}[n,m] W_r[n,m] \quad (56)$$

To be precise, in the window $w(\tau, v)$ is circularly convolved with a slightly modified version of the channel impulse response $e^{-j2\pi v \tau} h(\tau, v)$ (by a complex exponential) as can be seen in the equation.

Proof: See below.

In many cases, the windows in the transmitter and receiver are matched, i.e., $W_{tr}[n,m] = W_0[n, m]$ and $W_r[n, m] = W_0^*[n, m]$, hence $W[n, m] = |W_0[n,m]|^2$.

The window effect is to produce a blurred version of the original channel with a resolution that depends on the span of the frequency and time samples available as will be discussed in the next section. If we consider the rectangular (or trivial) window, i.e., $W[n, m]=1$, $n=0, \ldots, N-1$, $m=-M/2, \ldots, M/2-1$ and zero else, then its SDFT $w(\tau, v)$ in (55) is the two dimensional Dirichlet kernel with bandwidth inversely proportional to N and M.

There are several other uses of the window function. The system can be designed with a window function aimed at randomizing the phases of the transmitted symbols, akin to how QAM symbol phases are randomized in Wi-Fi and Multimedia-Over-Coax communication systems. This randomization may be more important for pilot symbols than data carrying symbols. For example, if neighboring cells use different window functions, the problem of pilot contamination is avoided.

A different use of the window is the ability to implement random access systems over OTFS using spread spectrum/CDMA type techniques as will be discussed later.

13. The Symplectic Finite Fourier Transform

The first step in the modulation of the QAM symbols is the 2D OTFS transform. This is given by a variant of the 2D FFT called the Symplectic Finite Fourier Transform (SFFT), defined as $$X(k, l) = SFFT\{x(m, n)\} \quad (9)$$
$$= \sum_{m=0}^{M-1} \sum_{n=0}^{N-1} x(m, n) b_{m,n}(k, l)$$
$$b_{m,n}(k, l) = e^{-j2\pi\left(\frac{lm}{M} - \frac{kn}{N}\right)}$$

Where $x(m, n)$ are the QAM symbols in the Delay-Doppler domain, $b_{m,n}(k,l)$ are the basis functions associated with the $[m, n]$th QAM symbol in the Time-Frequency domain (with time and frequency indexed by k and l, respectively), and M and N are the number of points in the Delay and Doppler dimensions, respectively. Alternatively, M is equivalent to the number of subcarriers and N to the number of multi-carrier symbols. Notice that the Symplectic Fourier Transform differs from the more well-known Cartesian Fourier Transform in that the exponential functions across each of the two dimensions have opposing signs and the coordinates are flipped in the two domains. This is necessary as it matches the behavior of the Delay-Doppler channel representation relative to the time-varying frequency response representation of the channel.

Figure 14:
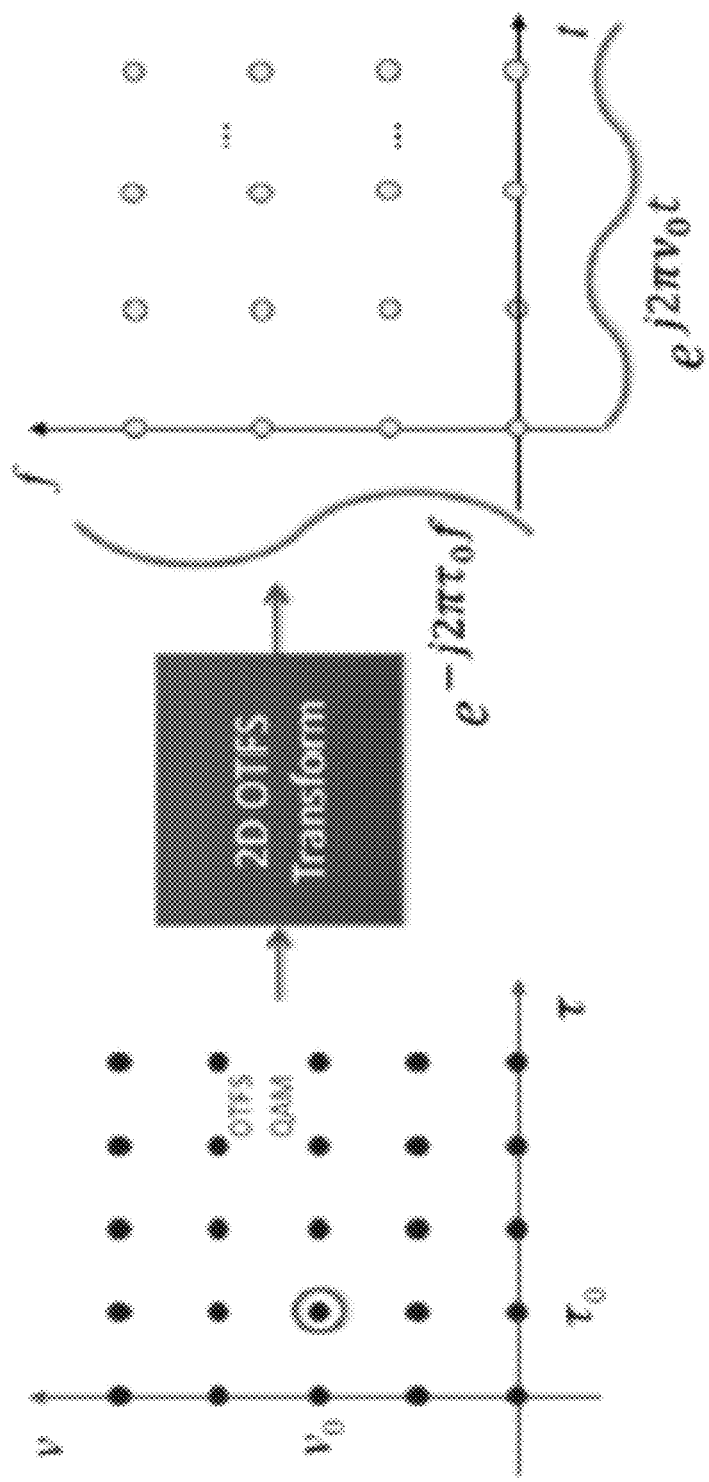
FIG. 14 is a graphical representation of OTFS transformation to 2D basis function.

To visualize the 2D basis functions, consider the continuous time representations of the Delay-Doppler and Time-Frequency domains. In FIG. 14, a point in the Delay-Doppler domain on the left, indexed by $[\tau_0, v_0]$ is transformed to a multiplication of two linear phases in the Time-Frequency domain on the right, where the frequency of the exponential in the 'time' dimension is given by the Doppler index, $v_0$, and the frequency of the exponential in the 'frequency' dimension is given by the Delay index, $\tau_0$.

Figure 15:
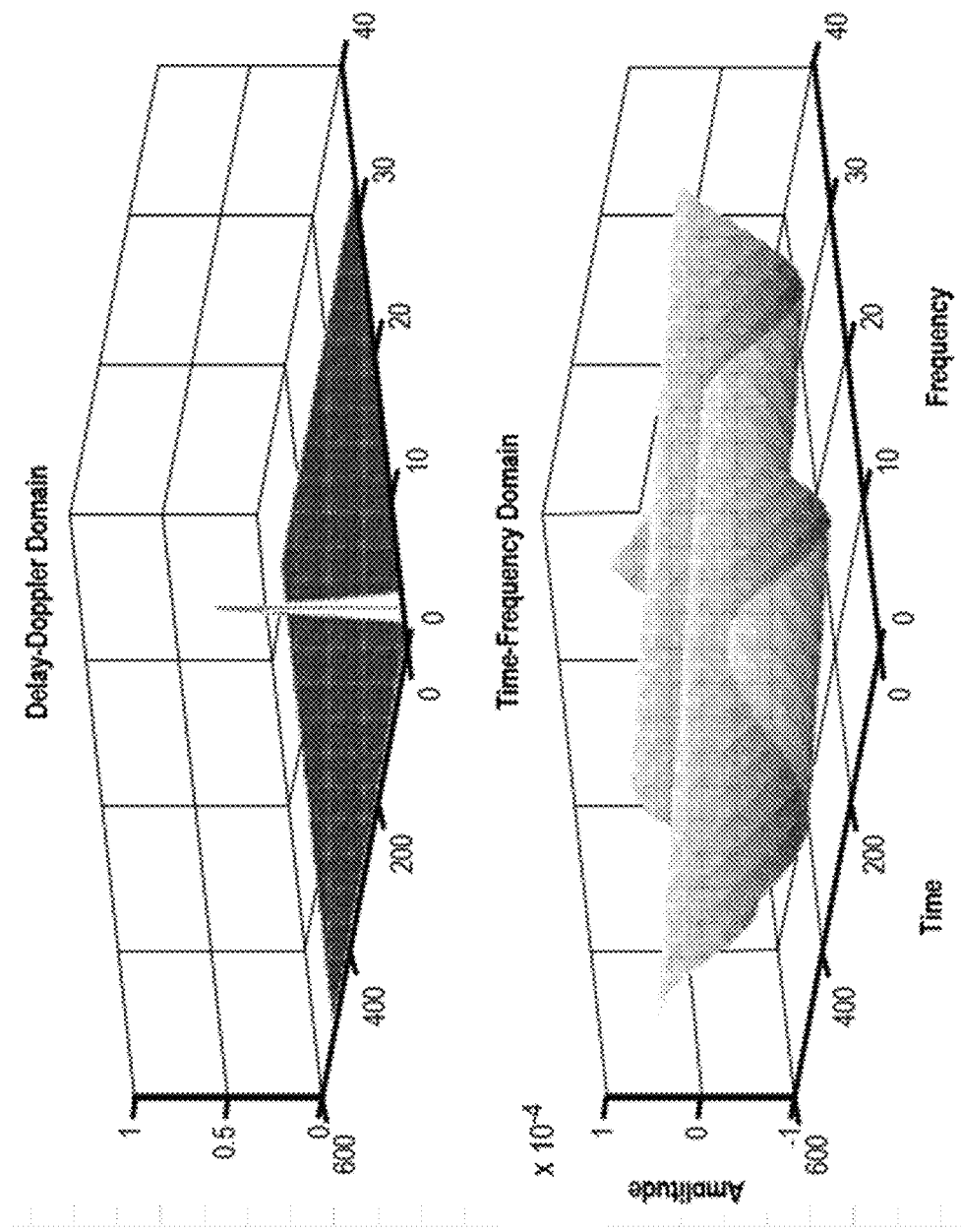
FIG. 15 shows an example 2D basis function in the time-frequency domain.

An example of the 2D exponential basis function is given in FIG. 15, where the impulse in the Delay-Doppler domain is transformed into a two dimensional 'wave' in the Time-Frequency domain.

Figure 16:
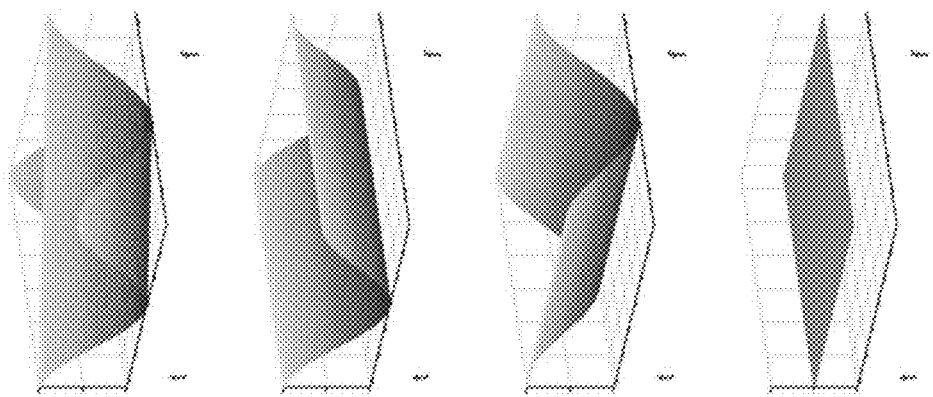
FIG. 16 shows an example of Information Symbols in the Information (Delay-Doppler) Domain (Right), and Corresponding Basis Functions in the Time-Frequency Domain (Left).
Figure 16:
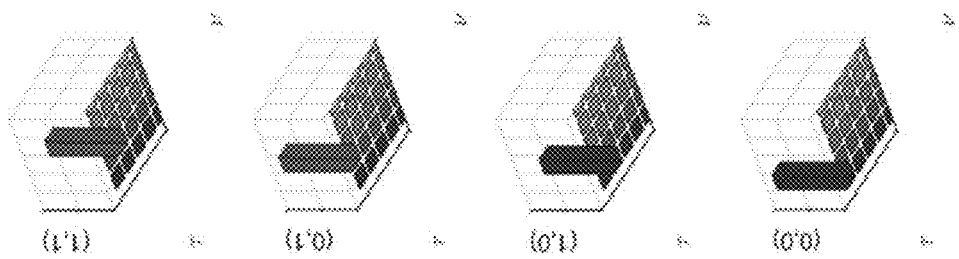

Additional Time-Frequency basis function examples are given in FIG. 16. Note the flipping of the axes from Delay-Doppler to Frequency-Time.

To summarize the initial step in the modulation process:
QAM symbols are placed on a grid in the Delay-Doppler domain.
Through the Symplectic Fourier Transform, each QAM symbol multiplies a 2D basis function defined in the Time-Frequency domain.
The Time-Frequency signal is a superposition of multiple QAM symbols weighting the 2D basis functions.
The energy of each symbol is spread across the signal bandwidth and OTFS symbol time.

At the receiver, the corresponding final demodulation step is the Inverse Symplectic Finite Fourier Transform, given by $$x(m, n) = \sum_{l=0}^{M-1} \sum_{k=0}^{N-1} X(k, l) b_{m,n}^*(k, l) b_{m,n}^*(k, l) = e^{j2\pi\left(\frac{lm}{M} - \frac{kn}{N}\right)}$$

Note that the Symplectic Fourier Transform and its inverse are actually identical, due to the opposing exponential sign and flipping of the axes.

14. The OTFS Window

Figure 17:
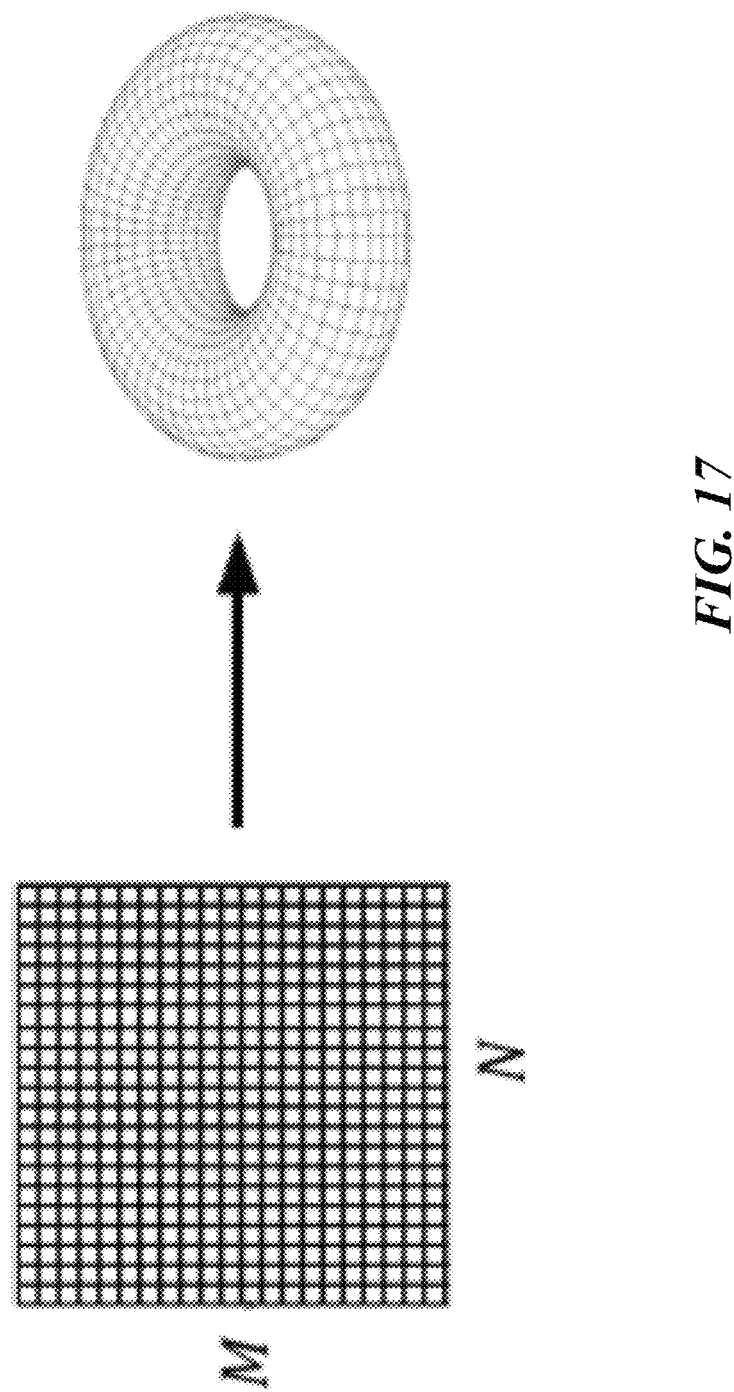
FIG. 17 is a graphical example of a 2D periodic transform.

Notice that the basis functions are doubly periodic with period [N, M], or equivalently, as seen in FIG. 17. The basis functions extend infinitely in frequency and time and are thus windowed at the transmitter with a 2D shaping window, $W_{tr}[k, l]$, in order to restrict the available transmission bandwidth and time. This window multiplies the modulation symbols in the Time-Frequency domain. A trivial window example is the rectangular window $W_{tr}[k, l]=1$ for all k=0, ..., N−1, l=0, ..., M−1 and zero elsewhere. Since the signal in this domain is periodic, the window can be applied in any region of the domain without loss of information.

The signal in the Time-Frequency domain is thus given by $$\Theta(k,l) = W_{tr}[k,l] \cdot \text{SFFT}\{x(m,n)\} \quad (11)$$

The window in general could extend beyond the period of the information symbols [N, M] and could have a shape different from a rectangular pulse. This would be akin to adding cyclic prefix/suffix in the dimensions of both time and frequency with or without shaping. The choice of window has implications on the shape and resolution of the channel response in the information domain.

The OTFS window also enables the multiplexing of traffic to or from multiple users.

15. Channel Time/Frequency Coherence and OTFS Resolution

In this section we examine certain OTFS design issues, like the choice of data frame length, bandwidth, symbol length and number of subcarriers. We study the tradeoffs among these parameters and gain more insight on the capabilities of OTFS technology.

Since OTFS is based on Fourier representation theory similar spectral analysis concepts apply like frequency resolution vs Fourier transform length, sidelobes vs windowing shape etc. One difference that can be a source of confusion comes from the naming of the two Fourier transform domains in the current framework.

Figure 18A:
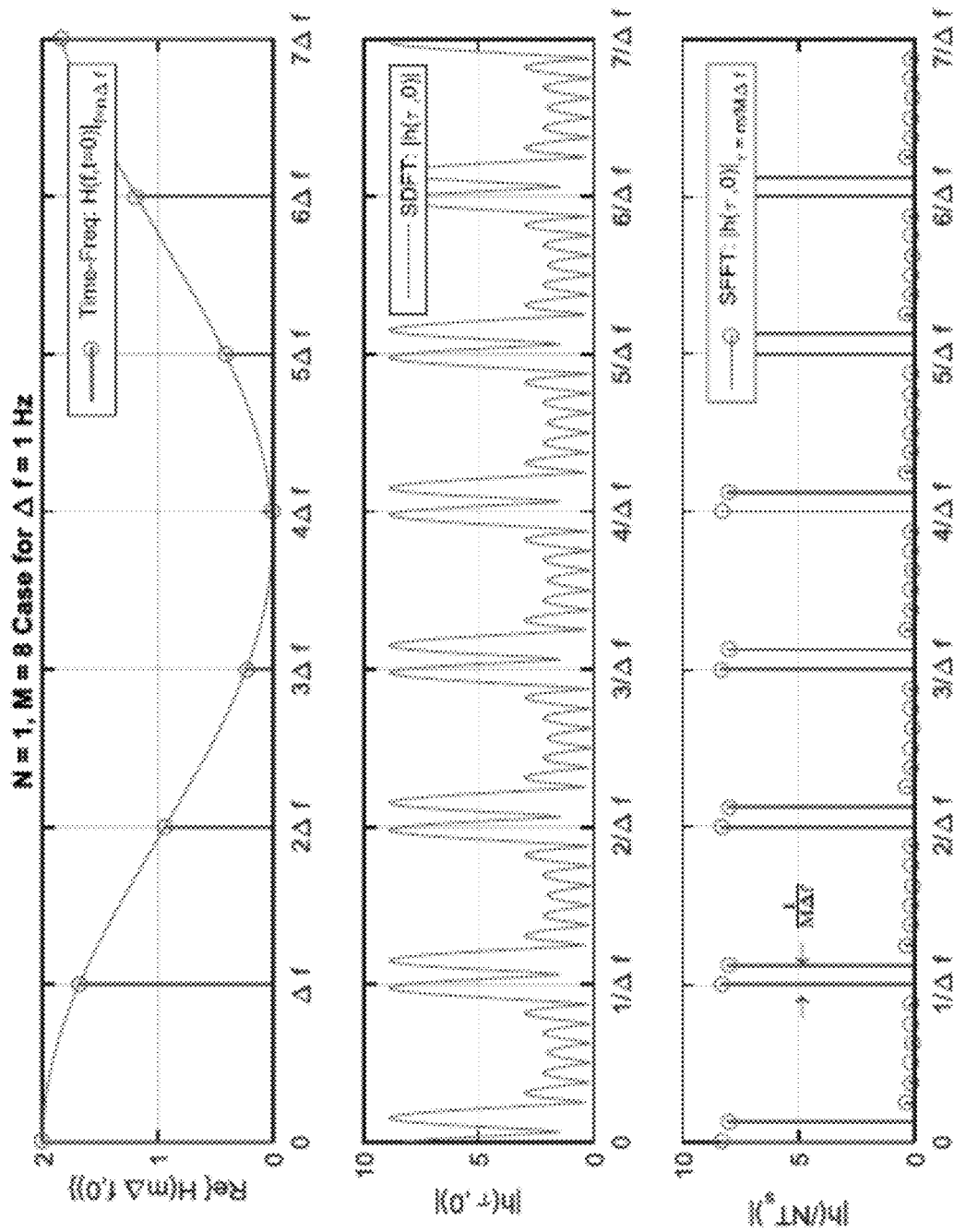
FIG. 18A illustrates a one-dimensional multipath channel example.

FIG. 18A depicts a one Dimensional Doppler Channel Example: (i) Sampled Frequency Response at $T_s=1$ sec (ii) Periodic Fourier Transform with Period $1/T_s=1$ Hz (iii) Sampled Fourier Transform with Period $1/T_s$ and Resolution $1/NT_s$.

OTFS transforms the time-frequency domain to the delay-Doppler domain creating the Fourier pairs: (i) time⇔Doppler and (ii) frequency⇔delay. The "spectral" resolution of interest here therefore is either on the Doppler or on the delay dimensions.

These issues can be easier clarified with an example. Let us consider a time-invariant multipath channel (zero Doppler) with frequency response H(f,0) for all t. In the first plot of FIG. 18A we show the real part of H(f,0) as well as a sampled version of it on a grid of M=8 subcarriers. The second plot of FIG. 18A shows the SDFT of the sampled H(mΔf, 0), i.e., h(τ,0) along the delay dimension. Notice that taking this frequency response to the "delay" domain reveals the structure of this multipath channel, that is, the existence of two reflectors with equal power in this example. Further, notice that the delay dimension of the SDFT is periodic with period 1/Δf as expected due to the nature of the discrete Fourier transform. Finally, in the third plot of FIG. 8F we show the SFFT of the frequency response, which as expected is a sampled version of the SDFT of the second plot. Notice that the SFFT has M=8 points in each period 1/Δf leading to a resolution in the delay domain of 1/MΔf=1/BW.

Figure 18B:
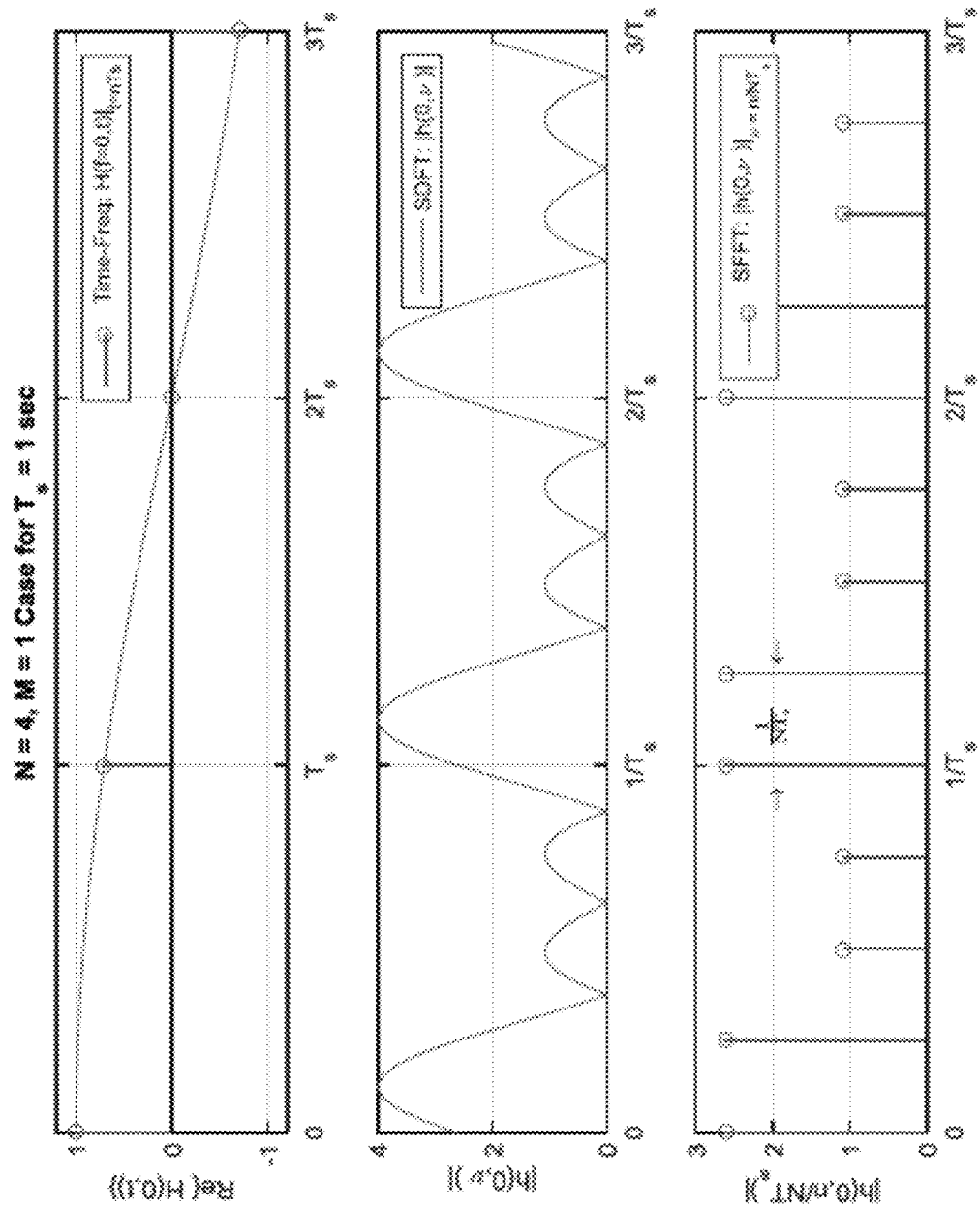
FIG. 18B illustrates a one-dimensional Doppler channel example.
Figure 18C:
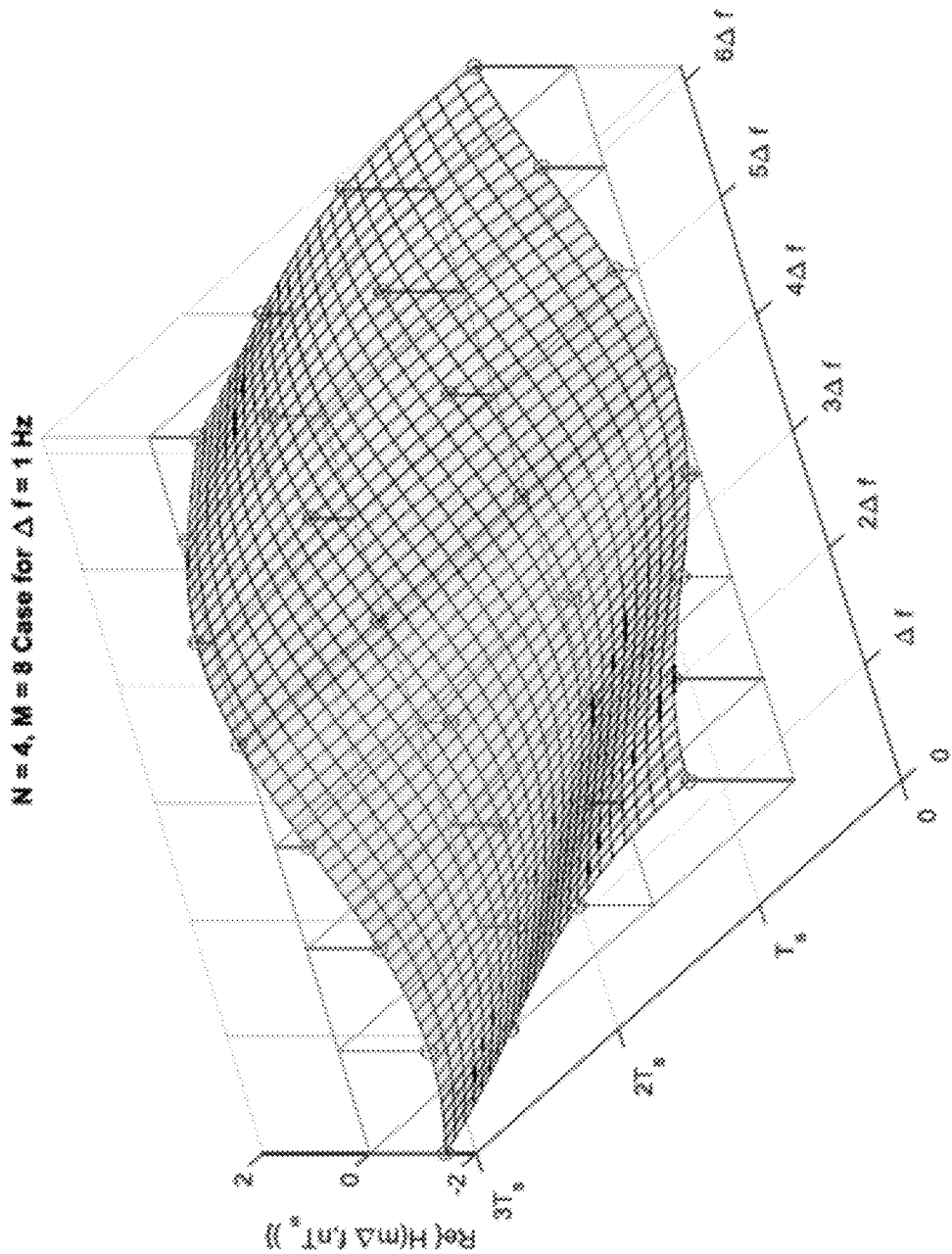
FIG. 18C shows an example of a time-varying channel response in the time frequency domain.

FIG. 18C shows a time-Varying Channel Response in the Time-Frequency Domain.

In the current example, the reflectors are separated by more than 1/MΔf and are resolvable. If they were not, then the system would experience a flat channel within the bandwidth of observation, and in the delay domain the two reflectors would have been blurred into one.

FIG. 18B shows similar results for a flat Doppler channel with time varying frequency response H(0,t) for all f. The first plot shows the response as a function of time, while the second plot shown the SDFT along the Doppler dimension. Finally the third plot shows the SFFT, that is the sampled version of the transform. Notice that the SDFT is periodic with period 1/T while the SFFT is periodic with period 1/T and has resolution of 1/NT.

The conclusion one can draw from FIG. 18B is that as long as there is sufficient variability of the channel within the observation time NT, that is as long as reflectors have Doppler frequency difference larger than 1/NT, the OTFS system will resolve these reflectors and will produce an equivalent channel in the delay-Doppler domain that is not fading. In other words, OTFS can take a channel that inherently has a coherence time of only T and produce an equivalent channel in the delay Doppler domain that has coherence time NT. This is an important property of OTFS as it can increase the coherence time of the channel by orders of magnitude and enable MIMO processing and beamforming under Doppler channel conditions.

Figure 18D:
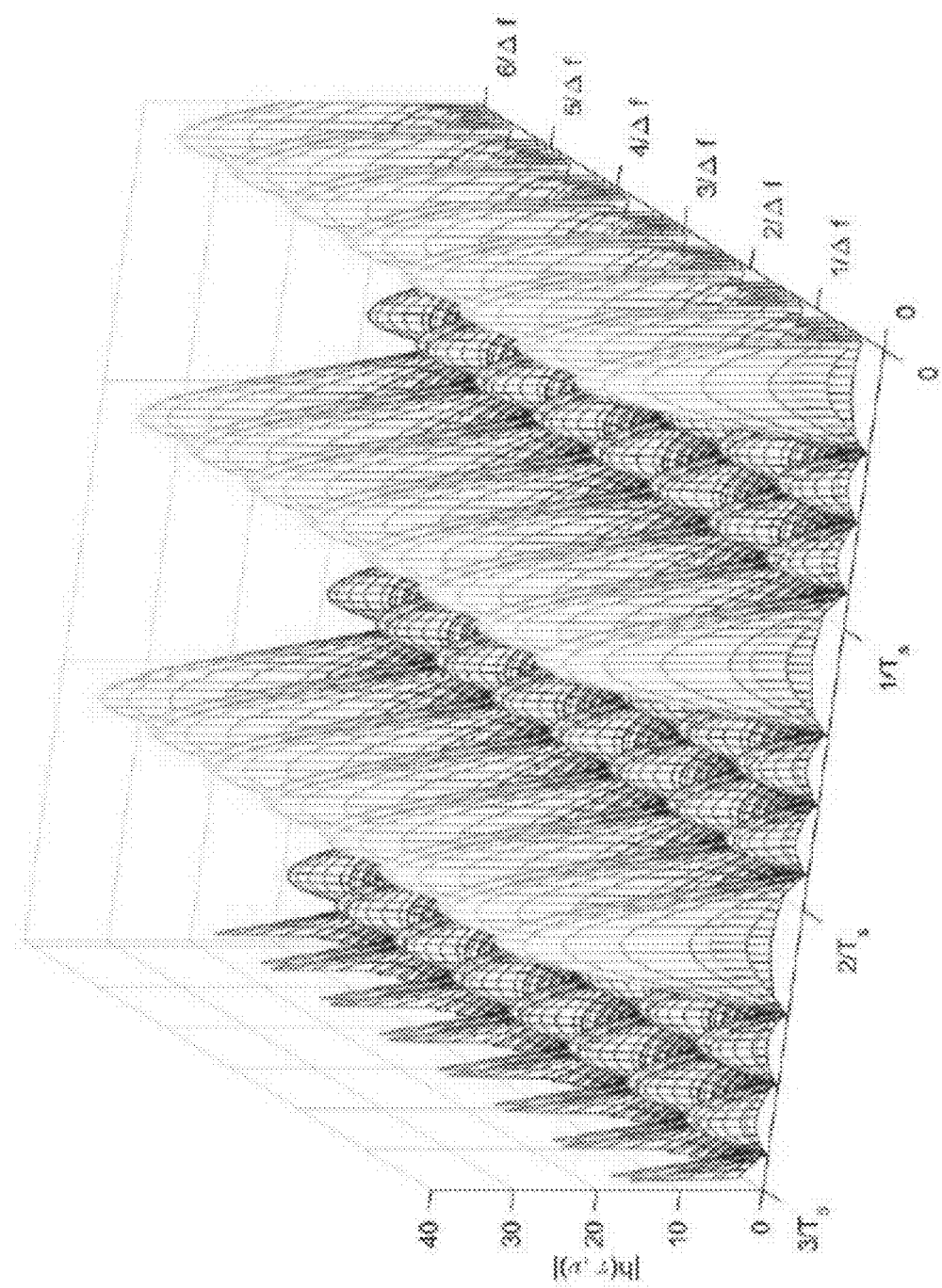
FIG. 18D shows the SDFT of the time-varying channel response in the delay-Doppler domain.

The two one-dimensional channel examples we have examined are special cases of the more general two-dimensional channel of FIG. 18C. The time-frequency response and its sampled version are shown in this figure, where the sampling period is (τ, Δf). FIG. 18D shows the SDFT of this sampled response which is periodic with period (1/T, 1/Δf), across the Doppler and delay dimensions respectively.

Let us now examine the Nyquist sampling requirements for this channel response. 1/T is generally on the order of Δf (for an OFDM system with zero length CP it is exactly 1/T=Δf) so the period of the channel response in FIG. 18D is approximately (f, τ), and aliasing can be avoided as long as the support of the channel response is less than ±Δf/2 in the Doppler dimension and ±T/2 in the delay dimension.

Figure 18E:
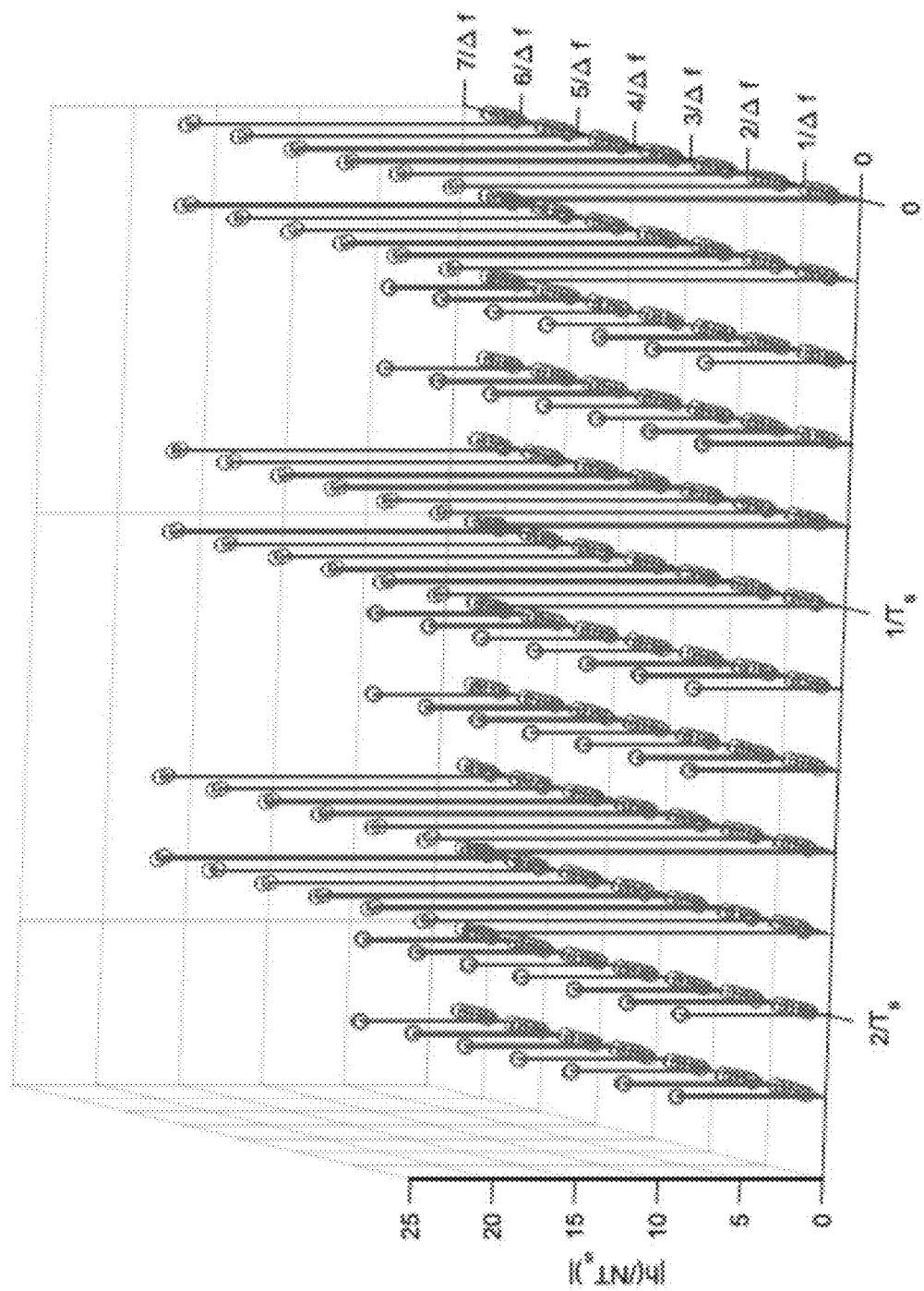
FIG. 18E shows SFFT of the channel response in the sampled delay-Doppler domain.

FIG. 18E shows the SFFT, that is, the sampled version of FIG. 18D. The resolution of FIG. 18D is 1/NT, 1/MΔf across the Doppler and delay dimensions respectively.

We summarize the sampling aspects of the OTFS modulation in FIG. 13. The OTFS modulation consists of two steps shown in this figure:

A Heisenberg transform translates a time-varying convolution channel in the waveform domain to an orthogonal but still time varying channel in the time frequency domain. For a total bandwidth BW and M subcarriers the frequency resolution is Δf=BW/M. For a total frame duration $T_f$ and N symbols the time resolution is $T=T_f/N$.

A SFFT transform translates the time-varying channel in the time-frequency domain to a time invariant one in the delay-Doppler domain. The Doppler resolution is $1/T_f$ and the delay resolution is 1/BW.

The choice of window can provide a tradeoff between main lobe width (resolution) and side lobe suppression, as in classical spectral analysis.

16. Channel Estimation in the OTFS Domain

There is a variety of different ways a channel estimation scheme could be designed for an OTFS system, and a variety of different implementation options and details. In the section we will only present a high level summary and highlight the key concepts.

A straightforward way to perform channel estimation entails transmitting a sounding OTFS frame containing a discrete delta function in the OTFS domain or equivalently a set of unmodulated carriers in the time frequency domain. From a practical standpoint, the carriers may be modulated with known, say BPSK, symbols which are removed at the receiver as is common in many OFDM systems. This approach could be considered an extension of the channel estimation symbols used in WiFi and Multimedia-Over-Coax modems. FIG. 10 shows an OTFS symbol containing such an impulse.

This approach may however be wasteful as the extend of the channel response is only a fraction of the full extend of the OTFS frame (1/T, 1/Δf). For example, in LTE systems 1/T≈15 KHz while the maximum Doppler shift $f_{d,max}$ is typically one to two orders of magnitude smaller. Similarly 1/Δf≈67 usec, while maximum delay spread $\tau_{max}$ is again one to two orders of magnitude less. We therefore can have a much smaller region of the OTFS frame devoted to channel estimation while the rest of the frame carries useful data. More specifically, for a channel with support ($\pm f_{d,max}$, $\pm \tau_{max}$) we need an OTFS subframe of length ($2f_{d,max}/T$, $2\tau_{max}/\Delta f$).

In the case of multiuser transmission, each UE can have its own channel estimation subframe positioned in different parts of the OTFS frame. This is akin to multiplexing of multiple users when transmitting Uplink Sounding Reference Signals in LTE. The difference is that OTFS benefits from the virtuous effects of its two dimensional nature. For example, if $\tau_{max}$ is 5% of the extend of the delay dimension and $f_{d,max}$ is 5% of the Doppler dimension, the channel estimation subframe need only be 5%×5%=0.25% of the OTFS frame.

Notice that although the channel estimation symbols are limited to a small part of the OTFS frame, they actually sound the whole time-frequency domain via the corresponding basis functions associated with these symbols.

A different approach to channel estimation is to devote pilot symbols on a subgrid in the time-frequency domain. This is akin to CRS pilots in downlink LTE subframes. The key question in this approach is the determination of the density of pilots that is sufficient for channel estimation without introducing aliasing. Assume that the pilots occupy the subgrid ($n_0 T$, $m_0 \Delta f$) for some integers $n_0$, $m_0$. Recall that for this grid the SDFT will be periodic with period (1/$n_0 T$, 1/$m_0 \Delta f$). Then, applying the aliasing results discussed earlier to this grid, we obtain an alias free Nyquist channel support region of ($\pm f_{d,max}$, $\pm \tau_{max}$)=($\pm 1/2n_0 T$, $\pm 1/2m_0 \Delta f$). The density of the pilots can then be determined from this relation given the maximum support of the channel. The pilot subgrid should extend to the whole time-frequency frame, so that the resolution of the channel is not compromised.

17. OTFS-Access: Multiplexing More than One User

There is a variety of ways to multiplex several uplink or downlink transmissions in one OTFS frame. Here we will briefly review the following multiplexing methods:

Multiplexing in the OTFS delay-Doppler domain
Multiplexing in the time-frequency domain
Multiplexing in the code spreading domain
Multiplexing in the spatial domain 18. Multiplexing in the Delay-Doppler Domain:

This is the most natural multiplexing scheme for downlink transmissions. Different sets of OTFS basis functions, or sets of information symbols or resource blocks are given to different users. Given the orthogonality of the basis functions, the users can be separated at the UE receiver. The UE need only demodulate the portion of the OTFS frame that is assigned to it.

Figure 18F:
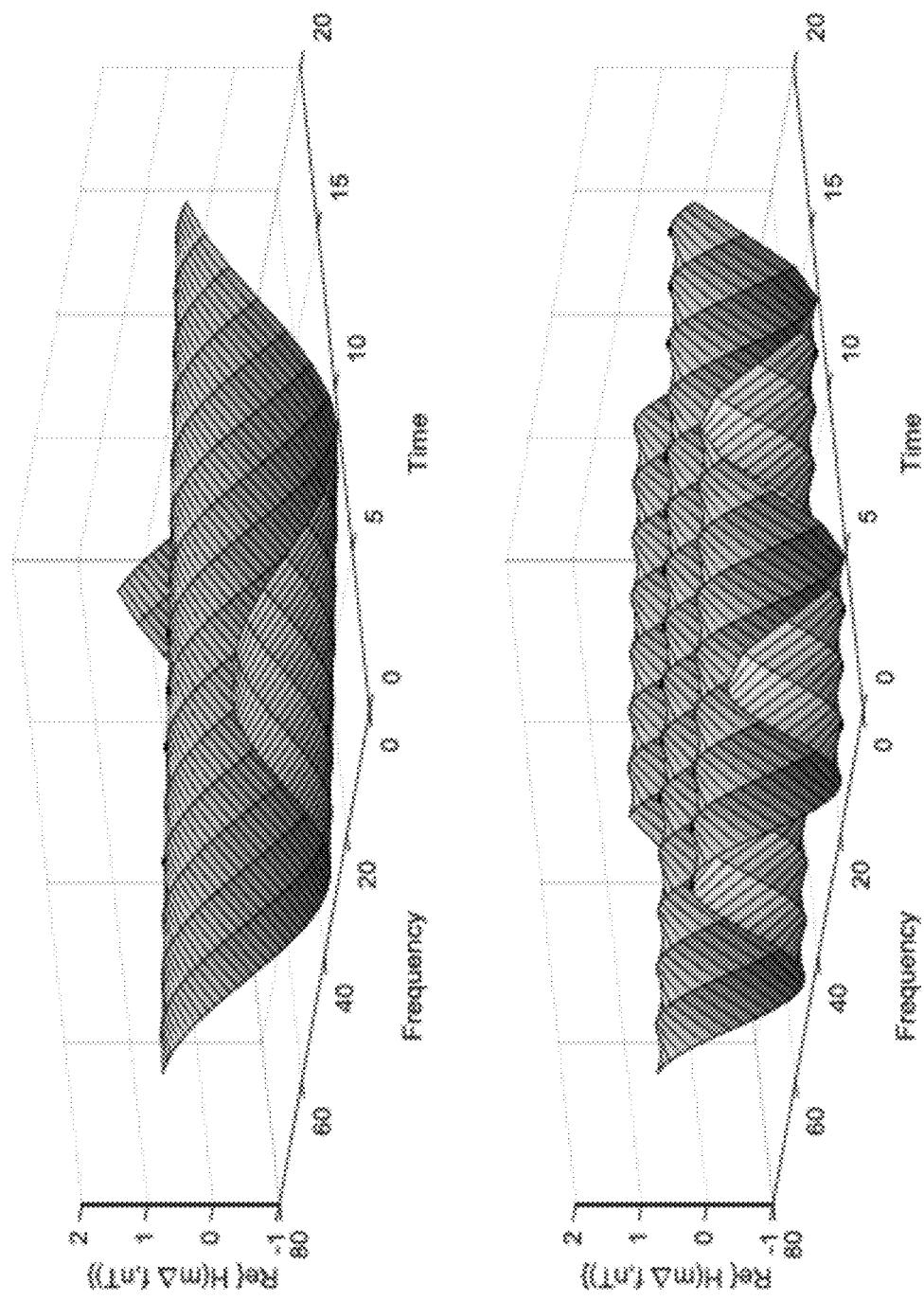
FIG. 18F shows different Basis Functions, Assigned to Different Users, Span the Whole Time-Frequency Frame.

This approach is similar to the allocation of PRBs to different UEs in LTE. One difference is that in OTFS, even a small subframe or resource block in the OTFS domain will be transmitted over the whole time-frequency frame via the basis functions and will experience the average channel response. FIG. 18F illustrates this point by showing two different basis functions belonging to different users. Because of this, there is no compromise on channel resolution for each user, regardless of the resource block or subframe size.

Figure 18G:
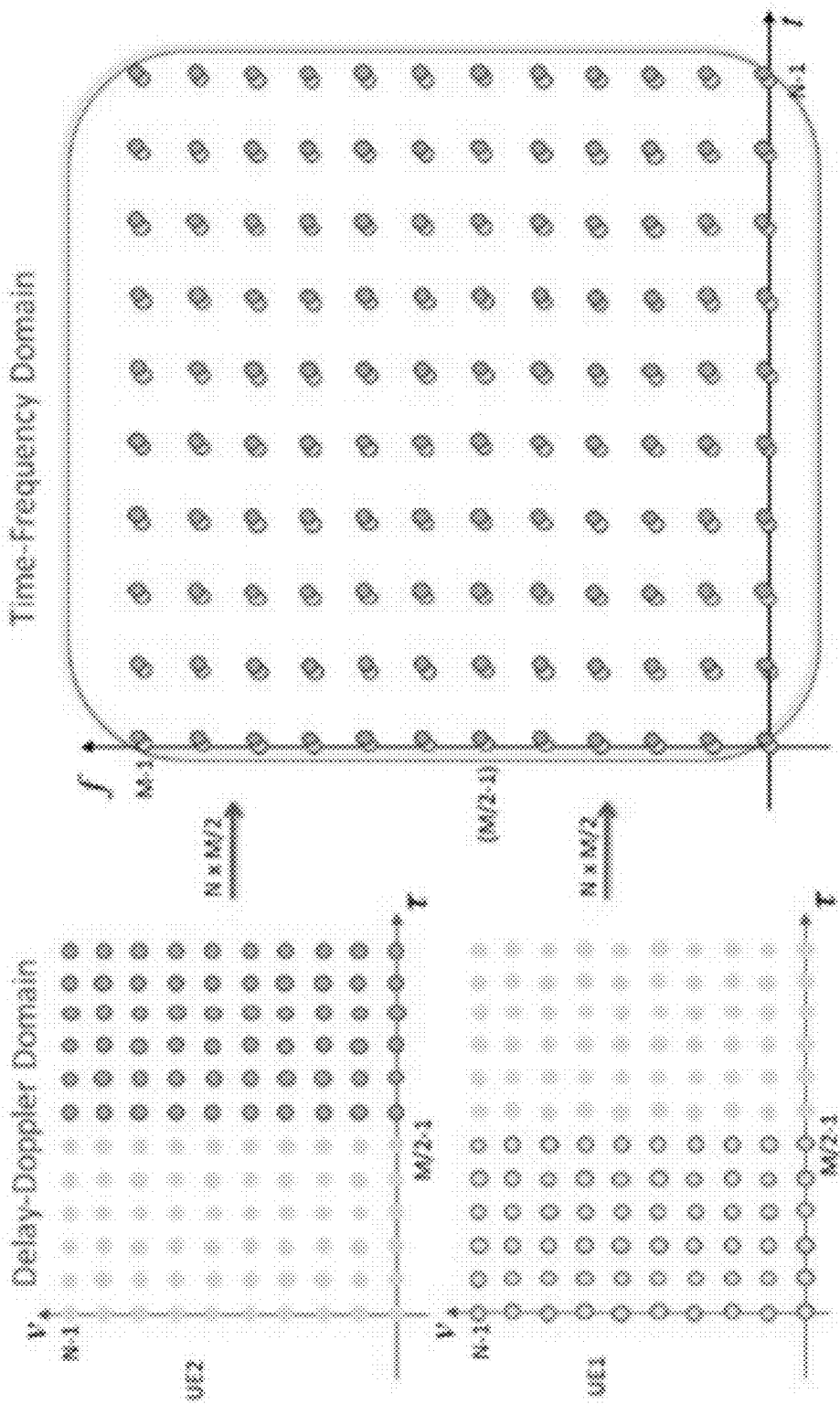
FIG. 18G is a graphical representation of multiplexing in the delay-Doppler domain.

Different sets of OTFS basis functions, or sets of information symbols or resource blocks are given to different users (see the example in FIG. 18G). Only one pilot per transmit antenna stream is required for all users, since each UE will estimate their own channel from the same transmitted pilots. Given the orthogonality of the basis functions, the users can be separated at the UE receiver. The UE need only demodulate the portion of the OTFS frame that is assigned to it.

In the uplink direction, transmissions from different users experience different channel responses. Hence, the different subframes in the OTFS domain will experience a different convolution channel. This can potentially introduce inter-user interference at the edges where two user subframes are adjacent, and would require guard gaps to eliminate it. In order to avoid this overhead, a different multiplexing scheme can be used in the uplink as explained next.

Figure 19A:
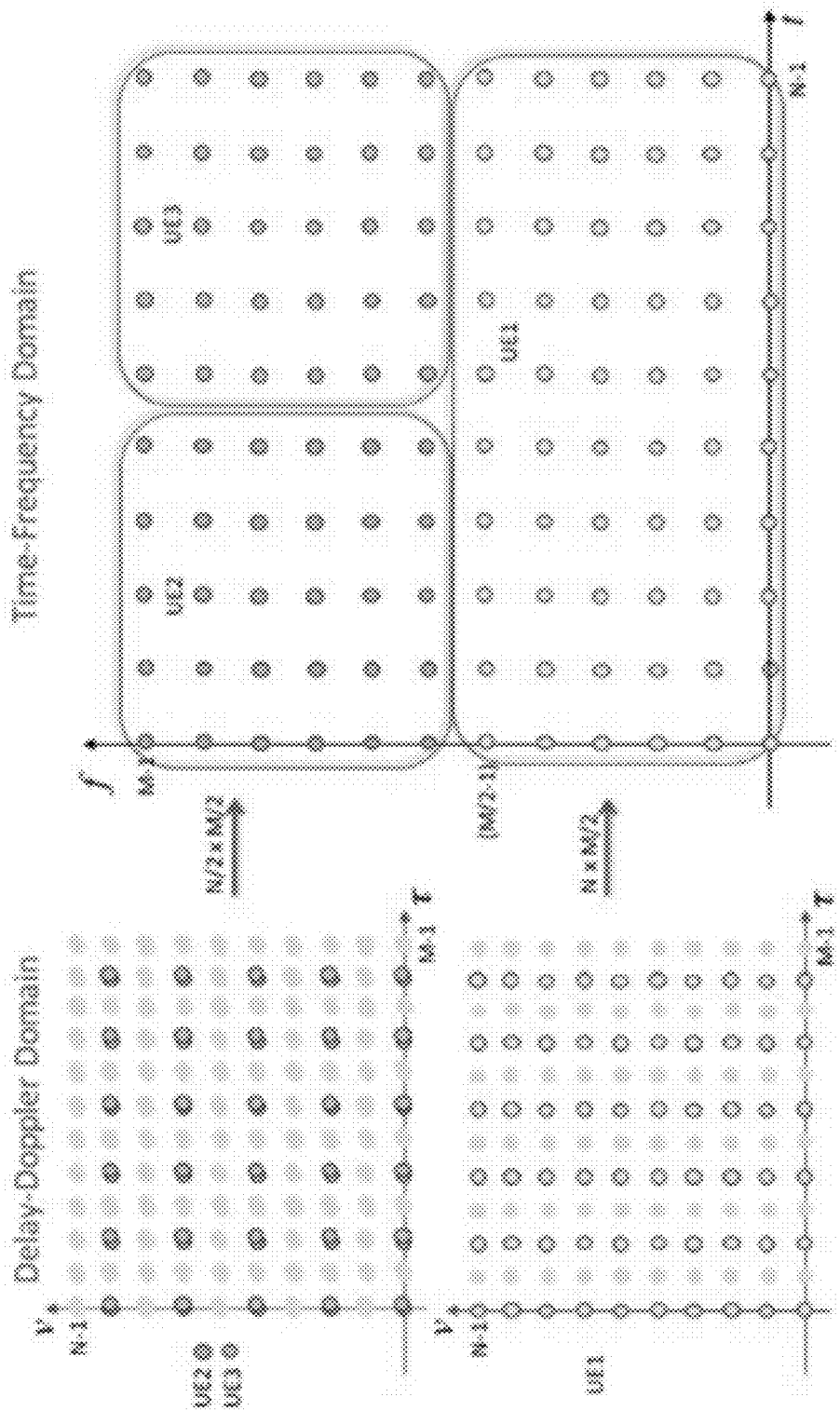
FIG. 19A is a graphical representation of multiplexing user data for three users in the time-frequency domain.
Figure 19B:
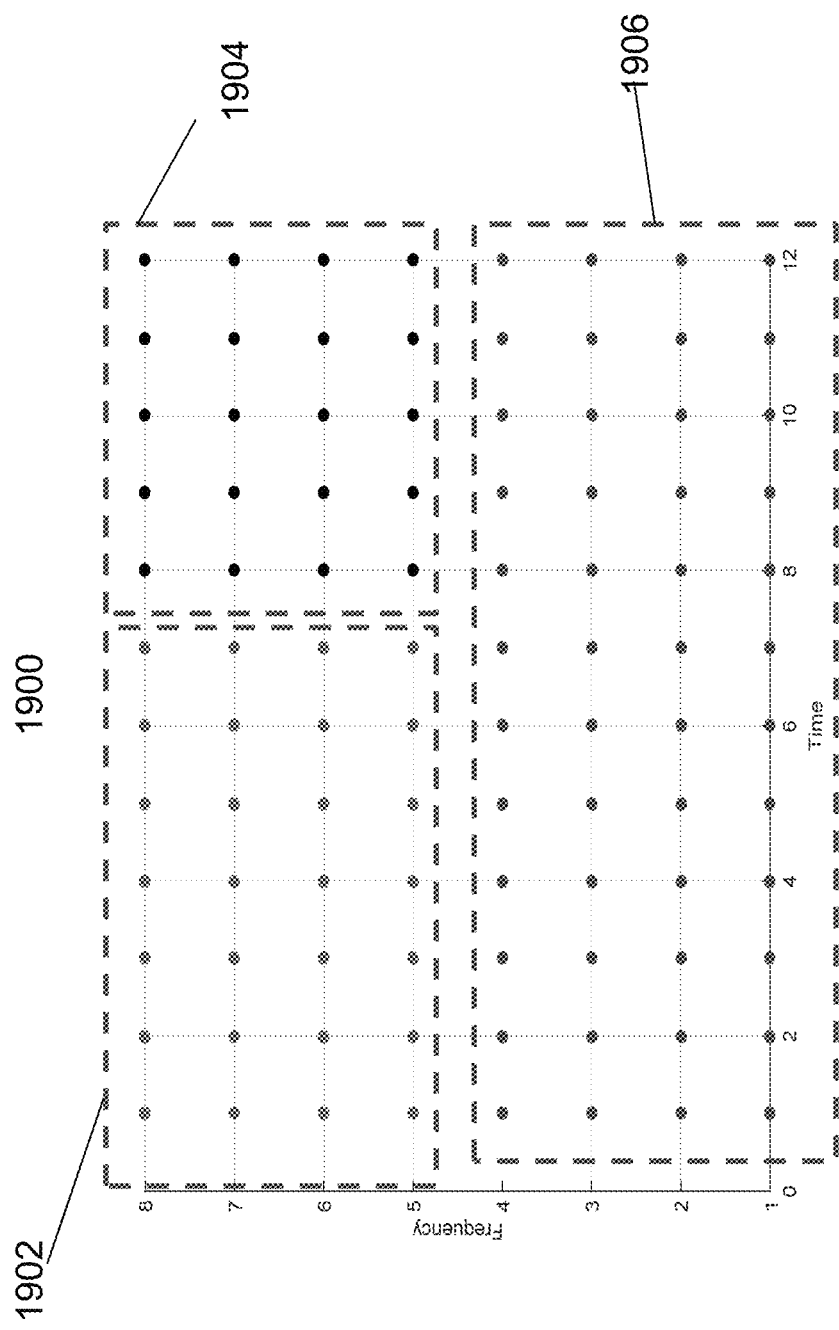
FIG. 19B shows another example of multiplexing three users in the time-frequency domain.

19. Multiplexing in the Time-Frequency Domain:

In this approach, resource blocks or subframes are allocated to different users in the time-frequency domain. FIG. 19A and FIG. 19B illustrate this for a three user case. For example, in the allocation 1900 depicted in FIG. 19B, User 1 (blue, 1906) occupies the whole frame length but only half the available subcarriers. Users 2 and 3 (red and black 1902, 1904, respectively) occupy the other half subcarriers, and divide the total length of the frame between them.

Notice that in this case, each user employs a slightly different version of the OTFS modulation. One difference is that each user i performs an SFFT on a subframe ($N_i$, $M_i$), $N_i \leq N$, $M_i \leq M$. This reduces the resolution of the channel, or in other words reduces the extent of the time-frequency plane in which each user will experience its channel variation. On the other side, this also gives the scheduler the opportunity to schedule users in parts of the time-frequency plane where their channel is best.

Figure 20A:
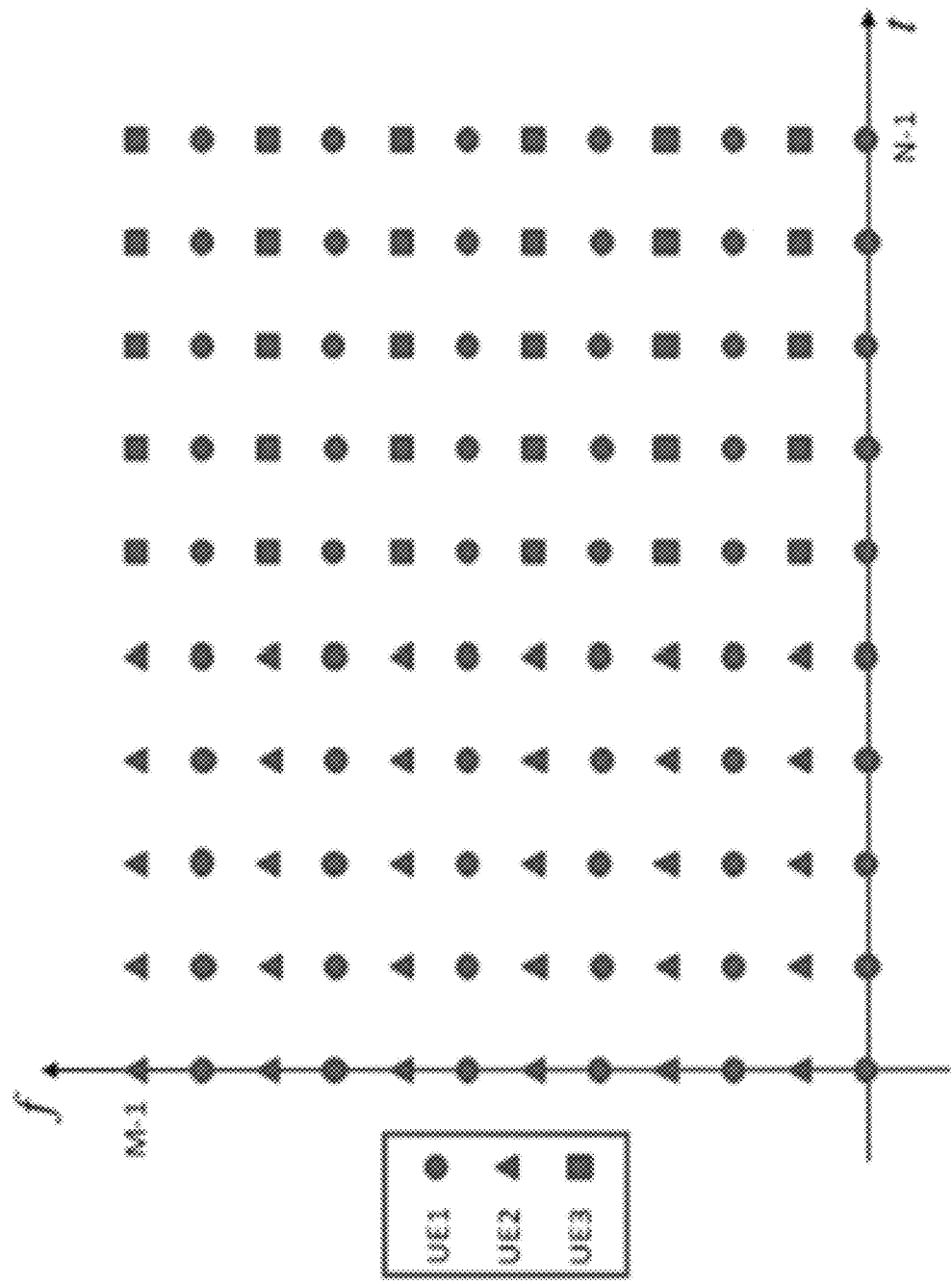
FIG. 20A is a graphical representation of multiplexing and interleaving user data for three users in the time-frequency domain.

If we wish to extract the maximum diversity of the channel and allocate users across the whole time-frequency frame, we can multiplex users via interleaving. In this case, one user occupies a subsampled grid of the time-frequency frame, while another user occupies another subsampled grid adjacent to it. FIG. 20A shows the same three users as before but interleaved on the subcarrier dimension. Of course, interleaving is possible in the time dimension as well, and/or in both dimensions. The degree of interleaving, or subsampling the grip per user is only limited by the spread of the channel that we need to handle.

Figure 20B:
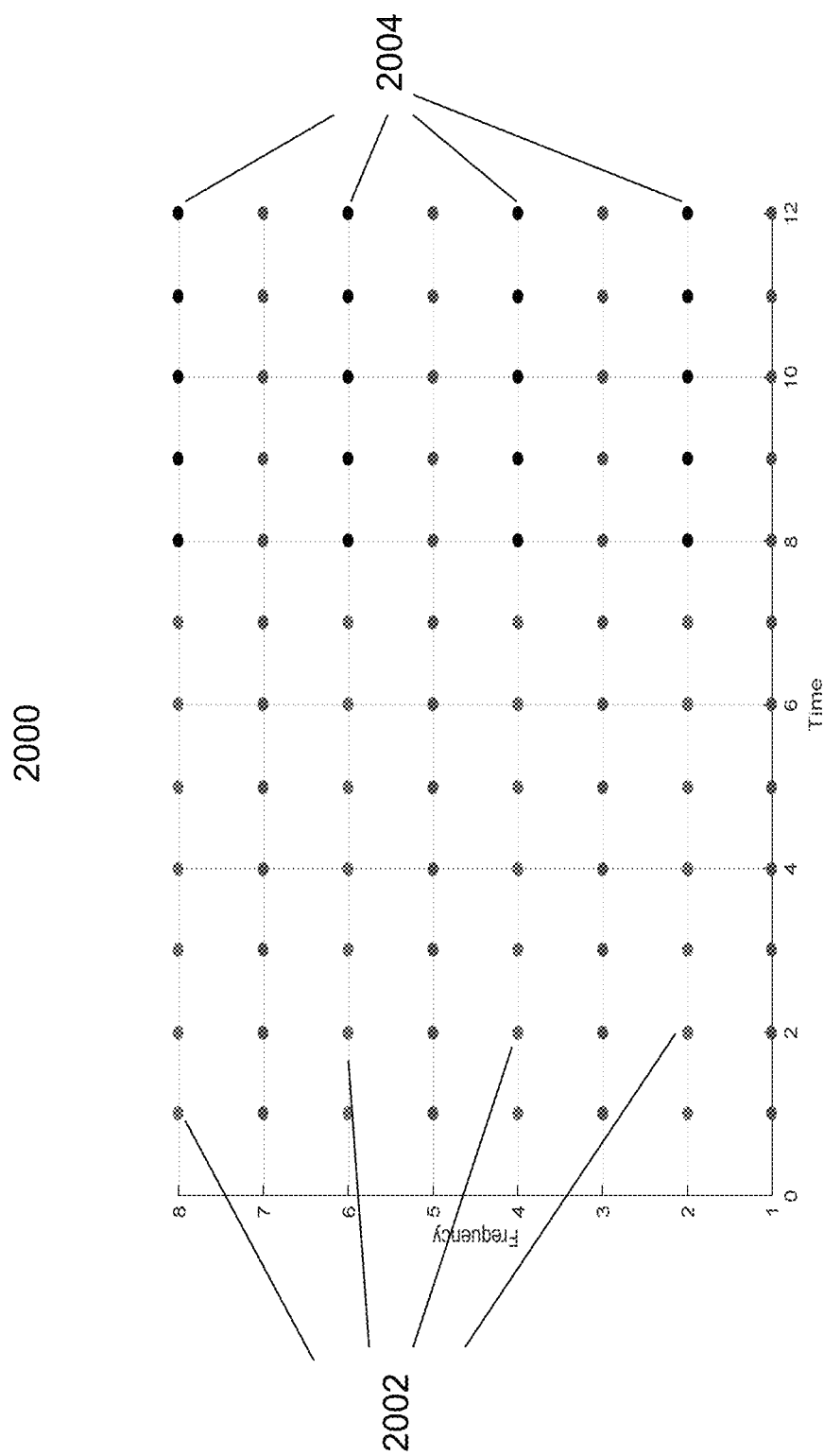
FIG. 20B is another graphical representation of multiplexing and interleaving user data for three users in the time-frequency domain.
Figure 21:
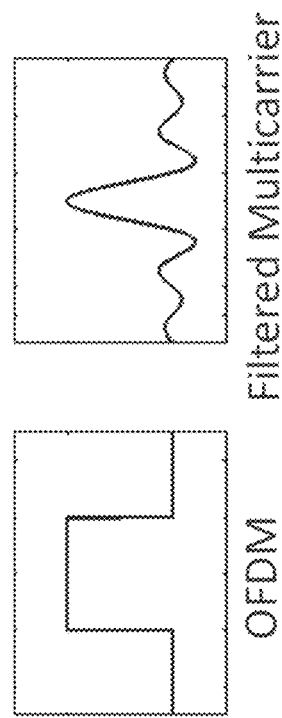
FIG. 21 shows an example of an impulse response of a filter used in implementing a filter bank.

In this approach, resource blocks or subframes are allocated to different users in the time-frequency domain. FIG. 20B illustrates this for a three user case. In this figure, User 1 transmits N×(M/2) QAM symbols and occupies the whole frame length but only half the available subcarriers. Users 2 and 3 each transmit (N/2)×(M/2) QAM symbols occupying the other half of the subcarriers, and divide the total length of the frame between them.

Notice that in this case, each user employs a slightly different version of OTFS modulation. One difference is that each user i performs an SFFT on a subframe ($N_i$, $M_i$), $N_i \leq N$, $M_i \leq M$. This reduces the resolution of the channel, or in other words reduces the extent of the time-frequency plane in which each user will experience its channel variation. On the other hand, this also gives the scheduler the opportunity to schedule users in parts of the time-frequency plane where their channel is best. Another advantage of this multiplexing approach is that it aligns architecturally with the assignment of physical resource blocks (PRBs) in LTE.

If we wish to extract the maximum diversity of the channel and allocate users across the whole time-frequency frame, we can multiplex users via interleaving. In this case, one user occupies a subsampled grid of the time-frequency frame, while another user occupies another subsampled grid adjacent to it. FIG. 20B shows a scheme 2000 for the same three users as before but interleaved on the subcarrier dimension (2002, 2004, and the remaining locations). Of course, interleaving is possible in the time dimension as well, and/or in both dimensions. The degree of interleaving, or subsampling the grip per user is only limited by the spread of the channel that we need to handle.

20. Multiplexing in the Time-Frequency Spreading Code Domain:

Let us assume that we wish to design a random access PHY and MAC layer where users can access the network without having to undergo elaborate RACH and other synchronization procedures. There have been several discussions on the need for such a system to support Internet of Things (IoT) deployments. OTFS can support such a system by employing a spread-spectrum approach. Each user is assigned a different two-dimensional window function that is designed as a randomizer. The windows of different users are designed to be nearly orthogonal to each other and nearly orthogonal to time and frequency shifts. Each user then only transmits on one or a few basis functions and uses the window as a means to randomize interference and provide processing gain. This can result in a much simplified system that may be attractive for low cost, short burst type of IoT applications.

21. Multiplexing in the Spatial Domain:

Finally, like other OFDM multicarrier systems, a multiantenna OTFS system can support multiple users transmitting on the same basis functions across the whole timefrequency frame. The users are separated by appropriate transmitter and receiver beamforming operations.

22. The Transmit Waveform

The final step in the modulation process is the same as any multicarrier modulation, namely the signal is passed through a filter bank with impulse response g(t), one frequency slice/multicarrier symbol at a time. This operation can be described as follows:

$$S(t-t_0) = \sum_{l=0}^{M-1}\sum_{k=0}^{N-1} \Theta(k,l) g(t - t_0 - kT) e^{-i2\pi l \Delta F(t-t_0-kT)}$$

Examples of g(t) for OFDM and Filtered Multicarrier are shown in FIG. 20. Recall that in OFDM, $\Theta(k,l)$ are QAM symbols, whereas in OTFS, $\Theta(k,l)$ is the windowed Symplectic Finite Fourier Transform of the QAM symbols.

23. Implementation Options

OTFS is a novel modulation technique with numerous benefits and a strong mathematical foundation. From an implementation standpoint, its added benefit is the compatibility with OFDM and the need for only incremental change in the transmitter and receiver architecture.

Recall that OTFS consists of two steps. The Heisenberg transform (which takes the time-frequency domain to the waveform domain) is already implemented in today's systems in the form of OFDM/OFDMA. In the formulation of this paper, this corresponds to a prototype filter g(t) which is a square pulse. Other filtered OFDM and filter bank variations have been proposed for 5G, which can also be accommodated in this general framework with different choices of g(t).

The second step of OTFS is the two dimensional Fourier transform (SFFT). This can be thought of as a pre- and post-processing step at the transmitter and receiver respectively as illustrated in FIG. 22. In that sense it is similar, from an implementation standpoint, to the SC-FDMA preprocessing step.

From a complexity comparison standpoint, we can calculate that for a frame of N OFDM symbols of M subcarriers, SC-FDMA adds N DFTs of M point each (assuming worse case M subcarriers given to a single user). The additional complexity of SC-FDMA is then $NM \log_2(M)$ over the baseline OFDM architecture. For OTFS, the 2D SFFT has complexity $NM \log_2(NM) = NM \log_2(M) + NM \log_2(N)$, so the term $NM \log_2(N)$ is the OTFS additional complexity compared to SC-FDMA. For an LTE subframe with M=1200 subcarriers and N=14 symbols, the additional complexity is 37% more compared to the additional complexity of SC-FDMA.

Notice also that from an architectural and implementation standpoint, OTFS augments the PHY capabilities of an existing LTE modem architecture and does not introduce co-existence and compatibility issues.

24. OTFS Transceiver Architecture

As described in the present document, the OTFS modulator can be architected as a pre-processing block to a standard multicarrier modulator (see FIG. 22). Similarly, the demodulator can be implemented as a post-processor to the multicarrier demodulator. Equalization is handled using standard equalization techniques extended to two dimensions. In this way, OTFS can be seen to be an evolutionary augmentation of OFDM and architecturally compatible with the LTE physical layer and the filtered OFDM variants (such as UFMC and FBMC) currently proposed for 5G in 3GPP.

25. Test Results

Tests were performed with OTFS hardware running over various 3GPP channels using a Spirent VR5 channel emulator. 3GPP specifies several channel models, defined in 3GPP TS 36.101 and TS 36.104. EPA-5 refers to the Extended Pedestrian A model with a fairly low delay spread of 410 ns and low Doppler spread of 5 Hz. ETU-300 refers to the Extended Typical Urban with a much higher delay spread of 5 us Doppler spread of 300 Hz. ETU-300 is known to be a difficult channel for LTE MIMO systems due to the extremely rapid channel fluctuations that make channel estimation more difficult and prevent feedback of detailed channel information.

In the following comparisons, the full PHY rate of OTFS is compared to a complete implementation of LTE based on cyclic-prefix OFDM (CP-OFDM). A full system specification necessarily includes compromises to trade sheer performance for robustness, ease of implementation or other desirable qualities.

For instance, LTE in 20 MHz has up to 100 resource blocks available, each of which can carry 168 symbols per ms in the case of normal cyclic prefix. This indicates that it should be possible to carry 16.8 million symbols per second, and so if 64 QAM modulation is used (6 bits per symbol) the total PHY throughput could be 100.8 Mbps for a single spatial stream. If a 2×2 MIMO system is being used, it could be double this: 200 Mbps.

While this represents the total PHY rate available in LTE, the peak delivered throughput on PDSCH available to users is close to 150 Mbps for a 2×2 MIMO configuration in 20 MHz. This implies up to 25% resource utilization in control, signaling, reference symbols and other overheads. This theoretical peak is shown as a horizontal line in the LTE results, below.

As such, OTFS PHY-only results shown on comparison plots with LTE, below, are also shown with a MAC overhead/implementation "handicap" of 10-25% (shown as a shaded area below the OTFS results) to allow for a more ready comparison. The range is shown since 25% may be an overly pessimistic estimate of overhead. In particular, one key benefit that OTFS brings is very low reference/pilot symbol overhead compared to LTE, which may reduce the total overhead.

Figure 23:
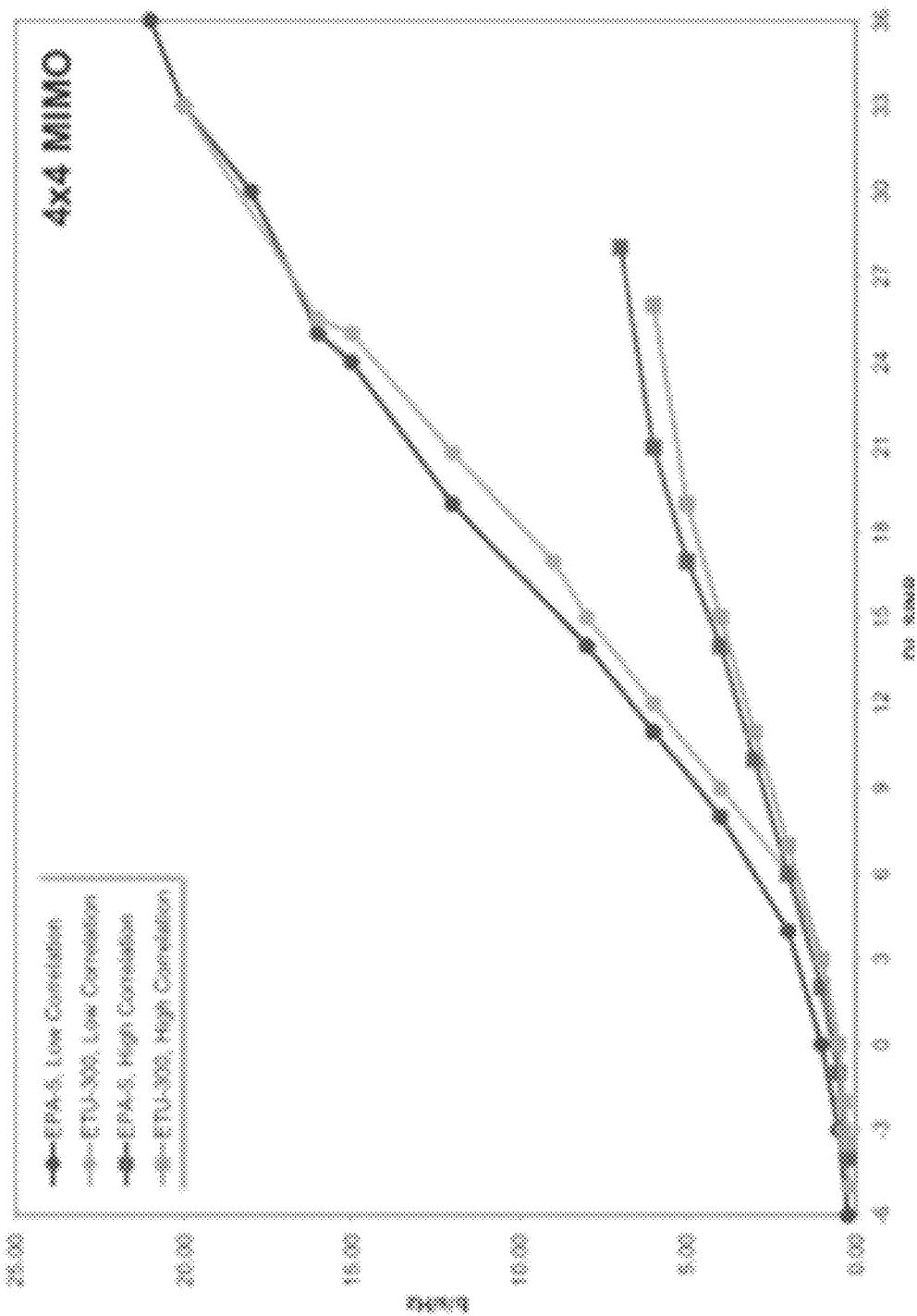
FIG. 23 is a graph showing example test results in an OTFS system.

FIG. 23 shows a comparison of low versus high mobility channels for OTFS. The upper two curves compare performance of a 4×4 MIMO OTFS system with EPA-5 and ETU-300 low-correlation (high rank) channels. The lower two curves show the same OTFS system but for high-correlation (low rank) channels. As can be seen, there is virtually no difference in performance between low and high Doppler scenarios, with the low correlation case achieving a peak PHY spectral efficiency of 20 bits/s/Hz, equivalent to 200 Mbps in a 10 MHz channel. In the high correlation case, as expected, only a single stream is maintained due to the lack of channel diversity.

Figure 24:
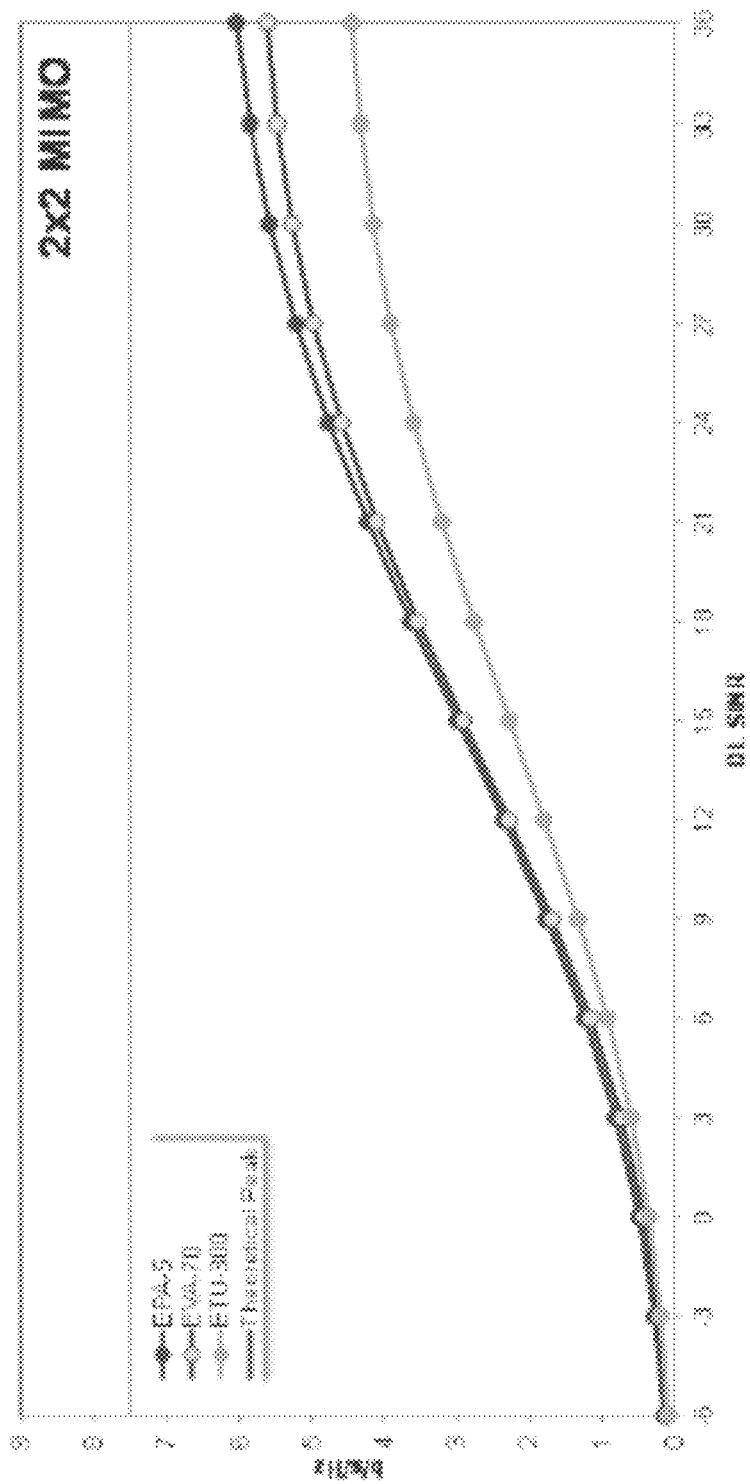
FIG. 24 is a graph showing example test results in an LTE system.

This stands in stark contrast to LTE/OFDM behavior, shown in FIG. 24, which shows low-correlation, 2×2 MIMO performance under various mobility conditions. As expected, high Doppler causes significant degradation to LTE, especially at high SNR where spectral efficiency drops from 6 bits/s/Hz to 4.5 bits/s/Hz.

Figure 25:
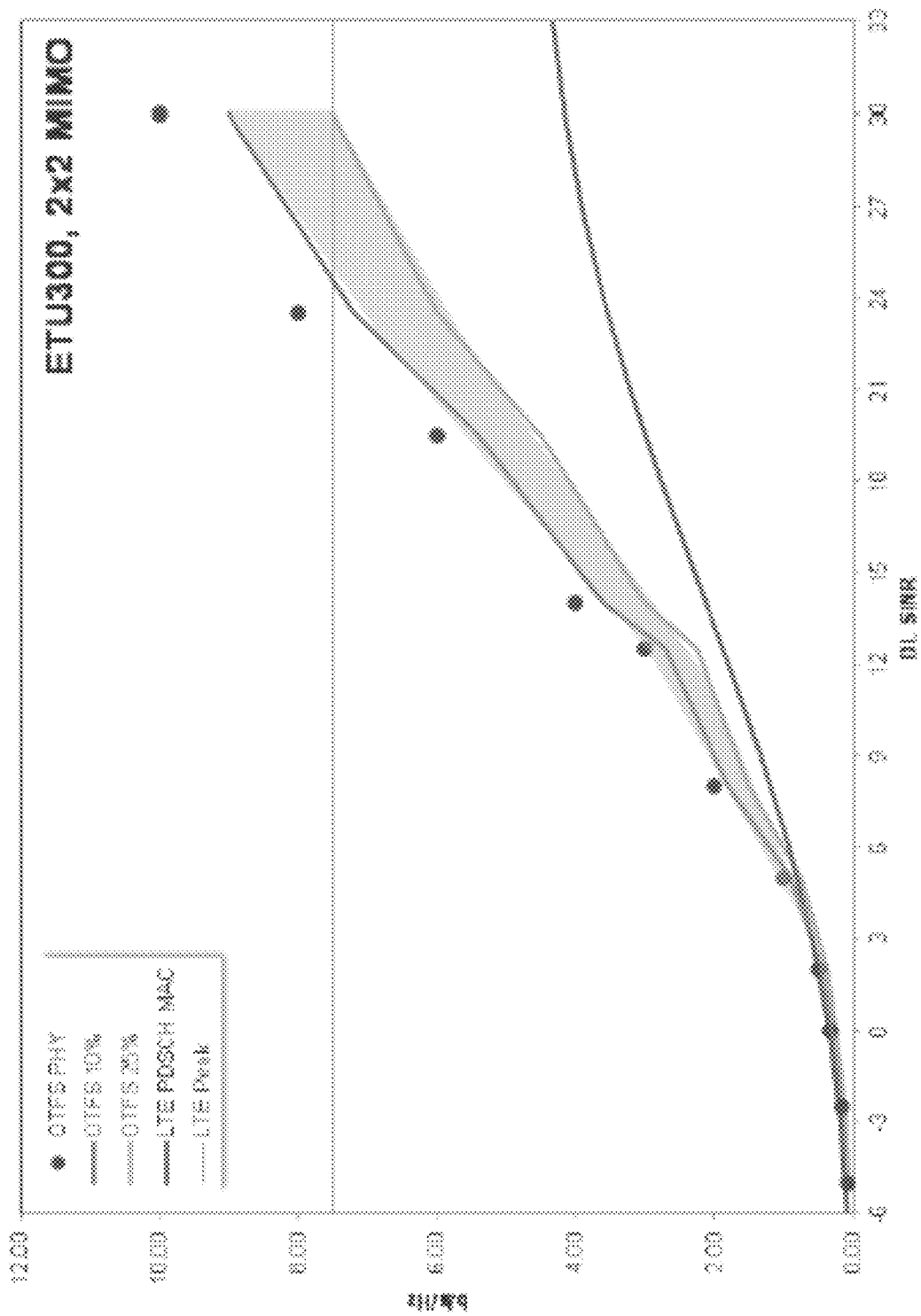
FIG. 25 is an example graphical comparison of results obtained in an OTFS system and an LTE system.

FIG. 25 compares OTFS with LTE performance in a 2×2 MIMO configuration using the ETU-300 low-correlation channel model. The lower curve corresponds to the PDSCH MAC rate with one PDCCH element and TM3 transmission. The shaded region is the performance of OTFS after the MAC overhead implementation "handicap" of 10-25%. The dots correspond to the measured OTFS PHY rate.

Even with 25% overhead assumed for OTFS, the spectral efficiency of OTFS is almost double that of LTE at high SNR (7.5 bits/s/Hz versus ~4 bits/s/Hz). Note that OTFS spectral efficiency also grows linearly with MIMO order so that performance is double for 4×4 MIMO. Note, too, that while LTE performance flattens at high SNR, OTFS increases at a much faster rate. This is understandable, since at high SNR the performance of LTE and OFDM is dominated by the fading characteristics of the channel. In contrast, as explained previously, the performance of OTFS is mostly invariant to the delay and Doppler characteristics of the channel that lead to frequency and time-selective fading.

26. Example Benefits of OTFS Modulation

The OTFS modulation has numerous benefits that tie into the challenges that 5G systems are trying to overcome. Arguably, the biggest benefit and the main reason to study this modulation is its ability to communicate over a channel that randomly fades within the time-frequency frame and still provide a stationary, deterministic and non-fading channel interaction between the transmitter and the receiver. In the OTFS domain all information symbols experience the same channel and same SNR.

Further, OTFS best utilizes the fades and power fluctuations in the received signal to maximize capacity. To illustrate this point assume that the channel consists of two reflectors which introduce peaks and valleys in the channel response either across time or across frequency or both. An OFDM system can theoretically address this problem by allocating power resources according to the water filling principle. However, due to practical difficulties such approaches are not pursued in wireless OFDM systems, leading to wasteful parts of the time-frequency frame having excess received energy, followed by other parts with too low received energy. An OTFS system would resolve the two reflectors and the receiver equalizer would employ coherent combining of the energy of the two reflectors, providing a non-fading channel with the same SNR for each symbol. It therefore provides a channel interaction that is designed to maximize capacity under the transmit assumption of equal power allocation across symbols (which is common in existing wireless systems), using only standard AWGN codes.

In addition, OTFS provides a domain in which the channel can be characterized in a very compact form. This has significant implications for addressing the channel estimation bottlenecks that plague current multi-antenna systems and can be a key enabling technology for addressing similar problems in future massive MIMO systems.

One key benefit of OTFS is its ability to easily handle extreme Doppler channels. We have verified in the field 2×2 and 4×4, two and four stream MIMO transmission respectively in 90 Km/h moving vehicle setups. This is not only useful in vehicle-to-vehicle, high speed train and other 5G applications that are Doppler intensive, but can also be an enabling technology for mm wave systems where Doppler effects will be significantly amplified.

Further, OTFS provides a natural way to apply spreading codes and deliver processing gain, and spread-spectrum based CDMA random access to multicarrier systems. It eliminates the time and frequency fades common to multi-carrier systems and simplifies the receiver maximal ratio combining subsystem. The processing gain can address the challenge of deep building penetration needed for IoT and PSTN replacement applications, while the CDMA multiple access scheme can address the battery life challenges and short burst efficiency needed for IOT deployments.

Last but not least, the compact channel estimation process that OTFS provides can be essential to the successful deployment of advanced technologies like Cooperative Multipoint (Co-MP) and distributed interference mitigation or network MIMO.

It will be appreciated that the inventors have disclosed OTFS, a novel modulation scheme for wireless communications with significant advantages in performance, especially under significant Doppler effects in mobility scenarios or mmWave communications. It will further be appreciated that various attributes, compatibility and design aspects have been disclosed and demonstrated the superiority of OTFS in a variety of use cases.

Proof of Proposition 1: Let $$g_1(t) = \iint h_1(\tau,\nu) e^{j2\pi\nu(t-\tau)} g(t-\tau) d\nu d\tau \quad (57)$$

$$g_2(t) = \iint h_2(\tau,\nu) e^{j2\pi\nu(t-\tau)} g_1(t-\tau) d\nu d\tau \quad (58)$$

Substituting (58) into (57) we obtain after some manipulation $$g_2(t) = \iint f(\tau,\nu) e^{j2\pi\nu(t-\tau)} g(t-\tau) d\nu d\tau \quad (59)$$

with $f(\tau,\nu)$ given by (16).

Proof of Theorem 1: The theorem can be proven by straightforward but tedious substitution of the left hand side of (23); by definition $$A_{g_r, \Pi_f(g_{tr})}(\tau, v) = \langle g_r(t-\tau)e^{j2\pi vt}, \Pi_f(g_{tr}) \rangle \quad (60)$$

$$= \int g_r^*(t-\tau)e^{-j2\pi vt} \Pi_f(g_{tr}(t)) dt$$

$$= \int g_r^*(t-\tau)e^{-j2\pi vt} \int\int f(\tau', v')e^{j2\pi v'(t-\tau')}g_{tr}(t-\tau')g_{tr}(t-\tau')dv'd\tau' dt$$

By changing the order of integration and the variable of integration $(t-\tau') \to t$ we obtain $$A_{g_r, \Pi_f}(g_{tr})(\tau, v) = \int\int f(\tau', v')e^{j2\pi v'(t-\tau')} \int g_r^*(t-\tau)g_{tr}(t-\tau')e^{-j2\pi vt}dt dv' d\tau' \quad (61)$$

$$\int\int f(\tau', v')e^{j2\pi v'(t-\tau')}A_{g_r,g_{tr}}(\tau-\tau', v-v')e^{j2\pi v'(t-\tau')}dv'd\tau'$$

where $$A_{g_r g_{tr}}(\tau-\tau', v-v') = \int g_r^*(t-(\tau-\tau'))g_{tr}(t)e^{-j2\pi(v-v')(t-(\tau-\tau'))}dt \quad (62)$$

Notice that the right second line of (61) is exactly the right hand side of (23), which is what we wanted to prove. □

Proof of Theorem 2: Substituting into (23) and evaluating on the lattice Λ we obtain:

$$\hat{X}[m, n] = \sum_{m'=-\frac{M}{2}}^{\frac{M}{2}-1} \sum_{n'=0}^{N-1} X[m', n'] \times \quad (63)$$

$$\int\int h(\tau-nT, v-m\Delta f)A_{g_r,g_{tr}}(nT-\tau, m\Delta f-v)e^{j2\pi v(nT-\tau)t} + V[m, n]$$

Using the bi-orthogonality condition in (63) only one term survives in the right hand side and we obtain the desired result of (29).

Proof of Proposition 2: Based on the definition of SFFT, it is not hard to verify that a delay translates into a linear phase $$SFFT(X_2[n-k, m-l]) = SFFT(X_2[n, m])e^{-j2\pi\left(\frac{nk}{N} - \frac{ml}{M}\right)} \quad (64)$$

Based on this result we can evaluate the SFFT of a circular convolution $$SFFT\left(\sum_{k=0}^{N-1}\sum_{l=-\frac{M}{2}}^{\frac{M}{2}-1} X_1[k, l]X_2[(n-k) \bmod N, (-l) \bmod M]\right) = \quad (65)$$

$$\sum_{k=0}^{N-1}\sum_{l=-\frac{M}{2}}^{\frac{M}{2}-1} X_1[k, l]SFFT(X_2[n, m])e^{-j2\pi\left(\frac{nk}{N} - \frac{ml}{M}\right)} =$$

$$SFFT(X_1[n, m])SFFT(X_2[n, m])$$

yielding the desired result.

Proof of Proposition 3: We have already proven that on the time-frequency domain we have a multiplicative frequency selective channel given by (29). This result, combined with the interchange of convolution and multiplication property of the symplectic Fourier transform [c.f. Proposition 1 and Eq. (42)] leads to the desired result.

In particular, if we substitute Y(n,m) in the demodulation equation (48) from the time-frequency channel equation (29) and X[n, m] in (29) from the modulation equation (43) we get a (complicated) end-to-end expression $$\hat{x}[k, l] = \frac{1}{MN}\sum_{k'=0}^{N-1}\sum_{l'=0}^{M-1} x[k', l'] \int\int h(\tau, v)e^{-j2\pi v\tau} \times \quad (66)$$

$$\times \left[\sum_{m=0}^{L-1}\sum_{n=0}^{K-1} W(n, m)e^{-j2\pi nT\left(\frac{k-k'}{NT}-v\right)}e^{j2\pi m\Delta f\left(\frac{l-l'}{M\Delta f}-\tau\right)}\right]dvd\tau$$

Recognizing the factor in brackets as the discrete symplectic Fourier transform of W(n,m) we have $$\hat{x}[k, l] = \quad (67)$$

$$\frac{1}{MN}\sum_{k'=0}^{N-1}\sum_{l'=0}^{M-1} x[k', l'] \int\int h(\tau, v)e^{-j2\pi v\tau}w\left(\frac{l-l'}{M\Delta f}-\tau, \frac{k-k'}{NT}-v\right)dvd\tau$$

Further recognizing the double integral as a convolution of the channel impulse response (multiplied by an exponential) with the transformed window we obtain $$\hat{x}[k, l] = \frac{1}{MN}\sum_{k'=0}^{N-1}\sum_{l'=0}^{M-1} x[k', l']h_w\left(\frac{l-l'}{M\Delta f}-\tau, \frac{k-k'}{NT}-v\right) \quad (68)$$

which is the desired result.

Figure 26:
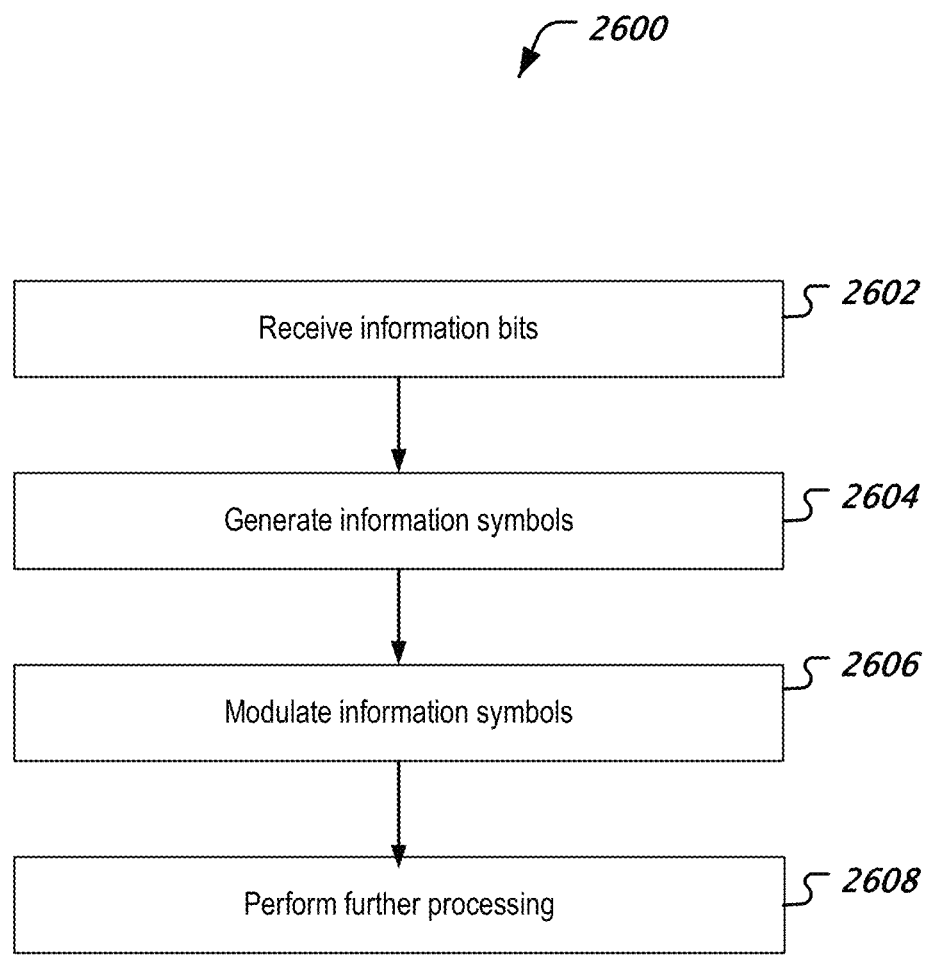
FIG. 26 is a flowchart representation of a wireless communications method.

FIG. 26 shows a flowchart of an example wireless communication transmission method 2600. At 2602, information bits are received. The information bits may be received, e.g., from a local application at a user device and may represent application data, voice, video, audio and such. At 2604, the method 2600 generates information symbols from the information bits. The information symbols may be generated using a quadrature amplitude modulation (QAM) or a quadrature phase shift keying (QPSK) modulation technique such as 4 to 256 QAM or 2, 4, 8 or 16 QPSK.

At 2606, the method 200 modulates each information symbol onto one of a set of 2D orthogonal basis functions. As described throughout this document, these functions may span at least a portion of bandwidth and time duration of a transmission burst. For example, in some embodiments, the basis functions depicted in FIG. 10 and described in the present document may be used. FIG. 14, FIG. 15 and FIG.

16 also show examples of 2D basis functions that can be used for the mapping between information symbols and basis functions. FIG. 18F similarly shows another example of basis functions that can be used for information symbol modulation. Additional mathematical properties of the basis functions are described in Sections 4, 5 and 6.

At 2608, the transmission burst is further processed, e.g., converted into a radio frequency signal, and transmitted over a wireless channel. The operation of further processing involves the transformation of the transmitted signal from the 2D time-frequency domain to a time domain waveform suitable for transmission over radio frequency waves.

Figure 27:
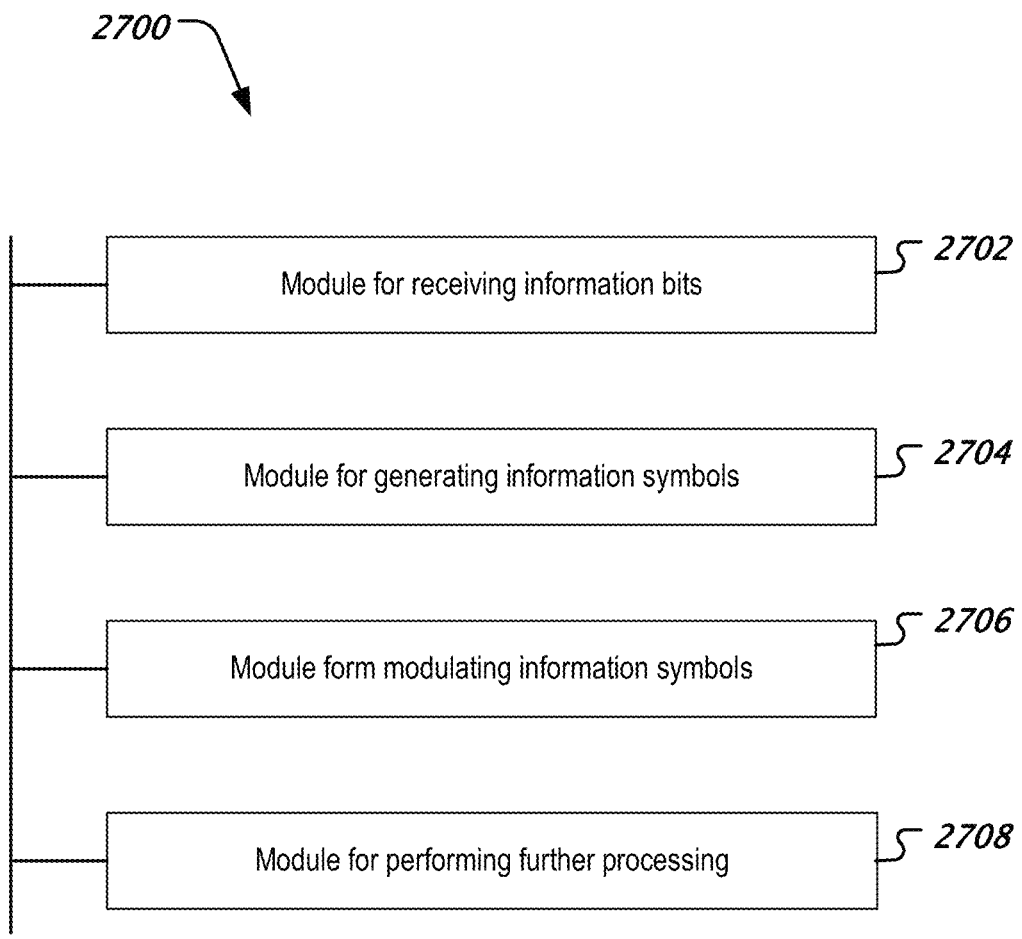
FIG. 27 is a block diagram representation of a wireless communications apparatus.

FIG. 27 shows a block diagram of an example of a wireless transmission apparatus 2700. The module 2702 is for receiving information bits. The module 2704 is for generating information symbols from the information bits. For example, the generation of information symbols may be performed as described with respect to step 2604. The module 2706 is for modulating each information symbol onto one of a set of two dimensional orthogonal basis functions that span the bandwidth and time duration of a transmission burst. The module 2708 is for further processing transmitting the transmission burst.

Figure 28:
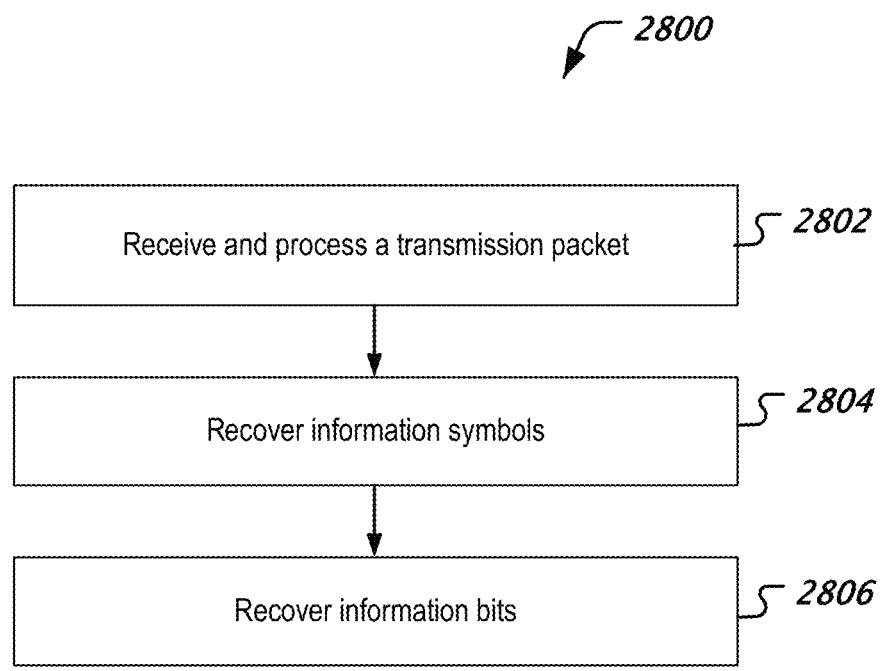
FIG. 28 is a flowchart representation of a wireless communications method.

FIG. 28 shows a flowchart of an example method 2800 of receiving wireless signals. At 2802, the method 2800 includes receiving and processing a wireless transmission burst. The transmission burst may be defined by a time duration and a transmission bandwidth. At 2804, the method 2800 includes recovering, from the transmission burst, information symbols based on one of a set of 2D orthogonal basis functions that span the transmission bandwidth and the transmission duration. At 2806, the method 2800 includes recovering information bits by demodulating the information symbols. The demodulating operation may include performing QAM or QPSK demodulation.

Figure 29:
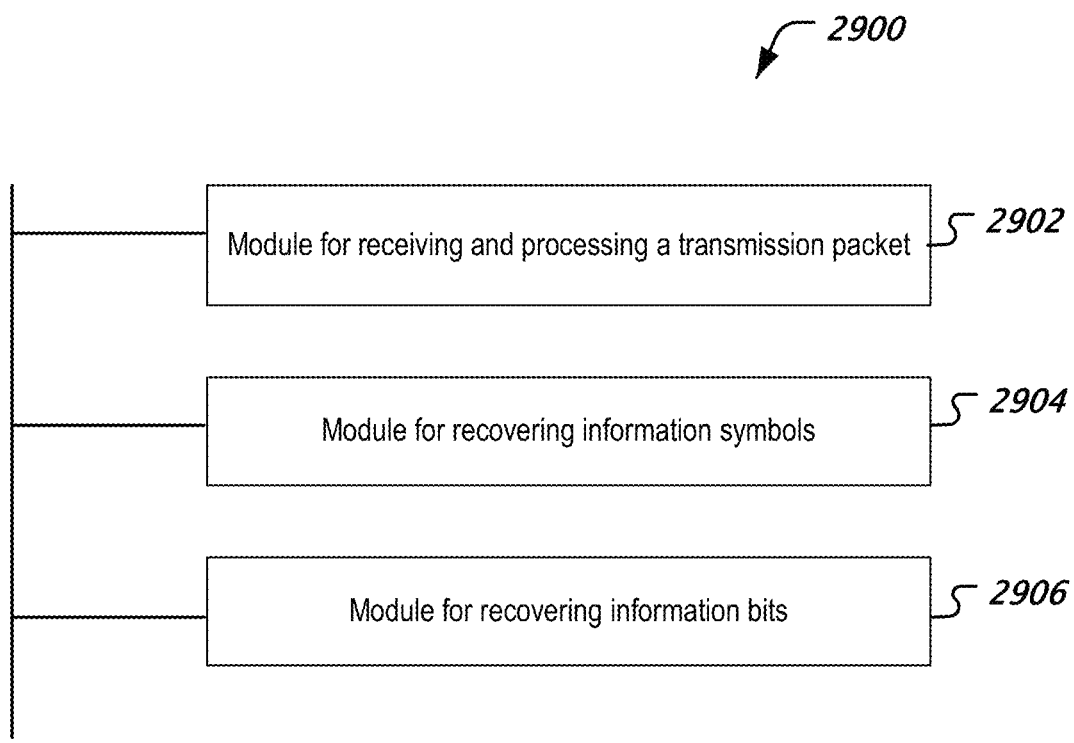
FIG. 29 is a block diagram representation of a wireless communications apparatus.

FIG. 29 shows a block diagram of an example wireless receiver apparatus 2800. The module 2802 is for receiving and processing a transmission burst. The module 2804 is for recovering information symbols from the transmission burst using an orthogonal transform, e.g., OTFS described herein. The module 2806 is for demodulating the information symbols to generate the information bits.

Figure 30:
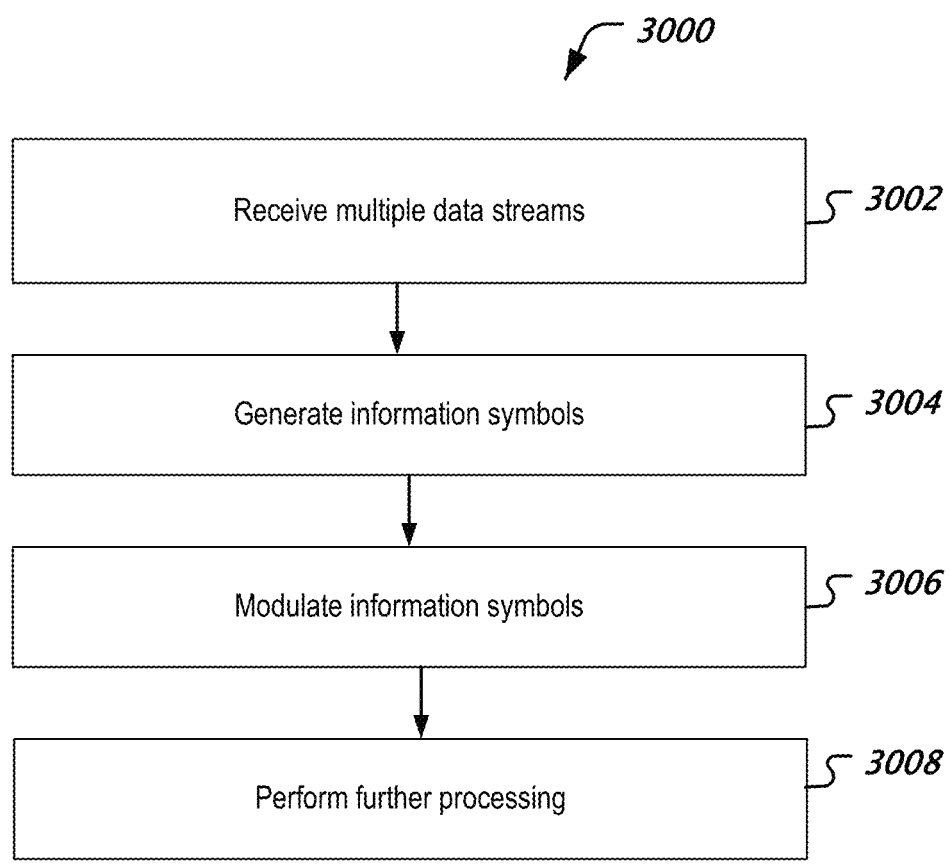
FIG. 30 is a flowchart representation of a wireless communications method.

FIG. 30 is a flowchart for an example method 3000 of wireless communication. The method 3000 includes receiving multiple data streams, each data stream representing data for a separate user equipment (3002), generating information symbols by multiplexing the multiple data streams (3004), modulating the information symbols onto one of a set of two dimensional (2D) orthogonal basis functions that span bandwidth and time duration of a transmission burst (3006), and further processing and transmitting the transmission burst (3008).

Figure 31:
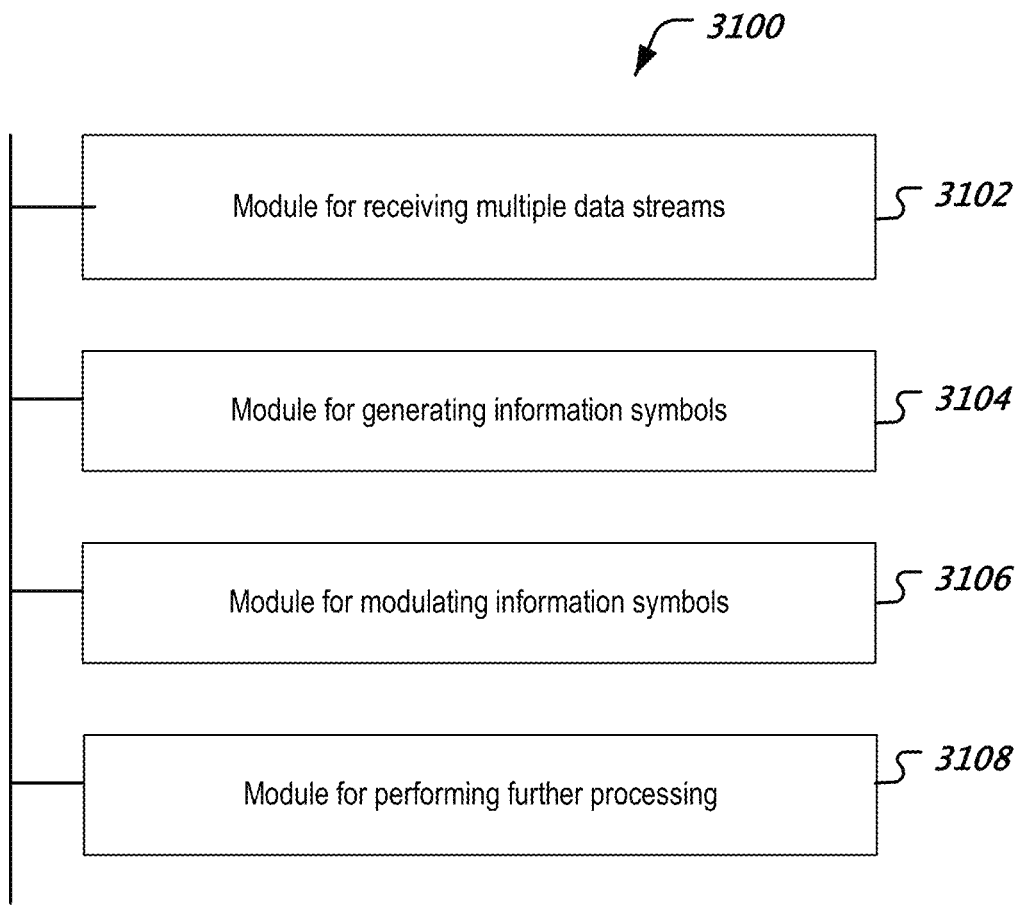
FIG. 31 is a block diagram representation of a wireless communications apparatus.

FIG. 31 is a block diagram representation of an example of a wireless communication apparatus 3100 is disclosed. The apparatus 3100 includes a module 3102 for receiving multiple data streams, each data stream representing data for a separate user equipment, a module 3104 generating information symbols by multiplexing the multiple data streams, a module 3106 modulating the information symbols onto one of a set of two dimensional (2D) orthogonal basis functions that span bandwidth and time duration of a transmission burst, and a module 3108 further processing and transmitting the transmission burst.

Figure 32:
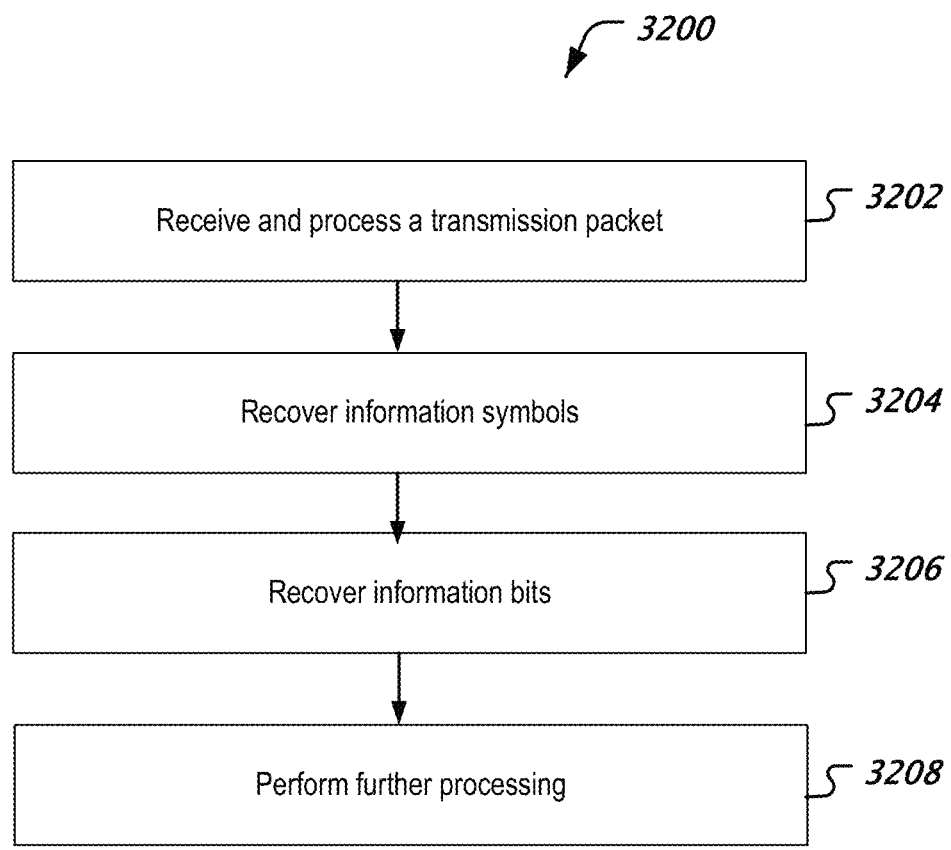
FIG. 32 is a flowchart representation of a wireless communications method.

FIG. 32 shows a flowchart for an example of a wireless communication method 3200, implemented at a receiver, is disclosed. The method includes receiving and processing a transmission packet that includes information symbols for multiple user equipment that are multiplexed using a multiplexing scheme (3202), recovering, from the transmission packet information symbols based on one of a set of two dimensional (2D) orthogonal basis functions that span the bandwidth and time duration of a transmission burst (3204), and recovering information bits by demodulating the information symbols (3206).

Figure 33:
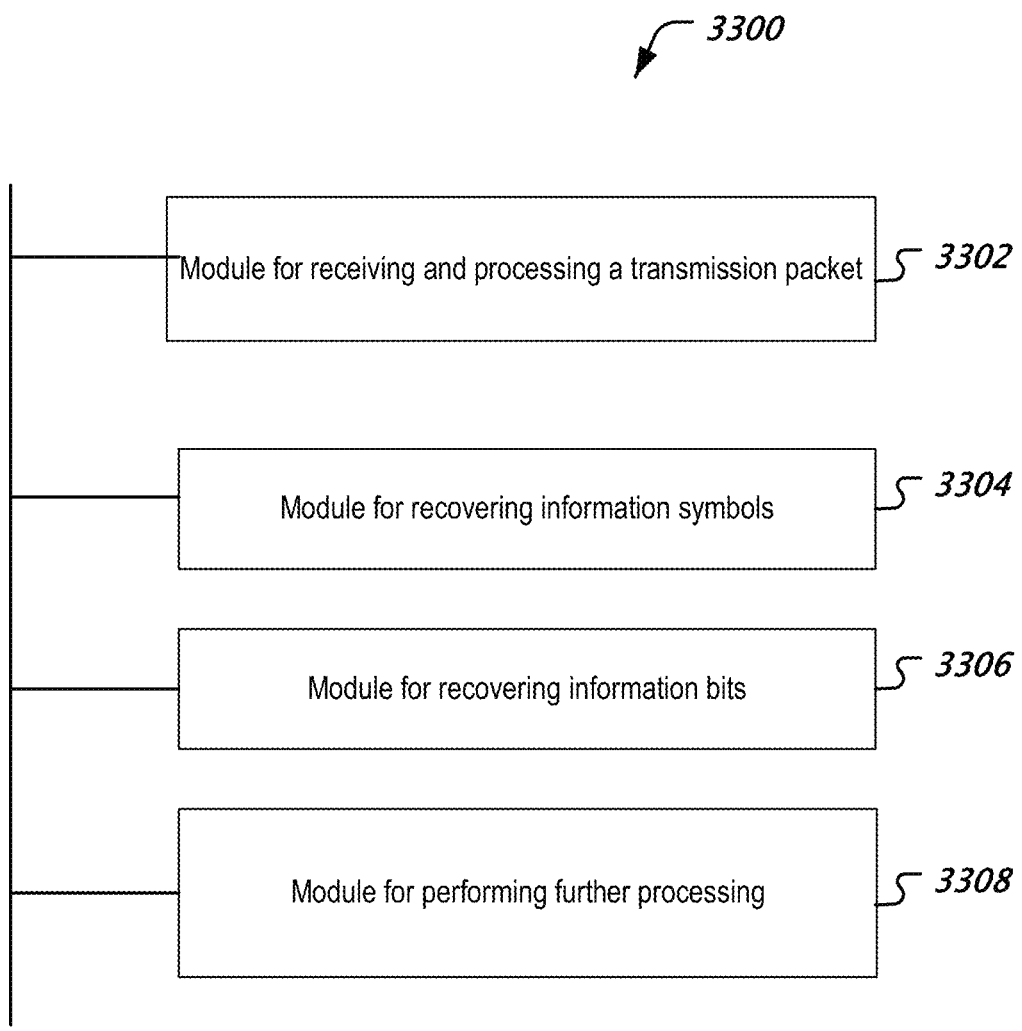
FIG. 33 is a block diagram representation of a wireless communications apparatus.

FIG. 33 shows a block diagram of an example of a wireless communication receiver apparatus 3300. The apparatus 3300 includes a module 3302 for receiving and processing a transmission packet that includes information symbols for multiple user equipment that are multiplexed using a multiplexing scheme, a module 3304 for recovering, from the transmission packet information symbols based on one of a set of two dimensional (2D) orthogonal basis functions that span the bandwidth and time duration of a transmission burst, and a module 506 recovering information bits by demodulating the information symbols.

Figure 34:
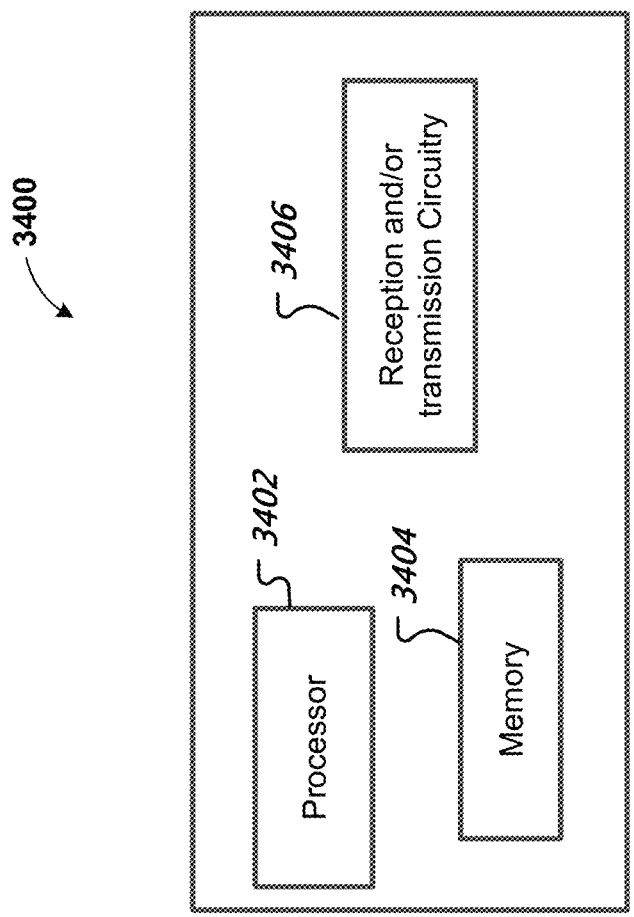
FIG. 34 is a block diagram representation of device used for implementing a communication technique.

FIG. 34 shows an example of a wireless transceiver apparatus 3400. The apparatus 3400 may be used to implement methods 2600, 2800, 3000 or 3200. The apparatus 3400 includes a processor 3402, a memory 3404 that stores processor-executable instructions and data during computations performed by the processor. The apparatus 3400 includes reception and/or transmission circuitry 3406, e.g., including radio frequency operations for receiving or transmitting signals.

With respect to the techniques described in FIGS. 26 to 33, the operation of further processing may convert a digital representation of modulated information symbols from the time-frequency domain into analog waveforms that are transmitted over the transmission medium and vice versa. For example, the further processing step may include conversion from a time-frequency domain representation to the time domain baseband waveform representation, digital to analog conversion, power amplification, frequency translation, and so on.

It will be appreciated that techniques for wireless data transmission and reception are disclosed using an orthogonal time frequency space transform.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method, comprising:
   receiving and processing a transmission burst;
   recovering, from the transmission burst, information symbols based on one of a set of two-dimensional (2D) orthogonal basis functions that span whole bandwidth and time duration of a transmission burst; and
   recovering information bits by demodulating the information symbols.

2. The wireless communication method of claim 1, wherein the set of 2D orthogonal basis functions comprise an orthogonal time frequency space (OTFS) transform.

3. The wireless communication method of claim 2, wherein the OTFS transform combines an inverse symplectic transform and a windowing operation.

4. The wireless communication method of claim 1, wherein demodulating the information symbols includes performing at least one of a quadrature amplitude modulation (QAM) demodulation or a quadrature phase shift keying (QPSK) demodulation.

5. The wireless communication method of claim 1, wherein the receiving the transmission burst includes receiving the transmission burst using an orthogonal frequency division multiplexing (OFDM) physical layer or a Long Term Evolution (LTE) physical layer.

6. A wireless communication apparatus, comprising:
   a module for receiving and processing a transmission burst;
   a module for recovering, from the transmission burst, information symbols based on one of a set of two dimensional (2D) orthogonal basis functions that span whole bandwidth and time duration of a transmission burst; and
   a module for recovering information bits by demodulating the information symbols.

7. The wireless communication apparatus of claim 6, wherein the set of 2D orthogonal basis functions comprise an orthogonal time frequency space (OTFS) transform.

8. The wireless communication apparatus of claim 7, wherein the OTFS transform combines an inverse symplectic transform and a windowing operation.

9. The wireless communication apparatus of claim 6, wherein the module for recovering the information bits includes a module for performing at least one of a quadrature amplitude modulation (QAM) demodulation or a quadrature phase shift keying (QPSK) demodulation.

10. The wireless communication apparatus of claim 6, wherein the module for receiving and processing the transmission burst includes a module for receiving the transmission burst using an orthogonal frequency division multiplexing (OFDM) physical layer or a Long Term Evolution (LTE) physical layer.

11. A non-transitory computer-readable medium storing executable instructions that, when implemented by a processor, perform a method of wireless communication, the method comprising:
   receiving and processing a transmission burst;
   recovering, from the transmission burst, information symbols based on one of a set of two-dimensional (2D)

orthogonal basis functions that span whole bandwidth and time duration of a transmission burst; and recovering information bits by demodulating the information symbols.

12. The non-transitory computer-readable medium of claim 11, wherein the set of 2D orthogonal basis functions comprise an orthogonal time frequency space (OTFS) transform.

13. The non-transitory computer-readable medium of claim 12, wherein the transmission burst is received through a time-varying multipath channel, and wherein the OTFS transform is configured to transform the time-varying multipath channel into a time invariant delay-Doppler two-dimensional channel.

14. The non-transitory computer-readable medium of claim 12, wherein the OTFS transform combines an inverse symplectic transform and a windowing operation.

15. The non-transitory computer-readable medium of claim 11, wherein demodulating the information symbols comprises performing at least one of a quadrature amplitude modulation (QAM) demodulation or a quadrature phase shift keying (QPSK) demodulation.

16. The non-transitory computer-readable medium of claim 11, wherein receiving the transmission burst includes receiving the transmission burst using an orthogonal frequency division multiplexing (OFDM) physical layer or a Long Term Evolution (LTE) physical layer.

* * * * *

UNITED STATES PATENT AND TRADEMARK OFFICE
CERTIFICATE OF CORRECTION

| | |
|---|---|
| PATENT NO. | : 11,894,967 B2 |
| APPLICATION NO. | : 18/164872 |
| DATED | : February 6, 2024 |
| INVENTOR(S) | : Ronny Hadani |

It is certified that error appears in the above-identified patent and that said Letters Patent is hereby corrected as shown below:

On the Title Page

(73) Assignee: delete "ZTE Corporation,Guangdong" and insert --Cohere Technologies, Inc.--.

Signed and Sealed this
Fourth Day of June, 2024

Katherine Kelly Vidal
*Director of the United States Patent and Trademark Office*